(12) United States Patent
Uchiyama et al.

(10) Patent No.: US 7,236,285 B2
(45) Date of Patent: Jun. 26, 2007

(54) LIGHT MODULATION DEVICE AND OPTICAL DISPLAY DEVICE, AND LIGHT MODULATION METHOD AND IMAGE DISPLAY METHOD

(75) Inventors: Shoichi Uchiyama, Shimosuwa-machi (JP); Junichi Nakamura, Shiojiri (JP); Takashi Nitta, Chino (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 11/052,572

(22) Filed: Feb. 8, 2005

(65) Prior Publication Data
US 2005/0185249 A1 Aug. 25, 2005

(30) Foreign Application Priority Data

| Feb. 12, 2004 | (JP) | ............................. 2004-035091 |
| Feb. 24, 2004 | (JP) | ............................. 2004-048015 |
| Feb. 27, 2004 | (JP) | ............................. 2004-054185 |

(51) Int. Cl.
*G02F 1/03* (2006.01)

(52) U.S. Cl. ........................................ 359/242; 353/38

(58) Field of Classification Search ................ 359/237, 359/242, 240, 241, 259; 353/38, 101, 98, 353/20
See application file for complete search history.

(56) References Cited

U.S. PATENT DOCUMENTS 6,631,995 B2  10/2003  Stanton et al.
6,985,272 B2 *  1/2006  Bridgwater et al. ........ 359/237
7,055,964 B2 *  6/2006  Belliveau ..................... 353/87
2006/0055897 A1 *  3/2006  Lerner et al. ................. 353/99

FOREIGN PATENT DOCUMENTS

| JP | A 5-273506   | 10/1993 |
| JP | A 6-167690   | 6/1994  |
| JP | A 2000-310751 | 11/2000 |
| JP | A 2001-100689 | 4/2001  |
| JP | A 2001-174919 | 6/2001  |
| JP | A 2004-138732 | 5/2004  |

\* cited by examiner

*Primary Examiner*—Timothy Thompson
(74) *Attorney, Agent, or Firm*—Oliff & Berridge, PLC

(57) ABSTRACT

A projection type display device includes dichroic mirrors which separate the light from the light source into light of the three primary colors R, G and B, a plurality of color modulation light valves upon which the light beams separated by the dichroic mirrors are respectively incident and comprising a plurality of picture elements which are capable of being individually controlled with regard to their transmittivity ratios, a dichroic prism which combines the light beams from the color modulation light valves, a relay lens which forms the optical images of the color modulation light valves upon the picture element surface of a reflective type liquid crystal light valve, and a reflective type liquid crystal light valve upon which the light from the relay lens is incident and comprising a plurality of picture elements whose reflectivity ratios can be individually controlled.

9 Claims, 25 Drawing Sheets

UPPER SIDE (NO IMAGE PROCESSING PERFORMED)

UPPER SIDE (IMAGE PROCESSING PERFORMED)

| CONTROL VALUE | 0 | 1 | 2 | 3 | 4 | 5 |
|---|---|---|---|---|---|---|
| TRANSMITTIVITY RATIO | 0.004 | 0.007 | 0.010 | 0.013 | 0.018 | 0.026 |
| CONTROL VALUE | 6 | 7 | 8 | 9 | 10 | 11 |
| TRANSMITTIVITY RATIO | 0.04 | 0.07 | 0.10 | 0.16 | 0.24 | 0.35 |
| CONTROL VALUE | 12 | 13 | 14 | 15 | | |
| TRANSMITTIVITY RATIO | 0.45 | 0.52 | 0.57 | 0.6 | | |

| CONTROL VALUE | 0 | 1 | 2 | 3 | 4 | 5 |
|---|---|---|---|---|---|---|
| REFLECTIVITY RATIO | 0.003 | 0.006 | 0.009 | 0.012 | 0.017 | 0.025 |
| CONTROL VALUE | 6 | 7 | 8 | 9 | 10 | 11 |
| REFLECTIVITY RATIO | 0.038 | 0.06 | 0.09 | 0.15 | 0.23 | 0.33 |
| CONTROL VALUE | 12 | 13 | 14 | 15 | | |
| REFLECTIVITY RATIO | 0.44 | 0.52 | 0.57 | 0.6 | | |

OUTER EDGE OF PICTURE ELEMENT SURFACE OF COLOR MODULATION LIGHT VALVE

| INPUT VALUE | 0 | 1 | 2 | 3 | 4 | 5 |
|---|---|---|---|---|---|---|
| REFLECTIVITY RATIO OR THE LIKE Tp | 1.20E-05 | 5.00E-03 | 1.00E-02 | 2.00E-02 | 3.50E-02 | 5.50E-02 |
| INPUT VALUE | 6 | 7 | 8 | 9 | 10 | 11 |
| REFLECTIVITY RATIO OR THE LIKE Tp | 8.00E-02 | 0.107 | 0.135 | 0.165 | 0.195 | 0.225 |
| INPUT VALUE | 12 | 13 | 14 | 15 | | |
| REFLECTIVITY RATIO OR THE LIKE Tp | 0.255 | 0.29 | 0.325 | 0.36 | | |

| INPUT VALUE | 0 | 1 | 2 | 3 | 4 | 5 |
|---|---|---|---|---|---|---|
| LUMINANCE LEVEL Rp | 0.012 | 5.0 | 10.0 | 20.0 | 35.0 | 55.0 |
| INPUT VALUE | 6 | 7 | 8 | 9 | 10 | 11 |
| LUMINANCE LEVEL Rp | 80.0 | 107.0 | 135.0 | 165.0 | 195.0 | 225.0 |
| INPUT VALUE | 12 | 13 | 14 | 15 | | |
| LUMINANCE LEVEL Rp | 255.0 | 290.0 | 325.0 | 360.0 | | |

LIGHT MODULATION DEVICE AND OPTICAL DISPLAY DEVICE, AND LIGHT MODULATION METHOD AND IMAGE DISPLAY METHOD

BACKGROUND OF THE INVENTION

1. Field of the Invention

The present invention relates to a device and a method for modulating the light from a light source via a plurality of light modulation elements. In particular, the present invention relates to a light modulation device and optical display device, and light modulation method and image display method, which are appropriate for implementing widening of the luminance dynamic range and number of gradations, for enhancing the luminance of the displayed images and their picture quality, and for making the entire device more compact.

Priority is claimed on Japanese Patent Application No. 2004-35091 filed 12 Feb. 2004, Japanese Patent Application No. 2004-48015 filed 24 Feb. 2004, and Japanese Patent Application No. 2004-54185 filed 27 Feb. 2004, the contents of which are incorporated herein by reference.

2. Description of Related Art

In recent years, the improvement in the picture quality of optical display devices such as LCDs (Liquid Crystal Displays), EL (electro-luminescence) displays, plasma displays, CRTs (Cathode Ray Tubes), projectors and the like has been remarkable. In terms of resolution and color range, performance which is almost as good as the visual characteristics of the human eye is now being implemented. However, when the luminance dynamic range is considered, its reproduction range only attains about from 1 to $10^2$ [nit], and furthermore the number of gradations is generally 256 (expressed by 8 bits). On the other hand, the visual performance of the human eye is such that the dynamic range of luminance which can be perceived at one time is about from $10^{-2}$ to $10^4$ [nit], and furthermore the luminance discrimination capability is about 0.2 [nit]. When these are converted into a number of gradations, it corresponds to around 4000 or more (i.e. as expressed by 12 bits). When a display image of a current optical display device is viewed via this type of human visual characteristic, the narrowness of the luminance dynamic range is conspicuous, and furthermore there is a perceived insufficiency with regard to the reality of the display image and its impact, since the gradations of the shadow portions and the highlight portions are insufficient.

Furthermore, in computer graphics (hereinafter abbreviated as "CG") as used in films and games and so on, there is a mainstream trend to pursue reality of depiction by endowing the display data (hereinafter termed HDR (High Dynamic Range) display data) with a luminance dynamic range and a number of gradations close to those of the human visual performance. However there is the problem that, since the performance of the optical display device upon which this data is to be displayed is insufficient, it is not possible to provide a display which exhibits the CG contents with the power of expression that they originally had.

Furthermore, with next generation OS (Operating Systems), the adoption of 16-bit color space is anticipated, and the luminance dynamic range and the number of gradations will increase tremendously by comparison with the present 8-bit color space. Due to this, it is desirable to implement an optical display which can make the most of a 16-bit color space.

Among optical display devices, projection display devices such as liquid crystal projectors or so-called DLP projectors are devices which are capable of large screen display, and which are effective for reproducing the reality and impact of displayed images. In this field, in order to solve the above described problems, the following proposals have been made.

As a projection type display device of high dynamic range, for example, there is a technology which is disclosed in Japanese Patent Publication No. 2001-100689; this device comprises a light source, a first light modulation element which modulates the luminance of the light in all wavelength regions, and a second light modulation element which, for each of the three wavelength regions of the three primary colors R, G, and B among the wavelength region of the light, modulates the luminance in that wavelength region. A desired luminance distribution is created by modulating the light from the light source with the first light modulation element, and an optical image thereof is formed upon the picture element surface of the second light modulation element and is then color modulated thereby, and then the light which has thus been modulated in two stages is projected. Each of the picture elements (pixels) of the first light modulation element and the second light modulation element is controlled separately and individually based upon first control values and second control values which are determined from the HDR display data. For the light modulation elements, there are used transmission type light modulation elements which have a picture element (pixel) construction or a segmented construction of which the transmittivity ratios can be individually controlled, and which can control a two-dimensional transmittivity ratio distribution. A liquid crystal light valve may be offered as a representative example of such a device.

Now, the use of light modulation elements whose transmittivity ratio for dark display is about 0.2% and whose transmittivity ratio for bright display is about 60% is being considered. Considering such a light modulation element in isolation, its luminance dynamic range is thus 60/0.2=300. Since, with such a projection type display device according to the above described prior art, the luminance dynamic range corresponds to arranging two of such light modulation elements, each having a dynamic range of 300, optically in series with one another, it is accordingly possible to implement a luminance dynamic range of 300×300=90,000. Furthermore, with regard to the number of gradations as well, the same concept as the above is effective; it is possible to obtain a number of gradations which exceeds the 8-bit level by arranging light modulation elements which have 8-bit gradations optically in series.

Moreover, as a different type of projection type display device which implements a high luminance dynamic range, for example, there is a per se known type of projection type display device which is disclosed in Japanese Patent Publication No. 2001-174919.

This display device comprises a DMD (Digital Micromirror Device) in which a plurality of picture elements (pixels) are arranged in a linear configuration, an illumination section which radiates a ray bundle upon the DMD, a processing section which converts an input image signal into a drive signal for the DMD, an optical scanning section which scans the ray bundle which has been optically modulated with the DMD, and a projection lens which projects the ray bundle from the optical scanning section upon the surface of a screen; and the illumination section modulates the amount of light which it emits according to an input image signal.

FIG. 29 is a figure showing the picture element surface of the picture elements (pixels) of a transmission type liquid crystal light valve.

In such a transmission type liquid crystal light valve, a transistor for driving the picture element electrode and signal lines and the like are provided within the surface of each picture element (pixel). Accordingly, as shown in FIG. 29, an aperture section (a location through which light can be transmitted) is formed upon each picture element (pixel) in the shape of a window, and it is general for the opening ratio of this aperture section to be less than or equal to about 60%.

Accordingly, as explained in the '689 Japanese Patent Publication, in order to ensure the luminance of the displayed image, the optical image of the opening section of each picture element of the first light modulation element must be aligned so as to be formed accurately upon the opening section of the corresponding picture element (pixel) of the second light modulation element. In this structure, therefore, there is a requirement for this alignment to be performed at high accuracy.

FIG. 30 is a figure showing the structure of the optical path of the first light modulation element and the second light modulation element in the projection type display device disclosed in the '689 Japanese Patent Publication. It should be understood that, although other optical elements such as mirrors and so on are disposed upon the actual optical path, FIG. 30 has been drawn with these other optical elements eliminated for the convenience of the following explanation.

In the optical system of FIG. 30, a first light modulation element 130 for luminance modulation is disposed on the light source side of two fly-eye lenses 112a and 112b, and a second light modulation element 140 for color modulation is disposed on the opposite side to the light source of these two fly-eye lenses 112a and 112b. With this optical system, an optical image of the first light modulation element is formed upon the second light modulation element by the fly-eye lenses 112a and 112b and a condensing lens 112d. However, with the fly-eye lenses 112a and 112b and the condensing lens 112d, the image formation performance is low since they are optical elements which are used with the objective of making the luminance distribution uniform.

For this type of reason, in the structure described in the '689 Japanese Patent Publication, it is difficult to convey an optical image of the first light modulation element with good accuracy to the picture element surface of the second light modulation element. In this structure, there has been the problem that the luminance of the displayed image is deteriorated.

FIG. 31 is a figure showing the picture element surface of the picture elements of a reflective type light modulation element.

In contrast to a transmission type liquid crystal display element, with a reflective type light modulation element such as a DMD or the like, the light intercepting locations such as those of the signal lines and the drive transistors and so on are housed underneath the reflective picture element electrodes. It is possible, therefore, to provide the drive sections and the like which drive the mirrors on the rear surfaces of the mirrors. Accordingly, as shown in FIG. 31, for each of the picture elements (pixels), the opening ratio of its opening section (the location which reflects the light) generally becomes greater than or equal to 90%. Thus, if the first light modulation element and the second light modulation element are made as reflective type light modulation elements, it is possible to enhance the luminance of the displayed image.

In the '689 Japanese Patent Publication, the concept of being able to make the second light modulation element as a DMD is disclosed, but the following type of problem is still present.

With the optical system of FIG. 30, partial optical images of the first light modulation element 130 for each of the ranges which correspond to the constituent lenses which make up the fly-eye lens 112a which is close to the first light modulation element 130 are formed as superimposed upon the picture element surface of the second light modulation element 140. Due to this, in order to obtain the desired luminance distribution, it is necessary to form this luminance distribution for each of the ranges which correspond to the constituent lenses. However, the fly-eye lenses 112a and 112b are optical element which are utilized with the objective of making the luminance distribution uniform, and, for this objective, it is desirable for the number of their constituent lenses to be large. When this is done, inevitably, the size of each of the constituent lenses becomes small as compared to the size of the picture elements of the second light modulation element 140. In concrete terms, constituent lenses of $\frac{1}{3}$ to $\frac{1}{5}$ of the size are employed. Now, when it is considered to put the picture elements of the second light modulation element 140 and the picture elements of the first light modulation element 130 into one to one correspondence, the picture element density of the first light modulation element 130 necessarily becomes three to five times the picture element density of the second light modulation element 140. However, due to its very high definition, a current light modulation element (for example, a liquid crystal light valve) has a picture element density which is close to the upper limit of small-scale manufacturing technology, and, in consideration of this fact, it is difficult to implement a picture element density for the first light modulation element 130 which is three to five times greater. Accordingly, it inevitably becomes three to five times coarser than the fineness of the picture element density of the second light modulation element 140 in the accuracy of the luminance distribution which can be created by the first light modulation element 130. Moreover, an optical image of each of the constituent lenses of the fly-eye lens 112a is created upon the picture element surface of the second light modulation element 140 by the two lenses which are far from the first light modulation element 130, i.e. by the fly-eye lens 112b and the condensing lens 112d. Accordingly it is not possible to obtain sufficient aberration correction, and it is not possible to avoid a considerable amount of accompanying blurring.

Yet further, in the '689 Japanese Patent Publication, the transmission type light modulation element is simply replaced by a DMD. The following problems therefore arise.

As a projection type display device which employs a DMD, a projection type display device is proposed which utilizes an "off-axis optical system" of a type in which light is incident at a slanting angle upon the DMD, and in which light is caused to be emitted in a direction which is different from its direction of incidence.

However, in the structure described in the '689 Japanese Patent Publication, if the second light modulation element is arranged so as to constitute an off-axis optical system, the optical image of the first light modulation element is formed at a slanting angle with respect to the picture element surface of the second light modulation element. To this end, a distortion of trapezoidal shape is created at the picture element surface of the second light modulation element. Due to this, if two stage modulation is performed in which a desired light intensity distribution is created at the first light modulation element, and an optical image thereof is formed upon the picture element surface of the second light modulation element, then, distortion of a trapezoidal shape is created in the image which is formed by the first light modulation element. It is not possible, therefore, to perform such two stage modulation accurately. Accordingly, it becomes impossible to reproduce an image of the reality and the impact which the HDR display data originally possessed.

On the other hand, with the structure described in the '919 Japanese Patent Publication, a solid state laser or a semiconductor laser is used as the light source. There is the problem, therefore, that the device becomes rather large in size. Furthermore, if a semiconductor laser is utilized as the light source, there also is the problem that the luminance of the displayed image is deteriorated since its light output is rather low.

SUMMARY OF THE INVENTION

Thus, the present invention has been made in order to address the unsolved problems associated with this type of conventional art technique and, therefore, it takes as its objective to provide a light modulation device and an optical display device, and a light modulation method and an image display method, which are appropriate for the implementation of increase in the luminance dynamic range and the number of gradations, thus making it possible to enhance the luminance of the display image and the picture quality, and to make the entire device more compact.

In order to achieve the above described objective, a first aspect of a light modulation device according to the present invention comprises a first light modulation element which modulates light, and a second light modulation element upon which light from the first light modulation element is incident and which modulates this light; the light modulation device modulating light from a light source via the first light modulation element and the second light modulation element, wherein: the second light modulation element is implemented as a reflective type light modulation element; and, upon the optical path of the first light modulation element and the second light modulation element, a relay lens is provided which forms an optical image of the first light modulation element upon the light reception surface of the second light modulation element.

According to this structure, the light from the light source is subjected to a first stage of modulation by the first light modulation element, and an optical image of the first light modulation element is formed upon the light reception surface of the second light modulation element via the relay lens. By the light from the first modulation element being reflected by the second light modulation element, the light from the first light modulation element is subjected to a second stage of modulation.

Here, it is possible to take advantage of any suitable device as the light source, provided that it is a medium which generates light; for example, a light source which is housed internally to the optical system, such as a lamp or the like, will be acceptable, or an external light source such as sunlight or room lighting will also be acceptable. This beneficial feature is the same for the light modulation methods of the fifth, twelfth, and twenty-third aspects described below.

Furthermore, the first light modulation element may have any structure desired, as long as it is an element which can modulate light; as a possible structure, for example, it may be an element of a unitary plate type which consists of a single light modulation element, or it may be a multi-plate type which is made up from a plurality of light modulation elements. Furthermore, as far as concerns its function, for example, it may be arranged for it to modulate the luminance of the light in all its wavelength regions, or, for a plurality of different specified wavelength regions among the wavelength regions of the light, it may be arranged for it to modulate the luminance of those specified wavelength regions.

This beneficial feature is the same for the optical display devices of the second, eighth, and eighteenth aspects described below, for the light modulation methods of the fifth, twelfth, and twenty-fourth aspects described below, and for the image display methods of the sixth, thirteenth, and twenty-fourth aspects described below.

Yet further, the second light modulation element may be embodied as any desired structure, provided that it is an element which reflects light; and, as its construction, for example, it may be an element of a unitary plate type which consists of a single light modulation element, or it may be a multi-plate type which is made up from a plurality of light modulation elements. Furthermore, as far as concerns its function, for example, it may be arranged for it to modulate the luminance of the light in all its wavelength regions, or, for a plurality of different specified wavelength regions among the wavelength regions of the light, it may be arranged for it to modulate the luminance of those specified wavelength regions.

This beneficial feature is the same for the light modulation methods of the fifth, twelfth, and twenty-third aspects described below.

On the other hand, in order to attain the above described objective, a second aspect of an optical display device according to the present invention comprises: a light source; an optical separator which separates the light from the light source into a plurality of light beams of a plurality of different specified wavelength regions; a plurality of first light modulation elements upon which the light beams which have been separated by the optical separator are respectively incident, and which modulate these light beams; an optical combiner device which combines the light beams from the first light modulation elements; and a second light modulation element upon which the light from the optical combiner device is incident and which modulates this light; the optical display device modulating the light from the light source via the first light modulation elements and the second light modulation element and displaying an image; wherein the second light modulation element is implemented as a reflective type light modulation element; and, upon the optical path of the optical combiner device and the second light modulation element, there is provided a relay lens which forms an optical image from the first light modulation elements upon the light reception surface of the second light modulation element.

According to this structure, the light from the light source is separated by the optical separator into light beams of a plurality of specified wavelength regions, and these separated light beams from the optical separator are subjected to a first stage of modulation by the first light modulation elements. The light beams from the first light modulation elements are combined together by the optical combiner device, and the combined light beam is incident upon the second light modulation element. The optical-image from the first light modulation elements is formed via the relay lens upon the light reception surface of the second light modulation element. The light from the optical combiner device is subjected to a second stage of modulation by the second light modulation element, by being reflected therefrom.

According to the first and second aspects of the present invention, the light from the light source is modulated via the first light modulation element and the second light modulation element. The beneficial result is therefore obtained that it is possible to implement a comparatively high luminance dynamic range and great number of gradations. Furthermore, since the second light modulation element is implemented as a reflective type light modulation element whose opening ratio is high, it is possible to ensure a certain luminance for the display image even if the alignment accuracy between the first light modulation element and the second light modulation element is not very high. Therefore, as compared with the conventional art, the beneficial result is obtained that it is possible to suppress deterioration of the luminance of the image to be displayed. Furthermore, since the optical image of the first light modulation element is formed upon the light reception surface of the second light modulation element via the relay lens, accordingly it is possible to form, in the first aspect, an optical image of the first light modulation element, and in the second aspect, optical images of the first light modulation elements, upon the light reception surface of the second light modulation element with comparatively good accuracy. Therefore, as compared with the conventional art, the beneficial result is obtained that the possibility of deterioration of the picture quality can be reduced. Moreover, since it is possible to manage without using a solid state laser or a semiconductor laser as the light source, the beneficial result is also obtained, as compared with the conventional art, that it is possible to anticipate an increase in the compactness of the device as a whole.

Here, the specified wavelength regions are not limited to being set to each of the three primary colors R, G, and B; according to requirements, it may be set in any manner which is desired. However, if they are set to the each of the three primary colors R, G, and B, it is possible to take advantage of liquid crystal light valves and the like which are already in production just as they are, so that a benefit is obtained from the point of view of cost. This beneficial feature is the same for the image display methods of the sixth, twelfth, and twenty-fourth aspects described below.

Yet further, the optical display device according to a third aspect of the present invention is the optical display device of the second aspect, further has a feature in that the second light modulation element is implemented with a reflective type liquid crystal display element.

According to this type of structure, the second light modulation element is implemented with a reflective type liquid crystal display element whose opening ratio is high. Accordingly, it is possible to ensure reasonable luminance for the image which is displayed even if the alignment accuracy between the first light modulation elements and the second light modulation element is not particularly high. Furthermore, it is possible to ensure the polarization characteristic in the light transmission between the first light modulation elements and the second light modulation element. Accordingly, the beneficial result is obtained that it is possible further to suppress the deterioration of the luminance of the image which is displayed.

Even further, the optical display device according to a fourth aspect of the present invention is the optical display device of the second aspect, further having a feature in that the second light modulation element is implemented with a DMD.

According to this type of structure, the second light modulation element is implemented with a DMD whose opening ratio is high. Accordingly, the beneficial result is obtained that it is possible to ensure reasonable luminance for the image to be displayed even if the alignment accuracy between the first light modulation elements and the second light modulation element is not particularly high. Furthermore, the beneficial result is also obtained that it is possible to perform digital driving of the second light modulation element.

Further, in order to achieve the above described objective, the light modulation method according to a fifth aspect of the present invention is a light modulation method in which light from a light source is modulated, comprising a first stage modulation step in which light from the light source is modulated by a first light modulation element, and a second stage modulation step in which light from the first light modulation element is modulated by a second light modulation element, wherein: the second light modulation element is a reflective type light modulation element; and upon the optical path between the first light modulation element and the second light modulation element, an optical image of the first light modulation element is formed upon the light reception surface of the second light modulation element via a relay lens.

According to this method, the same beneficial results are obtained as with the light modulation device of the first aspect.

Furthermore, in order to achieve the above described objective, the image display method according to a sixth aspect of the present invention in which light from a light source is modulated and displayed as an image, comprising: a light separation step in which light from the light source is separated by an optical separator into light beams of a plurality of specified wavelength regions which are different from one another; a first stage modulation step in which each of the separate light beams from the optical separator is modulated via a first light modulation element; a light combination step in which the separate light beams from the first light modulation elements are combined via an optical combiner device which combines light; and a second stage modulation step in which the light from the optical combiner device is modulated by a second light modulation device; wherein: the second light modulation element is a reflective type light modulation element; and, upon the optical path between the optical combiner device and the second light modulation element, the optical image of the first light modulation elements is formed upon the light reception surface of the second light modulation element via a relay lens.

According to this method, the same beneficial results are obtained as with the optical display device of the second aspect.

The light modulation device according to a seventh aspect of the present invention comprises a first light modulation element and a second light modulation element upon which light from the first light modulation element is incident and which modulates the light from a light source by the first light modulation element and the second light modulation element, wherein: the second light modulation element is implemented as a reflective type light modulation element; the second light modulation element is arranged so as to constitute an off-axis optical system in which a predetermined angle is defined between the optical axis of the light which is incident via the first light modulation element upon the second light modulation element and the optical axis of the incident light which is reflected by the second light modulation element and is emitted from the second light modulation element; and there is comprised an image transformation unit which applies distortion to the image which is formed by the first light modulation element, in correspondence to the predetermined angle.

According to this type of structure, a distortion is applied by the image transformation unit to the image which is formed by the first light modulation element in correspondence to the predetermined angle. The light from the light source is first stage modulated by the first light modulation element, while the light from the first light modulation element is incident upon the second light modulation element. At this time, although the image which is formed by the first light modulation element is formed slantingly with respect to the light reception surface of the second light modulation element, a distortion corresponding to the predetermined angle is applied by the image transformation unit. The image is formed, accordingly, with the distortion which is generated at the light reception surface of the second light modulation element being reduced. The light from the first light modulation element is second stage modulated by the second light modulation element, by this light from the first light modulation element being reflected.

The optical display device according to an eighth aspect of the present invention comprises: a light source; an optical separator which separates light from the light source into light beams of a plurality of specified wavelength regions which are different from one another; a plurality of first light modulation elements, upon each of which one of the light beams into which the light has been separated by the optical separator is incident; an optical combiner device which combines the separate light beams from the first light modulation elements; and a second light modulation element upon which the light from the optical combiner device is incident, the optical display device modulating the light from the light source by the first light modulation elements and the second light modulation element and displaying it as an image; wherein: the second light modulation element is implemented as a reflective type light modulation element; the second light modulation element is arranged so as to constitute an off-axis optical system in which a predetermined angle is defined between the optical axes of the light beams which are incident via the first light modulation elements upon the second light modulation element and the optical axis of the incident light which is reflected by the second light modulation element and is emitted from the second light modulation element, and-wherein the optical display device comprises an image transformation unit which applies distortion to the images which are formed by the first light modulation elements in correspondence to the predetermined angle.

According to this type of structure, distortion is applied by the image transformation unit to the image which is formed by the first light modulation elements in correspondence to the predetermined angle. The light from the light source is separated into light beams of the plurality of specified wavelength regions by the optical separator, with these light beams which have thus been separated by the optical separator being first stage modulated by the first light modulation elements. Next, the light beams from the first light modulation elements are combined together by the optical combiner device, and the combined light beam is incident upon the second light modulation element. Although the images which are formed by the first light modulation elements are formed slantingly with respect to the light reception surface of the second light modulation element, distortions corresponding to the predetermined angles are applied by the image transformation unit. Accordingly, the images are formed with the distortions which are generated at the light reception surface of the second light modulation element being reduced. Then, the light from the optical combiner device is second stage modulated by the second light modulation element, by this light from the optical combiner device being reflected.

According to the seventh and the eighth aspects, the light from the light source is modulated by the first light modulation element and the second light modulation element. The beneficial result is therefore obtained that it is possible to implement a comparatively high luminance dynamic range and great number of gradations. Furthermore, since the second light modulation element is implemented as a reflective type light modulation element which has a high opening ratio, it is possible to ensure a reasonable degree of luminance for the image which is displayed even if the accuracy of alignment between the first light modulation element and the second light modulation element is not extremely high. Accordingly, as compared with the conventional art, the beneficial result is also obtained that it is possible to suppress deterioration of the luminance of the image which is displayed. Moreover, even if the second light modulation element is arranged so as to constitute an off-axis optical system, it is nevertheless possible to form the image which is formed by the first light modulation element of the seventh aspect, and the images which are formed by the first light modulation elements in the eighth aspect, upon the light reception surface of the second light modulation element with little distortion. It is therefore possible to perform the second stage modulation at comparatively high accuracy. Therefore, as compared with the conventional art, the beneficial result is also obtained that the possibility of deterioration of the picture quality can be reduced. Moreover, since it is possible to manage without taking advantage of a solid state laser or a semiconductor laser as the light source, accordingly, as compared with the conventional art, the further beneficial result is obtained that it is possible to anticipate a reduction in the overall size of the device.

Furthermore, the optical display device according to ninth and twentieth aspects of the present invention is the optical display device of the aforementioned eighth and the nineteenth aspect of the present invention to be described hereinafter, respectively, further having a feature in that: the first light modulation elements are light modulation elements which comprise a plurality of picture elements whose optical propagation characteristics can be individually controlled; the second light modulation element is a light modulation element which comprises a plurality of picture elements whose optical propagation characteristics can be individually controlled; and the image transformation unit is arranged to determine one or the other of the optical propagation characteristics and the control values for the first light modulation elements, and the optical propagation characteristics and the control values for the second light modulation element, based upon a picture element correspondence relationship table in which are prescribed correspondence relationships between the picture elements of the first light modulation elements and the picture elements of the second light modulation element, in consideration of the distortions which correspond to the predetermined angles and the display data.

According to this type of structure, one or the other of the optical propagation characteristics and the control values for the first light modulation elements, and the optical propagation characteristics and the control values for the second light modulation element, is determined by the image transformation unit, based upon the picture element correspondence relationship table and upon the display data. The correspondence relationships between the picture elements of the first light modulation elements and the picture elements of the second light modulation element are prescribed in the picture element correspondence relationship table in consideration of the distortions which correspond to the predetermined angles. Accordingly, when controlling the first light modulation elements and/or the second light modulation element based upon the optical propagation characteristics, and/or the reflection characteristics, and/or the control values which have been determined, it is possible to apply distortion to the images which are formed by the first light modulation elements in correspondence to the predetermined angles.

Due to this structure, the beneficial result is obtained that it is possible to determine comparatively simply and easily either of the optical propagation characteristics and the control values for the first light modulation elements, and the optical propagation characteristics and the control values for the second light modulation element, in consideration of the distortions which corresponds to the predetermined angles.

In this connection, the HDR display data is image data which can implement a high luminance dynamic range which cannot be implemented by conventional image formats such as sRGB and the like. The HDR display data stores picture element values which specify the luminance levels of the picture elements for every picture element of the image. If the luminance level of the picture element (pixel) p in the HDR display data is termed Rp, the transmittivity ratio of the picture element of the first light modulation element which corresponds to the picture element p is termed T1, and the reflectivity ratio of the picture element of the second light modulation element which corresponds to the picture element p is termed T2, then the following Equations (1) and (2) hold:

$$Rp = Tp \times Rs \quad (1)$$

$$Tp = T1 \times T2 \times G \quad (2)$$

where, in the above Equations (1) and (2), Rs is the luminance of the light source and G is the gain, both of which are constants. Furthermore, Tp is the light modulation ratio.

From the above Equations (1) and (2), it will be understood that an infinity of possible combinations of T1 and T2 exist for the picture element p. However, T1 and T2 cannot just be determined at will. It is necessary to determine T1 and T2 appropriately in consideration of the picture quality, since, depending upon the method by which they are determined, the picture quality may be deteriorated.

From the cumulative results of assiduous investigations, the present inventors have determined that the following type of factor influences the deterioration of picture quality due to the method of determining T1 and T2.

If the first light modulation element and the second light modulation element have respective resolutions which are different, a single picture element p1 of the first light modulation element will overlap upon the optical path with a plurality of picture elements of the second light modulation element, and, conversely, a single picture element p2 of the second light modulation element will overlap upon the optical path with a plurality of picture elements of the first light modulation element. Thus, when the transmittivity ratio T1 is to be calculated for the picture element p1 of the first light modulation element, then it is contemplated to determine the reflectivity ratios T2 of the plurality of picture elements of the second light modulation element which overlap, and to calculate the average value or the like of these reflectivity ratios T2. This average value or the like which is regarded as the reflectivity ratio T2 of the picture element of the second light modulation element which corresponds to the picture element p1 in order to calculate the transmittivity ratio according to the Equations (1) and (2) above. However, since the average value or the like is chosen as being the reflectivity ratio T2 of the second light modulation element irrespective of circumstances, errors inevitably occur. These errors occur even if the transmittivity ratio T1 of the first light modulation element is determined first, and even if the reflectivity ratio T2 of the second light modulation element is determined first, i.e. they occur irrespective of the order of determination. One of the first light modulation element and the second light modulation element, which determines the display resolution, has great visual influence and, therefore, the one is preferable for which the errors are as small as possible.

Thus, it is investigated to see how the size of the error changes with a different order of determination. First, it is considered to determine the reflectivity ratios T2 of the second light modulation element first. For the transmittivity ratio T1 of a picture element p1 of the first light modulation element, the average value or the like of the reflectivity ratios T2 of the plurality of picture elements of the second light modulation element which overlap is calculated, and the transmittivity ratio T1 is calculated according to Equations (1) and (2) above, on the basis of the average value and the HDR display data. As a result, with respect to the transmittivity ratio T1 of the picture element p1 of the first light modulation element, an error arises in its transmittivity ratio T1 with respect to the reflectivity ratios T2 of the plurality of picture elements of the second light modulation element which overlap therewith. The extent of this error is, however, the error amount due to statistical calculation of the average value or the like. By contrast, with respect to the reflectivity ratio T2 of the picture element p2 of the second light modulation element, the reflectivity ratio T2 is calculated on the basis of the average value or the like of the transmittivity ratios T1 of the plurality of picture elements of the first light modulation element which overlap therewith. It may happen that a large error is generated in the average value or the like so that the Equations (1) and (2) above are not satisfied. It is considered that this is caused by the fact that even if, taking the picture element p1 as a reference, the relationships between the plurality of picture elements of the second light modulation element which overlap are prescribed (the relationships satisfied by Equations (1) and (2)), the converse relationships do not necessarily always hold. Accordingly, the possibility is high that the error in the reflectivity ratios T2 of the second light modulation element is the greater.

It is the same for the opposite case. That is, when the transmittivity ratios for the first light modulation element are determined first, then the possibility is high that the error in the transmittivity ratio T1 of the first light modulation element is the greater.

Due to the above facts, the conclusion is derived that, from the point of view of enhancement of the picture quality, the influence of errors should be smaller by determining later the reflectivity ratio or the transmittivity ratio (hereinafter termed the reflectivity ratio or the like) of the one of the first light modulation element and the second light modulation element which determines the display resolution.

Based upon the above conclusion, the optical display device according to tenth and twenty-first aspects of the present invention is the optical display device of the aforementioned ninth and the twentieth aspects of the present invention, wherein the second light modulation element is the light modulation element which determines the display resolution and further comprising: a reflection characteristic provisional determination unit which provisionally determines the reflection characteristics of the picture elements of the second light modulation element; an optical propagation characteristic determination unit which determines the optical propagation characteristics of the picture elements of the first light modulation elements based upon the reflection characteristics which have been provisionally determined by the reflection characteristic provisional determination unit and upon the display data; a first control value determination unit which determines control values for the picture elements of the first light modulation elements based upon the optical propagation characteristics which have been determined by the optical propagation characteristic determination unit; a reflection characteristic determination unit which determines the reflection characteristics of the picture elements of the second light modulation element based upon the optical propagation characteristics which have been determined by the optical propagation characteristic determination unit and upon the display data; and a second control value determination unit which determines control values for the picture elements of the second light modulation element based upon the reflection characteristics which have been determined by the reflection characteristic determination unit, wherein the image transformation unit is applied to any one of the optical propagation characteristic determination unit, the first control value determination unit, the reflection characteristic determination unit, and the second control value determination unit.

According to this type of structure, the reflection characteristics of the picture elements of the second light modulation element are provisionally determined by the reflection characteristic provisional determination unit. Next, the optical propagation characteristics of the picture elements of the first light modulation elements are determined by the optical propagation characteristic determination unit based upon the reflection characteristics of the second light modulation element which have thus been provisionally determined and upon the display data. Then, the control values for the picture elements of the first light modulation elements are determined by the first control value determination unit based upon the optical propagation characteristics of the first light modulation elements which have thus been determined. Subsequently, the reflection characteristics of the picture elements of the second light modulation element are determined by the reflection characteristic determination unit, based upon the optical propagation characteristics of the first light modulation elements which have been thus determined, and upon the display data. The control values for the picture elements of the second light modulation element are determined by the second control value determination unit based upon the reflection characteristics of the second light modulation element which have thus been determined.

In this structure, the reflection characteristics of the second light modulation element, which is the one which determines the display resolution, are determined subsequently to the determination of the optical propagation characteristics of the first light modulation element. It is possible, accordingly, to suppress the influence of errors, and the beneficial result is obtained that the possibility of deterioration of the picture quality can be reduced.

Here, the optical propagation characteristic is meant any characteristic which influences the propagation of light; for example, the characteristic for transmission of light, the reflection characteristic, the refraction characteristic, or some other propagation characteristic are all included in this concept. The same also holds for the optical display devices of the eleventh and the twenty-second aspects, and for the image display methods of the fifteenth, sixteenth, seventeenth, and eighteenth aspects described below.

Furthermore, the reflection characteristic determination unit may be built with any desired structure, provided that it is one which determines the reflection characteristics of the picture elements of the second light modulation element, based upon the optical propagation characteristics which have been determined by the optical propagation characteristic determination unit, and upon the display data. The optical propagation characteristic which is determined by the optical propagation characteristic determination unit is not limited to being exactly that; it may also be arranged to perform a calculation or a conversion based upon the optical propagation characteristic which has been determined by the optical propagation characteristic determination unit, and to determine the reflection characteristics of the picture elements of the second light modulation element based upon the result of this calculation, or upon the result of this conversion. As described, the control values which are determined by the first control value determination unit are determined based upon the optical propagation characteristics which are determined by the optical propagation characteristic determination unit. It is possible, therefore, for the reflection characteristic determination unit to determine the reflection characteristics of the picture elements of the second light modulation element, based upon, for example, the control values which have been determined by the first control value determination unit, and upon the display data.

Moreover, the optical display device according to eleventh and twenty-second aspects of the present invention is the optical display device of the aforementioned ninth and the twentieth aspects of the present invention, respectively, wherein the first light modulation element is the light modulation element which determines the display resolution and further comprising: an optical propagation characteristic provisional determination unit which provisionally determines the optical propagation characteristics of the picture elements of the first light modulation elements; a reflection characteristic determination unit which determines the reflection characteristics of the picture elements of the second light modulation element based upon the optical propagation characteristics which have been provisionally determined by the optical propagation characteristic provisional determination unit and upon the display data; a first control value determination unit which determines control values for the picture elements of the second light modulation element based upon the reflection characteristics which have been determined by the reflection characteristic determination unit; an optical propagation characteristic determination unit which determines the optical propagation characteristics of the picture elements of the first light modulation elements based upon the reflection characteristics which have been determined by the reflection characteristic determination unit and upon the display data; and a second control value determination unit which determines control values for the picture elements of the first light modulation elements based upon the optical propagation characteristics which have been determined by the optical propagation characteristic determination unit, wherein the image transformation unit is applied to any one of the reflection characteristic determination unit, the first control value determination unit, the optical propagation characteristic determination unit, and the second control value determination unit.

According to this type of structure, the optical propagation characteristics of the picture elements of the first light modulation elements are provisionally determined by the optical propagation characteristic provisional determination unit. Next, the reflection characteristics of the picture elements of the second light modulation element are determined by the reflection characteristic determination unit, based upon the optical propagation characteristics of the first light modulation elements which have thus been provisionally determined, and upon the display data. The control values for the picture elements of the second light modulation element are then determined by the first control value determination unit, based upon the reflection characteristics of the second light modulation element which have thus been determined. The optical propagation characteristics of the picture elements of the first light modulation elements are then determined by the optical propagation characteristic determination unit, based upon the reflection characteristics of the second light modulation element which have been thus determined, and upon the display data. The control values for the picture elements of the first light modulation elements are determined by the second control value determination unit, based upon the optical propagation characteristics of the first light modulation elements which have thus been determined.

In this structure, the optical propagation characteristics of the first light modulation elements, which are the ones which determine the display resolution, are determined subsequently to the determination of the reflection characteristics of the second light modulation element. It is possible, accordingly, to suppress the influence of errors, and the beneficial result is obtained that the possibility of deterioration of the picture quality can be reduced.

Here, the optical propagation characteristic determination unit may be built with any desired structure, provided that it is one which determines the optical propagation characteristics of the picture elements of the first light modulation elements, based upon the reflection characteristics which have been determined by the reflection characteristic determination unit, and upon the display data. The reflection characteristic which is determined by the reflection characteristic determination unit is not limited to being exactly that; it may also be arranged to perform a calculation or a conversion based upon the reflection characteristic which has been determined by the reflection characteristic determination unit, and to determine the optical propagation characteristics of the picture elements of the first light modulation elements based upon the result of this calculation, or upon the result of this conversion. The control values which are determined by the first control value determination unit are determined based upon the reflection characteristics which are determined by the reflection characteristic determination unit. It is possible, therefore, for the optical propagation characteristic determination unit to determine the optical propagation characteristics of the picture elements of the first light modulation elements, based upon, for example, the control values which have been determined by the first control value determination unit, and upon the display data.

Furthermore, a light modulation method according to a twelfth aspect of the present invention for modulating light from a light source comprising a first stage modulation step in which light from the light source is modulated by a first light modulation element, and a second stage modulation step in which the light from the first light modulation element is modulated by a second light modulation element, wherein the second light modulation element is a reflective type light modulation element arranged so as to constitute an off-axis optical system in which a predetermined angle is defined between the optical axis of the incident light which is incident upon the second light modulation element via the first light modulation element and the optical axis of the emitted light of the incident light which is reflected by the second light modulation element and which is emitted from the second light modulation element, and further including an image transformation step in which distortion is applied to the image which is formed by the first light modulation element in correspondence to the predetermined angle.

In this method, the same beneficial results are obtained as with the light modulation device according to the seventh aspect of the present invention.

Furthermore, an image display method according to a thirteenth aspect of the present invention for modulating light from a light source and for displaying as an image, comprising a light separation step in which light from the light source is separated by an optical separator into light beams of a plurality of different specified wavelength regions, a first stage modulation step in which the separated light beams from the optical separator are modulated by first light modulation elements, a light combination step in which the separate light beams from the first light modulation elements are combined together by an optical combiner device, and a second stage modulation step in which the light from the optical combiner device is modulated by a second light modulation element, wherein the second light modulation element is a reflective type light modulation element, and arranged so as to constitute an off-axis optical system in which a predetermined angle between the optical axis of the incident light which is incident upon the second light modulation element via the first light modulation elements and the optical axis of the emitted light of the incident light which is reflected by the second light modulation element and which is emitted from the second light modulation element, and by further including an image transformation step in which distortion is applied to the image which is formed by the first light modulation elements in correspondence to the predetermined angle.

In the method according to this aspect, the same beneficial results are obtained as with the optical display device according to the eighth aspect of the present invention.

Yet further, the image display method of fourteenth and twenty-sixth aspects of the present invention are respectively the image display method of the thirteenth and the twenty-fifth aspects, wherein: the first light modulation elements are light modulation elements which comprise a plurality of picture elements whose optical propagation characteristics can be individually controlled; the second light modulation element is a light modulation element which comprises a plurality of picture elements whose light reflection characteristics can be individually controlled; and the image transformation step determines one or the other of the optical propagation characteristics of and control values for the first light modulation elements, and the reflection characteristics of and control values for the second light modulation element, based upon a picture element correspondence relationship table in which are prescribed correspondence relationships between the picture elements of the first light modulation elements and the picture elements of the second light modulation element, in consideration of the distortion corresponding to the predetermined angle, and upon the display data.

In this method, the same beneficial results are obtained as with the optical display devices according to the ninth and the twentieth aspects of the present invention.

Still further, the image display method according to fifteenth and twenty-seventh aspects of the present invention is respectively the image display method of the fourteenth and the twenty-sixth aspects, wherein the second light modulation element is the light modulation element which determines the display resolution, and further including: a reflection characteristic provisional determination step in which the reflection characteristic of each picture element of the second light modulation element is provisionally determined; an optical propagation characteristic determination step in which the optical propagation characteristic of each of the picture elements of the first light modulation elements is determined based upon the reflection characteristics which have been provisionally determined in the reflection characteristic provisional determination step and upon the display data; a first control value determination step in which a control value is determined for each of the picture elements of the first light modulation elements based upon the optical propagation characteristics which were determined in the optical propagation characteristic determination step; a reflection characteristic determination step in which the reflection characteristic for each picture element of the second light modulation element is determined based upon the optical propagation characteristics which were determined in the optical propagation characteristic determination step and upon the display data; and a second control value determination step in which a control value is determined for each of the picture elements of the second light modulation element based upon the reflection characteristics which were determined in the reflection characteristic determination step; wherein the image transformation step is applied to any one of the optical propagation characteristic determination step, the first control value determination step, the reflection characteristic determination step, and the second control value determination step.

According to this method, the same beneficial results are obtained as with the optical display devices according to the tenth and the twenty-first aspects of the present invention.

Here, the reflection characteristic determination step may be performed by any convenient method, provided that it is one which determines the reflection characteristics of the picture elements of the second light modulation element, based upon the optical propagation characteristics which have been determined by the optical propagation characteristic determination step, and upon the display data. The optical propagation characteristic which is determined by the optical propagation characteristic determination step is not limited to being exactly that; it may also be arranged to perform a calculation or a conversion based upon the optical propagation characteristic which has been determined by the optical propagation characteristic determination step, and to determine the reflection characteristics of the picture elements of the second light modulation element based upon the result of this calculation, or upon the result of this conversion. The control values which are determined by the first control value determination step are determined based upon the optical propagation characteristics which are determined by the optical propagation characteristic determination step. It is therefore possible for the reflection characteristic determination step to determine the reflection characteristics of the picture elements of the second light modulation element, based upon the control values which have been determined by the first control value determination step, and upon the display data.

Still further, the image display method of sixteenth and twenty-eighth aspects of the present invention is respectively the image display method of the fourteenth and the twenty-sixth aspects, wherein the first light modulation elements are the light modulation elements which determine the display resolution; and further including: an optical propagation characteristic provisional determination step in which the optical propagation characteristics of each picture element of the first light modulation elements are provisionally determined; a reflection characteristic determination step in which the reflection characteristic of each of the picture elements of the second light modulation element is determined based upon the optical propagation characteristics which have been provisionally determined in the optical propagation characteristic provisional determination step and upon the display data; a first control value determination step in which a control value is determined for each of the picture elements of the second light modulation element based upon the reflection characteristics which were determined in the reflection characteristic determination step; an optical propagation characteristic determination step in which the optical propagation characteristics for each picture element of the first light modulation elements are determined based upon the reflection characteristics which were determined in the reflection characteristic determination step and upon the display data; and a second control value determination step in which a control value is determined for each of the picture elements of the first light modulation elements based upon the optical propagation characteristics which were determined in the optical propagation characteristic determination step; wherein the image transformation step is applied to any one of the reflection characteristic determination step, the first control value determination step, the optical propagation characteristic determination step, and the second control value determination step.

According to this method, the same beneficial results are obtained as with the optical display devices according to the eleventh and the twenty-second aspects of the present invention.

Here, the optical characteristic determination step may be performed by any convenient method, provided that it is one which determines the optical characteristic characteristics of the picture elements of the first light modulation elements, based upon the reflection characteristics which have been determined by the reflection characteristic determination step, and upon the display data. The reflection characteristic which is determined by the reflection characteristic determination step is not limited to being exactly that; it may also be arranged to perform a calculation or a conversion based upon the reflection characteristic which has been determined by the reflection characteristic determination step, and to determine the optical propagation characteristics of the picture elements of the first light modulation elements based upon the result of this calculation, or upon the result of this conversion. The control values which are determined by the first control value determination step are determined based upon the reflection characteristics which are determined by the reflection characteristic determination step. It is therefore possible for the optical propagation characteristic determination step to determine the optical propagation characteristics of the picture elements of the first light modulation elements, based upon, for example, the control values which have been determined by the first control value determination step, and upon the display data.

Furthermore, a light modulation device according to a seventeenth aspect of the present invention comprising a first light modulation element, a second light modulation element, and a relay lens which forms an optical image of the first light modulation element upon a light reception surface of the second light modulation element, the device modulating the light from a light source via the first light modulation element and the second light modulation element, wherein the second light modulation element is implemented as a reflective type light modulation element; and the first light modulation element, the relay lens, and the second light modulation element are arranged according to Scheimpflug's Rule.

According to this type of structure, the first stage modulation of the light from the light source is performed by the first light modulation element, and an optical image of the first light modulation element is formed upon the light-reception surface of the second light modulation element via the relay lens. The first light modulation element, the relay lens and the second light modulation element are arranged according to Scheimpflug's Rule. The image formation surface of the optical image of the first light modulation element therefore coincides with the light reception surface of the second light modulation element. The light from the first light modulation element is reflected by the second light modulation element and, thereby, the light from the first light modulation element is subjected to a second stage of modulation.

In addition, an optical display device according to an eighteenth aspect of the present invention comprises a light source, an optical separator which separates light from the light source into light beams of a plurality of different specified wavelength regions, a plurality of first light modulation elements upon which the light beams from the optical separator are incident, an optical combiner device which combines the light beams from the first light modulation elements together, a second light modulation element, and a relay lens which forms an optical image of the combined optical image of the optical combiner device upon a light reception surface of the second light modulation element, the optical display device modulating the light from the light source via the first light modulation element and the second light modulation element and displaying an image thereof, wherein: the second light modulation element is implemented as a reflective type light modulation element; and the first light modulation elements, the relay lens and the second light modulation element are arranged according to Scheimpflug's Rule.

According to this structure, the light from the light source is separated by the optical separator into light beams of a plurality of specified wavelength regions, and then the first stage modulation of these light beams which have been thus separated by the optical separator is performed by the first light modulation elements. Next, the light beams from the first light modulation elements are-combined together by the optical combiner device, and a combined optical image of the optical combiner device is formed upon the light reception surface of the second light modulation element via the relay lens. The first light modulation elements, the relay lens and the second light modulation element are arranged according to Scheimpflug's Rule. The image formation surfaces of the optical images of the first light modulation elements therefore coincide with the light reception surface of the second light modulation element. The light from the optical combiner device is reflected by the second light modulation element and, thereby, the light from the optical combiner device is subjected to a second stage of modulation.

According to the seventeenth and the eighteenth aspects of the present invention as described above, the light from the light source is modulated via the first light modulation element and the second light modulation element. The beneficial result is therefore obtained that it is possible to implement a comparatively high luminance dynamic range and great number of gradations. Furthermore, the second light modulation element is implemented as a reflective type optical modulation element which has a high opening ratio it is therefore possible to ensure a reasonable luminance for the image to be displayed, even if the alignment accuracy between the first light modulation element(s) and the second light modulation element is not particularly high. Accordingly the beneficial result is also obtained that, as compared with the conventional art, it is possible to suppress deterioration of the luminance of the image to be displayed. Furthermore, the image formation surface of the optical image of the first light modulation element in the seventeenth aspect, and the image formation surfaces of the optical image of the first light modulation elements in the eighteenth aspect coincide with the light reception surface of the second light modulation element. It is accordingly possible to suppress the generation of blurring in the optical image(s) which are formed upon the picture element surface of the second light modulation element. Therefore, the beneficial result is also obtained that, as compared with the conventional art, the possibility of deterioration of the picture quality is also reduced. Yet further, since it is possible to manage without using a solid state laser or a semiconductor laser as the light source, the beneficial result is also obtained that, as compared with the conventional art, it is possible to anticipate a reduction in the overall size of the device, and an increase in the luminance thereof.

The optical display device according to a nineteenth aspect of the present invention is the optical display device of the eighteenth aspect, further comprising an image transformation unit which applies a distortion to the image formed by the first light modulation elements corresponding to a predetermined angle defined between the optical axis of the incident light which is incident via the first light modulation elements upon the second light modulation element and the optical axis of the incident light which is reflected by the second light modulation element and is emitted from the second light modulation element.

According to this structure, a distortion is applied by the image transformation unit to the image which is formed by the first light modulation elements in correspondence with the predetermined angle. To this end, the image formed by the first light modulation elements is formed at a slanting angle with respect to the light reception surface of the second light modulation element, but they are formed with the amount of distortion which is generated at the light reception surface of the second light modulation element being relatively small.

Even though the second light modulation element is arranged so as to constitute an off-axis optical system, it is thereby possible to form the image formed by the first light modulation elements upon the light reception surface of the second light modulation element while introducing relatively little distortion. Accordingly, it becomes possible to perform the light modulation by the second light modulation element at high accuracy. Therefore, the beneficial result is obtained that the possibility of deterioration of the picture quality can be reduced.

Furthermore, a light modulation method according to a twenty-third aspect of the present invention for modulating a light from a light source, comprising:

a first stage modulation step in which light from the light source is modulated by a first light modulation element; an optical image formation step in which an optical image of the first light modulation element is formed upon the light reception surface of a second light modulation element via a relay lens; and a second stage modulation step in which light from the first light modulation element is modulated by the second light modulation element, wherein: the second light modulation element is a reflective type light modulation element; and the first light modulation element, the relay lens and the second light modulation element are arranged according to Scheimpflug's Rule.

According to this light modulation method, the same beneficial results are obtained as with the light modulation device according to the seventeenth aspect of the present invention.

Further, an image display method according to a twenty-fourth aspect of the present invention for modulating a light from a light source and displaying an image thereof comprising: a light separation step in which light from the light source is separated by an optical separator into a plurality of light beams of different specified wavelength regions; a first stage modulation step in which the each of the separated light beams from the optical separator is respectively modulated by one of a plurality of first light modulation elements; a light combination step in which the separate light beams from the plurality of first light modulation elements are combined together by an optical combiner device which combines light beams; an optical image formation step in which a combined optical image of the optical combiner device is formed upon the light reception surface of a second light modulation element via a relay lens; and a second stage modulation step in which light from the optical combiner device is modulated by the second light modulation element, wherein: the second light modulation element is a reflective type light modulation element; and the first light modulation elements, the relay lens and the second light modulation element are arranged according to Scheimpflug's Rule.

According to this image display method, the same beneficial results are obtained as with the optical display device of the eighteenth aspect of the present invention.

Furthermore, the image display method of a twenty-fifth aspect of the present invention is the image display method of the twenty-fourth aspect, further comprising an image transformation step in which a distortion which corresponds to a predetermined angle defined by the optical axis of the incident light which is incident upon the second light modulation element via the first light modulation elements, and the optical axis of the emitted light of the incident light which is reflected by the second light modulation element and which is emitted from-the second light modulation element, is applied to the image formed by the first light modulation elements.

According to this image display method, the same beneficial results are obtained as with the optical display device of the nineteenth aspect of the present invention.

DETAILED DESCRIPTION OF THE PREFERRED EMBODIMENTS

In the following, various preferred embodiments of the present invention will be described with reference to the drawings.

These preferred embodiments are ones in which the light modulation device, the optical display device, the light modulation method, and the image display method of the present invention are applied to a projection type display device.

Figure 1:
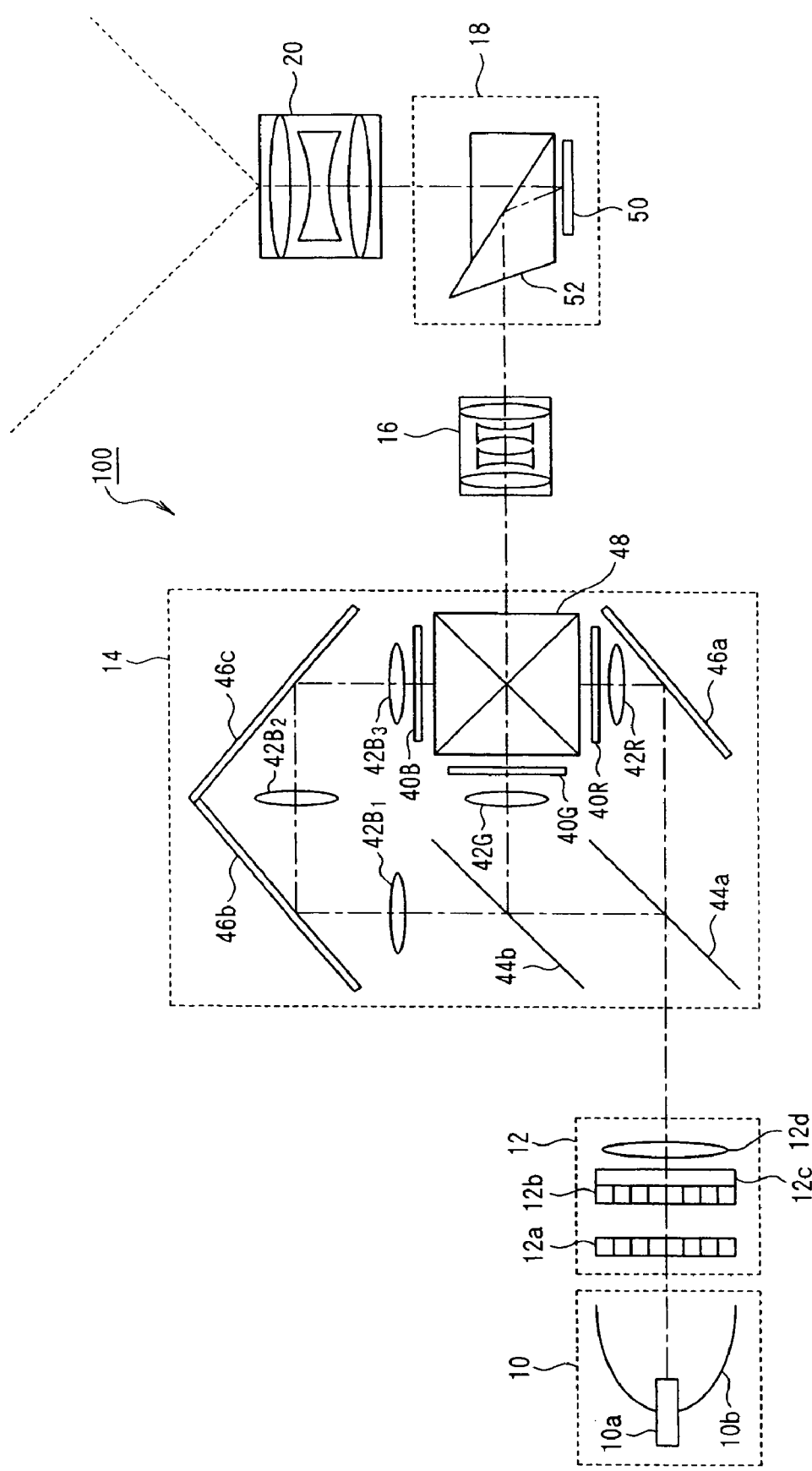
FIG. 1 is a block diagram showing a projection type display device according to a first preferred embodiment of the present invention.

The structure of a projection type display device 100 which incorporates the first preferred embodiment of the present invention will now be explained with reference to FIG. 1. FIG. 1 is a block diagram showing the hardware structure of this projection type display device 100.

This projection type display device 100, as shown in FIG. 1, comprises a light source 10, a luminance distribution uniformalization section 12, which makes uniform the luminance distribution of the light which is incident upon it from the light source 10, a color modulation section 14 which modulates the individual luminances in the three primary color wavelength regions R, G and B of the light which is incident upon it from the luminance distribution uniformalization section 12, a relay lens 16 which relays the light which is incident upon it from the color modulation-section 16, a luminance modulation section 18 which modulates the luminance in all wavelength regions of the light which is incident upon it from the relay lens 16, and a projection section 20 which projects the light which is incident upon it from the luminance modulation section 18 onto a screen (not shown in the drawings).

The light source 10 comprises a lamp 10a which is a high pressure mercury lamp or the like, and a reflector 10b which reflects the light which is emitted from the lamp 10a.

The color modulation section 14 comprises: three transmission type liquid crystal light valves 40R, 40G and 40B, in each of which a plurality of picture elements (pixels), the transmittivity ratio of each of which can be controlled individually, are arranged in a matrix configuration; five field lenses 42R, 42G and 42B$_1$ through 42B$_3$; two dichroic mirrors 44a and 44b; three mirrors 46a, 46b and 46c; and a dichroic prism 48. First, after the light from the luminance distribution uniformalization section 12 has been separated into its three primary colors R (red), G (green) and B (blue) by the dichroic mirrors 44a and 44b, it is then incident upon the transmission type liquid crystal light valves 40R through 40B via the field lenses 42R, 42G and 42B, through 42B$_3$ and the mirrors 46a and 46c. The luminance of these light beams of the three primary colors R, G and B into which the light has been separated is modulated by the respective transmission type liquid crystal light valves 40R through 40B, and then these light beams of the three primary colors R, G and B which have been modulated are combined by the dichroic prism 48 and are emitted to the relay lens 16.

The transmission type liquid crystal light valves 40R through 40B are active matrix type liquid crystal display elements in which a TN type liquid crystal is sandwiched between a glass substrate upon which there are formed, in a matrix configuration, picture element electrodes and switching elements for driving them, such as thin film transistor elements or thin film diodes or the like, and an another glass substrate upon which a common electrode is formed over its entire surface, with a polarization plate being provided upon the outer surface thereof. These transmission type liquid crystal light valves 40R through 40B may be driven in the normally white mode in which they are in the white/transparent (transmitting) state in the voltage non-applied state while they are in the black/dark (non-transmitting) state in the voltage applied state, or in the opposite mode thereto, i.e. in the normally black mode. Their gradation or tone stages between light and dark are analog controlled according to the control values which are supplied to them.

The dichroic prism 48 is a combination of four right-angled prisms which are glued together. In its interior, a multi-layered dielectric layer which reflects red colored light and a multi-layered dielectric layer which reflects blue colored light are provided to form a letter-X shape in its cross section. It is possible to combine light beams of the three primary colors R, G and B with these multi-layered dielectric layers.

The luminance modulation section 18 comprises a DMD 50 in which a plurality of picture elements (pixels) whose reflectivity ratios can be individually controlled are arranged in a matrix configuration. The DMD 50 has a higher resolution than the transmission type liquid crystal light valves 40R through 40B. The luminance modulation section 18 further includes a TIR prism 52. First, the light from the relay lens 16 is reflected by the TIR prism 52 and is incident upon the DMD 50, and the luminance of this incident light in all its wavelength regions is modulated by the DMD, and it is then reflected. And a predetermined component from among the reflected ray bundle is emitted towards the projection section 20 via the TIR prism 52.

Figure 31:
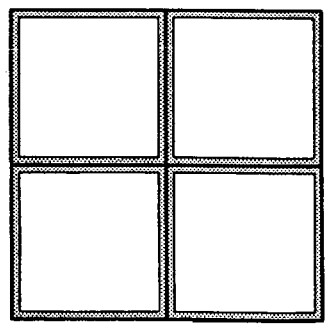
FIG. 31 is a figure showing the picture element surface of the picture elements of a conventional reflective type light modulation element.

The DMD 50 is a device which performs modulation by acting as a mirror to time control the direction of reflection of the ray bundle, or, to put it in another manner, by time control switching between the state of transmitting the light or the state of intercepting it. Its gradations between light and dark are digitally controlled according to a control value which is supplied. If each of the picture elements of the DMD 50 performs control in units of predetermined frames, then, for example, if control is performed so as to reflect the light which is incident towards the projection section 20 over just half the time interval for a single frame, then the luminance of the picture element becomes ½. Furthermore, in the DMD 50, the light intercepting regions such as the signal lines and the drive transistors and so on are formed under the reflecting picture element electrode, thereby its opening ratio is large, as shown in FIG. 31. The luminance of the display image is therefore not deteriorated, even if something of an alignment error is present with respect to the transmission type liquid crystal light valves 40R through 40B and the relay lens 16; and it also has the characteristic that moire patterns are not particularly conspicuous.

Figure 2A:
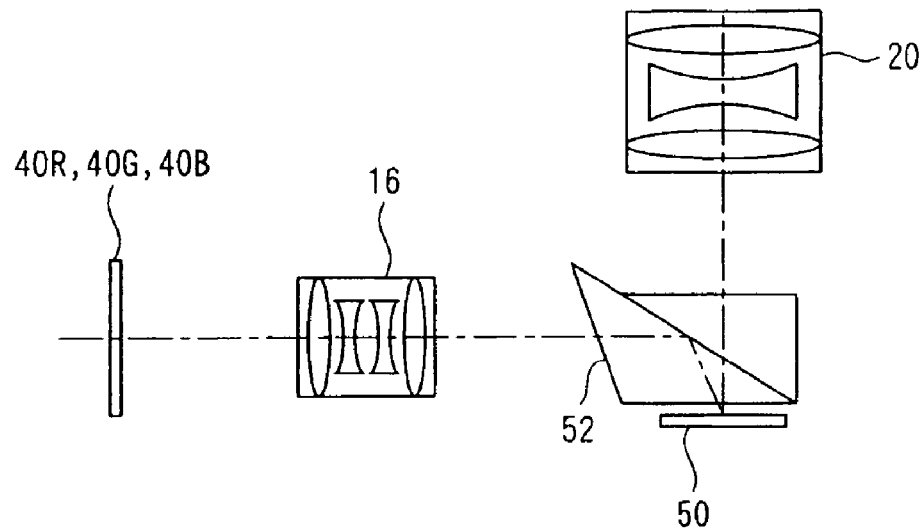
FIGS. 2A and 2B are figures showing the image formation relationship between transmission type liquid crystal light valves and a DMD which are used in the first preferred embodiment of the present invention.
Figure 2B:
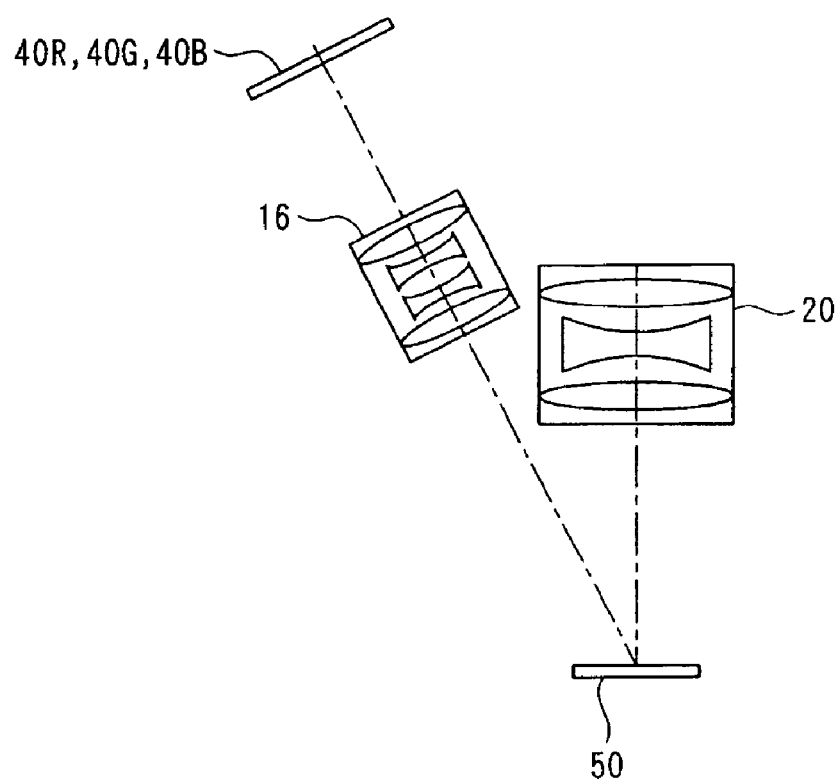
Figure 3:
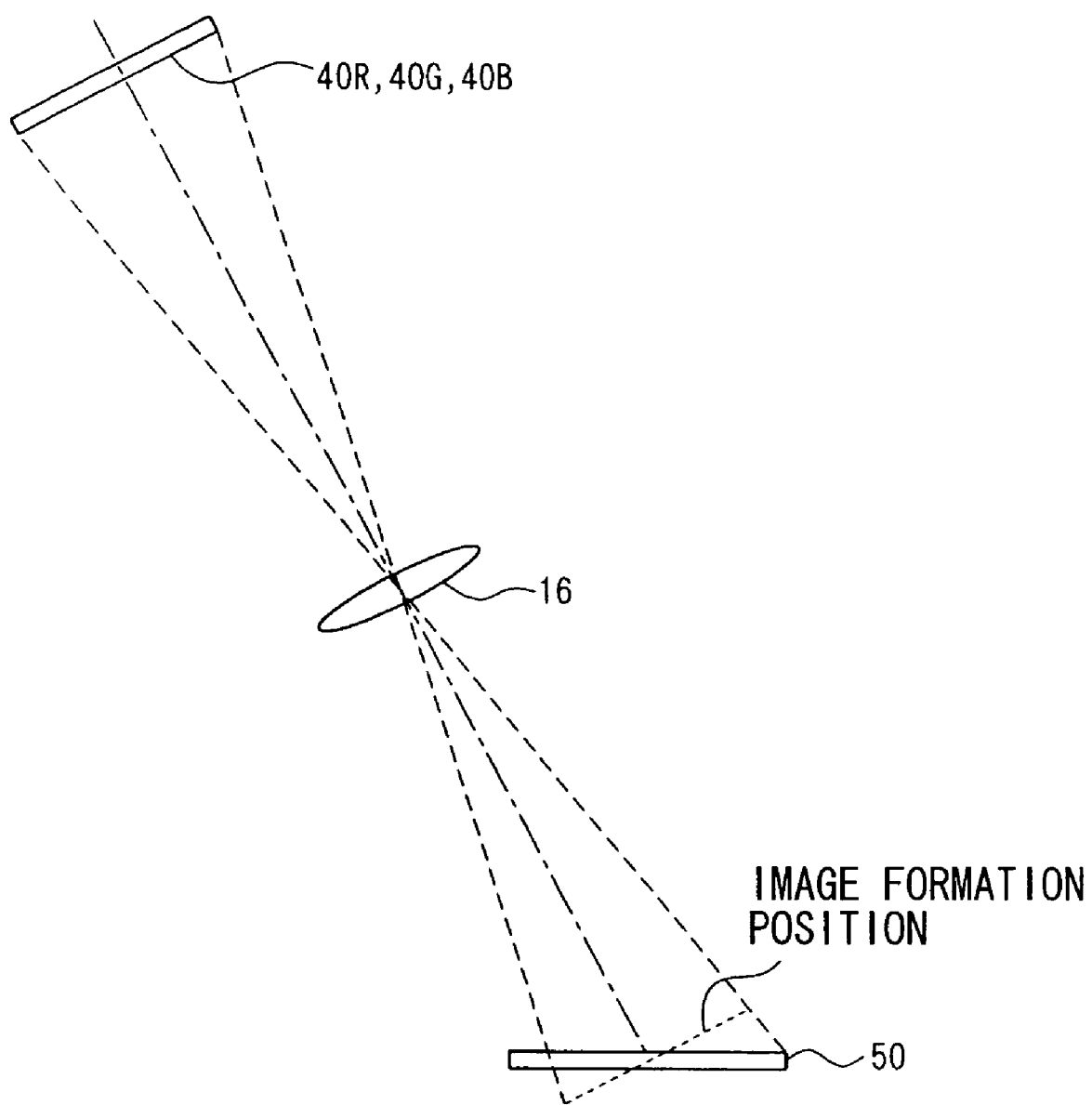
FIG. 3 is another figure showing the image formation relationship between transmission type liquid crystal light valves and a DMD which are used in the first preferred embodiment of the present invention.

FIGS. 2A, 2B, and 3 are figures showing the image formation relationship between the transmission type liquid crystal light valves 40R through 40B and the DMD 50. In these figures, the three transmission type liquid crystal light valves 40R through 40B have been replaced by a single transmission type liquid crystal light valve, and the dichroic prism 48 has been omitted in order to facilitate the explanation. Furthermore, in FIG. 3, a single lens is shown as a substitute for the relay lens 16 in order to simplify the drawing.

FIG. 2A is a figure which shows in schematic form the portion between the transmission type liquid crystal light valves 40R through 40B and the DMD 50 shown in FIG. 1.

The TIR prism 52 is positioned between the relay lens 16 and the DMD 50, but this TIR prism is a device which is used for enhancing the contrast characteristics of the optical system in which the DMD 50 is utilized, and it does not exert any influence upon the image formation relationship between the transmission type liquid crystal light valves 40R through 40B and the DMD 50. In this connection, if the TIR prism 52 were also to be omitted, then the image formation relationship between the transmission type liquid crystal light valves 40R through 40B and the DMD 50 would become as shown in FIG. 2B, and the DMD 50 would be positioned so as to constitute an off-axis optical system which made a predetermined angle with the optical axis of the incident light from the relay lens 16 and the optical axis of the emitted light from the projection section 20. In other words, the DMD 50 is arranged directly in front of the projection section 20, and the transmission type liquid crystal light valves 40R through 40B and the relay lens 16 are arranged slantingly with respect to the DMD 50, so that the light strikes it at a predetermined angle of incidence. With these arrangements, the optical image of the transmission type liquid crystal light valves 40R through 40B is formed via the relay lens 16 in a position which is shown by the dotted lines in FIG. 3, and the light intensity distribution which is formed upon the surfaces of the picture elements of the DMD 50 does not agree with the light intensity distribution which is created by the transmission type liquid crystal light valves 40R through 40B.

This situation will now be explained in detail using FIGS. 4A through 4D.

FIGS. 4A through 4D are figures showing the image formation relationship between the three transmission type liquid crystal light valves 40R through 40B and the DMD 50.

Figure 4A:
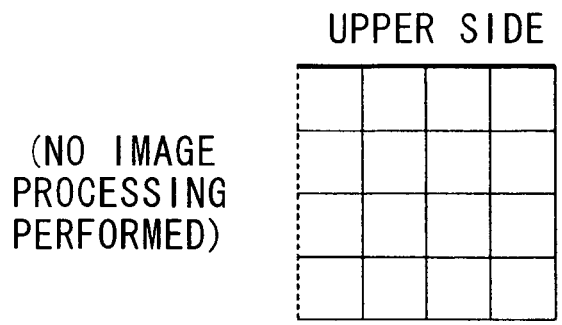
FIGS. 4A, 4B, 4C, and 4D are further figures showing the image formation relationship between transmission type liquid crystal light valves and a DMD which are used in the first preferred embodiment of the present invention.

Now, it is assumed that a grid-like image shown in FIG. 4A is formed by the transmission type liquid crystal light valves 40R through 40B and an attempt is made to form the grid-like image as an inverted image upon the picture elements of the DMD 50 via the relay lens 16. Since the DMD 50 is positioned so as to constitute an off-axis optical system, the image which is formed upon the picture elements of the DMD 50 will become one which is distorted into a trapezoidal shape as shown in FIG. 4B (the upper side portion in FIG. 4A is compressed to form the lower side portion in FIG. 4B, while the lower side portion is stretched), which is undesirable.

Figure 4B:
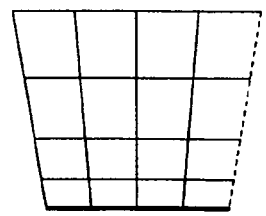
Figure 4C:
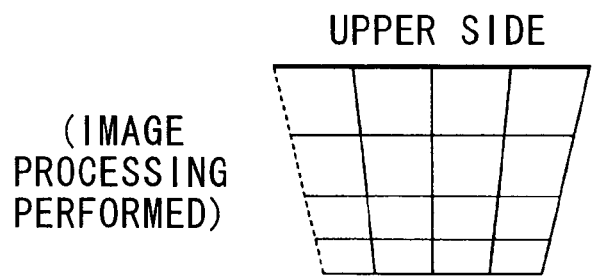
Figure 4D:
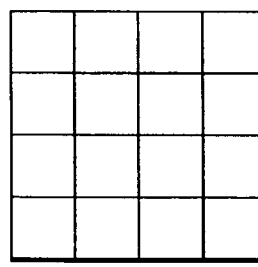

In this connection, when it is desired to form the image of FIG. 4A which has no distortion upon the picture elements of the DMD 50, image processing is performed upon the image which is formed by the transmission type liquid crystal light valves 40R through 40B in order to correct the distortion which is created at the picture element surface of the DMD 50 and form an image which, as shown in FIG. 4C, has a trapezoidally shaped distortion in the opposite direction to FIG. 4B. Then, it is possible to form an image which has no distortion upon the picture element surface of the DMD 50, as shown in FIG. 4D, as originally desired. This image processing will be described in detail hereinafter.

The luminance distribution uniformalization section 12 comprises two fly-eye lenses 12a and 12b, a polarization conversion element 12c and a condensing lens 12d. The luminance distribution from the light source 10 is uniformalized by the fly-eye lenses 12a and 12b. This light which has been uniformalized is polarized by the polarization conversion element 12c in a direction of polarization which is suitable for being incident upon the color modulation light valve. The light thus polarized is emitted towards the color modulation section 14 after having been focused by the condensing lens 12d.

The polarization conversion element 12c, for example, may be made as a PBS array with a ½ wavelength plate. A ½ wavelength plate is a device which converts the linear polarization into a linear polarization which is orthogonal thereto.

Figure 5:
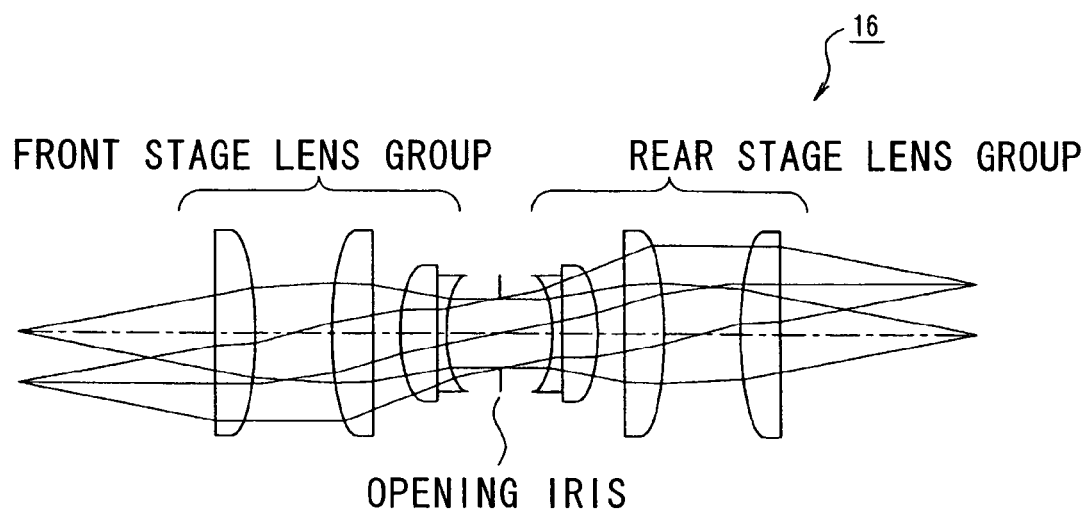
FIG. 5 is a figure showing the structure of a relay lens which is used in the first preferred embodiment of the present invention.

FIG. 5 shows the structure of the relay lens 16.

The relay lens 16 is a device which forms an optical image of each of the transmission type liquid crystal light valves 40R through 40B upon the picture element surface of the DMD 50. As shown in FIG. 5, it is an equi-magnification image formation lens which consists of a front stage lens group and a rear stage lens group which are arranged almost symmetrically with respect to an opening iris. The front stage lens group and the rear stage lens group each consists of a plurality of convex lenses and a single concave lens. However, the shapes of the lenses, their sizes, the intervals at which they are spaced out, their number, their telecentricities, their magnification ratios, and their other lens characteristics are parameters which can be varied as appropriate for the resultant characteristics which are required. These parameters are therefore not to be considered as being limited to those shown in FIG. 5 by way of example.

Figure 6:
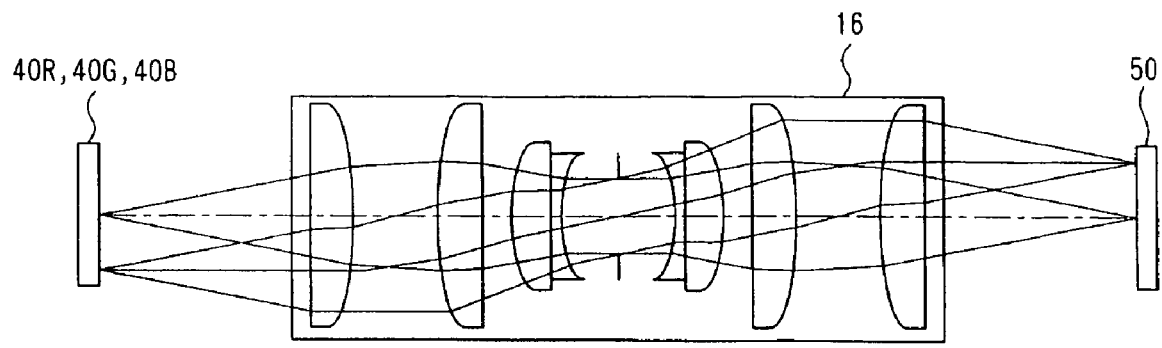
FIG. 6 is a figure showing the operating theory of this relay lens which is used in the first preferred embodiment of the present invention.

FIG. 6 shows the operating theory of the relay lens 16.

Since, as shown in this figure, an equi-magnification image formation lens is typically used for the relay lens 16, the optical images of the transmission type liquid crystal light valves 40R through 40B create inverted images upon the picture element surface of the DMD 50. Furthermore, since the relay lens 16 is made up from multiple lenses, its aberration compensation is good, it is capable of transmitting the luminance distribution which is created by each of the transmission type liquid crystal light valves 40R through 40B accurately to the DMD 50.

On the other hand, the projection type display device 100 comprises a display control device 200 (see FIG. 7) which controls the transmission type liquid crystal light valves 40R through 40B and the DMD 50. In the following, the transmission type liquid crystal light valves 40R through 40B will be abbreviated as "color modulation light valves", and the DMD 50 will be termed "a luminance modulation element." Furthermore, in this preferred embodiment, the luminance modulation elements determine the display resolution (the so called resolution which an observer is aware of when he looks at the display image of the projection type display device 100).

Next, the display control device 200 will be explained in detail with reference to FIGS. 7 through 11.

Figure 7:
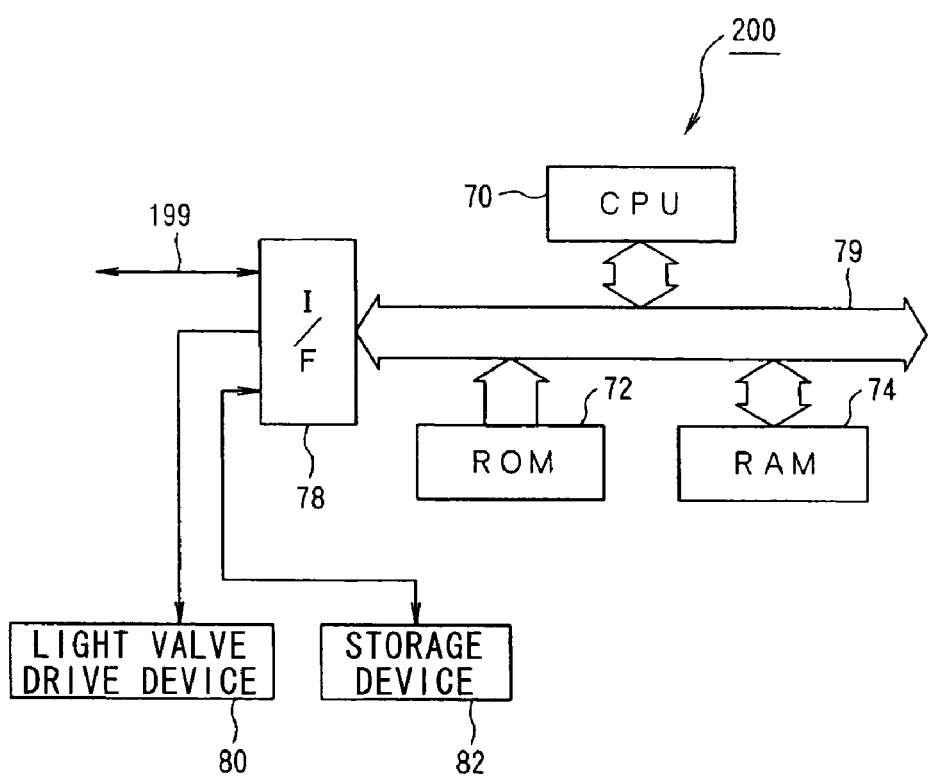
FIG. 7 is a block diagram showing the hardware structure of a display control device of the first preferred embodiment of the present invention.

FIG. 7 is a block diagram showing the hardware structure of the display control device 200.

This display control device 200 comprises a CPU 70 which, based upon a control program, performs calculations and controls the entire system, a ROM 72 which stores the control program for the CPU 70 and the like in advance in a predetermined region thereof, a RAM 74 for storing the data which is read out from the ROM 72 and the like and the results of calculations which are required for the calculation processes of the CPU 70, and an interface (I/F) 78 which mediates input and output of data to and from external devices. These are mutually connected together so as to be able to interchange data by a bus 79, which is a signal line for transmitting data.

To the I/F 78, as external devices, there are connected a light valve drive device 80 which drives the color modulation light valve and the luminance modulation element, a storage device 82 which stores data and tables and the like as files, and signal lines for connecting to an external network 199.

The storage device 82 stores HDR display data. HDR display data is image data which can implement a high luminance dynamic range which cannot be realized with a conventional image format such as sRGB or the like, in which picture element (pixel) values which give the luminance levels for the picture elements (pixels) are stored for all the picture elements of the image. At the present, in particular in the CG world, it is used for combining CG objects with actual scenery. Although various image formats exist, there are many formats which store picture element values in floating point format in order to implement a higher luminance dynamic range than the conventional art sRGB format or the like. Furthermore, it is characterized that the value to be stored is related to the physical radiance (radiance=W/(sr.m$^2$)) which does not take into consideration the visual characteristics of the human eye, and to the luminance (luminance=cd/m$^2$) which does take into consideration the visual characteristics of the human eye. In this first preferred embodiment, a format is employed in which picture element values which give the radiance level for each single picture element in each of the three primary colors R, G and B are stored as floating point values as the HDR display data. For example, the values (1.2, 5.4, 2.3) may be stored as the picture element values for a single picture element (pixel).

HDR display data is generated by photographing an HDR image of a high luminance dynamic range. However, with current film cameras and still cameras, it is not possible to photograph an HDR image of high luminance dynamic range in the natural world all at once. Thus, a single HDR image is generated from a plurality of photographic images whose exposures have been changed by some method. It should be understood that, with regard to the details o the method of generating such HDR display data, these are disclosed in, for example, P. E. Debevec, J. Malik, "Recovering High Dynamic Range Radiance Maps From Photographs", Proceedings of ACM SIGGRAPH97, pp. 367-378 (1997).

The storage device 82 stores a respective control value recording table 400R, 400G and 400B for each of the color modulation light valves 40R, 40G and 40B, with the control values of these color modulation light valves being respectively recorded in these tables.

Figure 8:
FIG. 8 is a figure showing the data structure of a control value recording table of the first preferred embodiment of the present invention.

FIG. 8 is a figure showing the data structure of the control value recording table 400R for red color.

As shown in this figure, a single record is stored in this control value recording table 400R for each control value for the transmission type liquid crystal light valve 40R. Each of these records contains a field for storing the control value for the transmission type liquid crystal light valve 40R, and a field for storing the transmittivity ratio of the transmission type liquid crystal light valve 40R.

In the example shown in FIG. 8, in the first record, "0" is stored as the control value, and "0.004" is stored as the transmittivity ratio. This indicates that, when the control value "0" is outputted to the transmission type liquid crystal light valve 40R, the transmittivity ratio of said transmission type liquid crystal light valve 40R is 0.4%. It should be understood that although, in FIG. 8, the number of gradations for the color modulation light valve is shown by way of example as being expressed by four bits (which represent the values 0 through 15), in actual practice, the number of records corresponds to the number of gradations for the color modulation light valve. For example, if the number of gradations is expressed by eight bits, then 256 records are stored.

Moreover, although the details of the data structure of the control value recording tables 400G and 400B are not particularly shown in the figures, they have the same data structure as the control value recording table 400R. However, they differ from the control value recording table 400R in that the transmittivity ratios which correspond to the same control value are different.

Figure 9:
FIG. 9 is a figure showing the data structure of another control value-recording table of the first preferred embodiment of the present invention.

Furthermore, the storage device 82 stores a control value recording table 420 in which the control values of luminance modulation elements are stored. FIG. 9 is a figure showing the data structure of the control value recording table 420.

As shown in this figure, in this control value recording table 420, there is recorded a single record for each control value of the luminance modulation element. Each of these records contains a field for storing the control value for the luminance modulation element, and a field for storing the reflectivity ratio of the luminance modulation element.

In the example shown in FIG. 9, in the first record, "0" is stored as the control value, and "0.003" is stored as the reflectivity ratio. This indicates that, when the control value "0" is outputted to the luminance modulation element, the reflectivity ratio of said luminance modulation element is 0.3%. It should be understood that although, in FIG. 9, the number of gradations for the luminance modulation element is shown by way of example as being expressed by four bits (which represent the values 0 through 15), in actual practice, the number of records corresponds to the number of gradations for the luminance modulation element. For example, if the number of gradations is expressed by eight bits, then 256 records are recorded.

Furthermore, the storage device 82 also stores a picture element correspondence relationship table, which prescribes the correspondence relationship between the picture elements of the color modulation light valves after distortion generated at the picture element surface of the DMD 50 has been corrected, and the picture elements of the luminance modulation element.

Next, the structure of the CPU 70 and the procedures which are executed by the CPU 70, will be explained.

Figure 10:
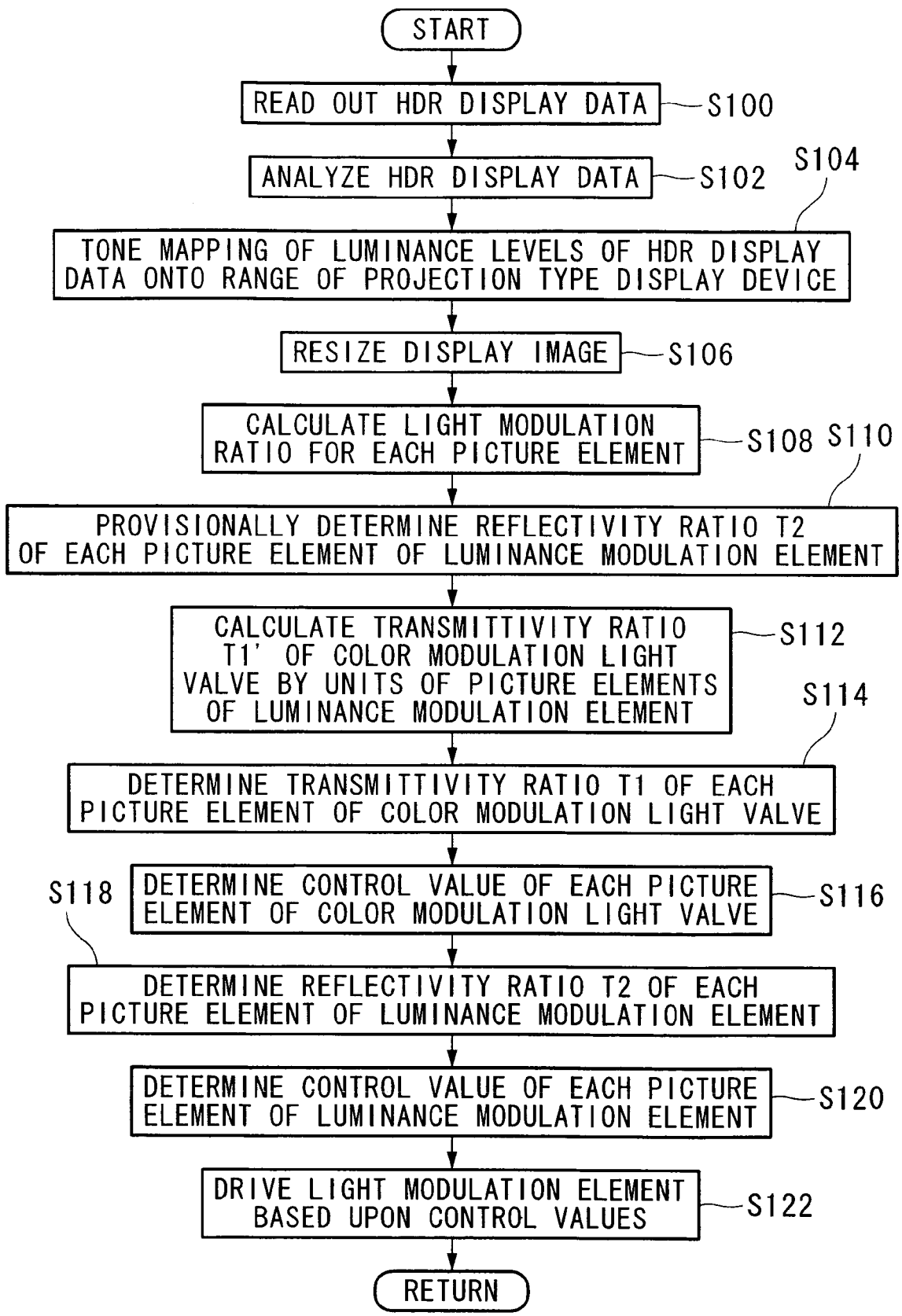
FIG. 10 is a flow chart showing a display control procedure which is used in the first preferred embodiment of the present invention.

The CPU 70 comprises a microprocessing unit (MPU) or the like, and it is arranged to execute the display control procedure which is shown in the flow chart of FIG. 10 according to a predetermined program stored in a predetermined region of the ROM 72.

FIG. 10 is a flow chart showing this display control procedure.

This display control procedure is a procedure which determines the control values for the color modulation light valves and the luminance modulation element based upon the HDR display data. The procedure also includes driving the color modulation light valves and the luminance modulation element based upon the control values thus determined; and, as shown in FIG. 10, when this display control procedure is executed by the CPU 70, the flow of control starts at a step S100.

In the step S100, the HDR display data is read out from the storage device 82. Next, proceeding to the step S102, the HDR display data which has been read out is analyzed, and a histogram of the picture element values and the maximum value, the minimum value and the average value and the like of the luminance level are calculated. These results of analysis are for brightening up a dark scene, for darkening a scene that is too bright, for use in automatic image correction such as strengthening intermediate contrast and the like, and for use in tone mapping.

Next, proceeding to the step S104, based upon the result of the analysis in the step S102, the luminance levels of the HDR display data are tone mapped onto the luminance dynamic range of the projection type display device 100.

Figure 11:
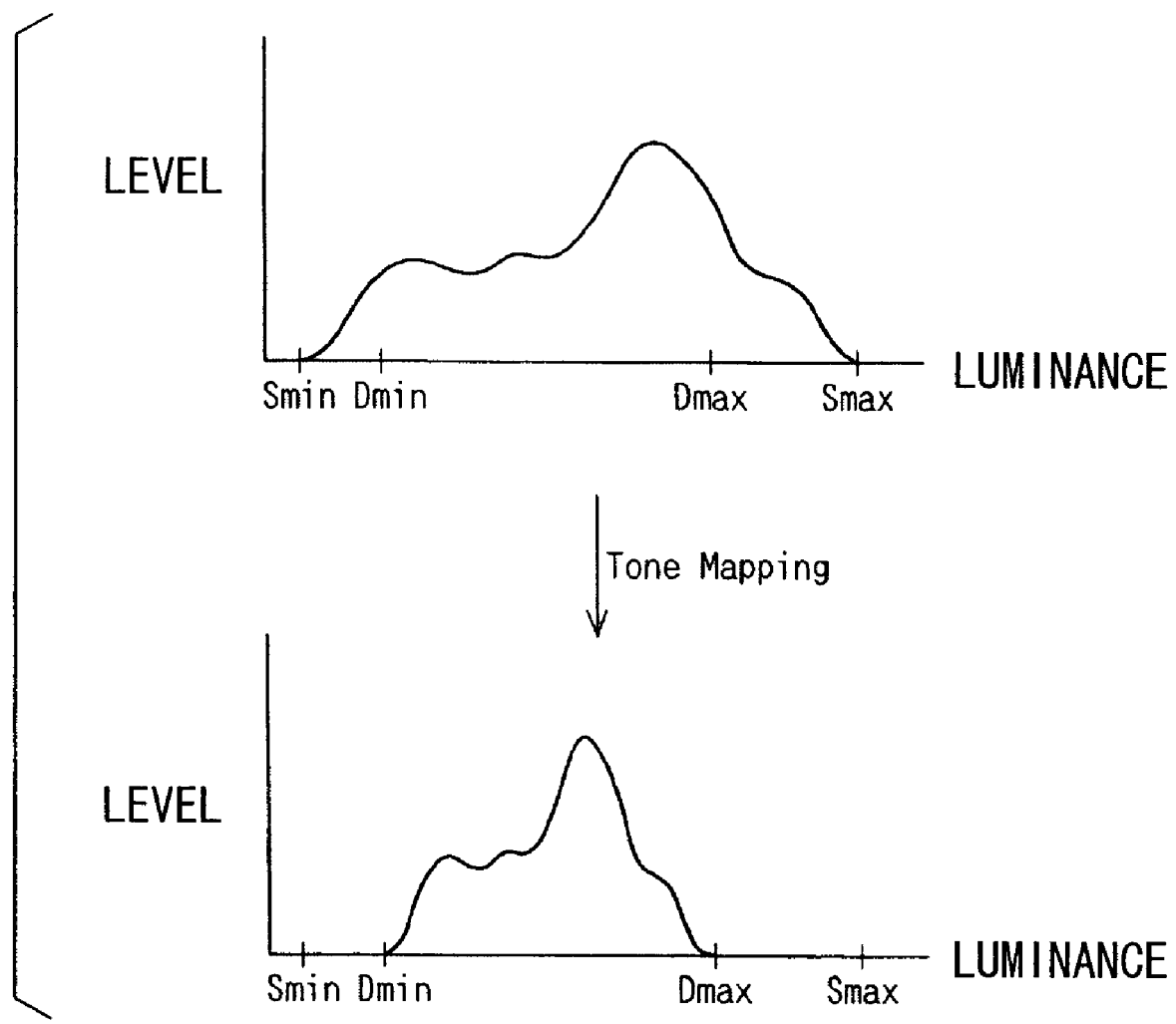
FIG. 11 is a figure for explanation of a tone mapping procedure which is used in the first preferred embodiment of the present invention.

FIG. 11 is a figure for explanation of the tone mapping procedure.

It will be supposed that the result of analyzing the HDR display data is that the minimum value of the luminance level included in the HDR display data is Smin, and the maximum value thereof is Smax. Furthermore, it will be supposed that the minimum value of the luminance dynamic range of the projection type display device 100 is Dmin, and the maximum value thereof is Dmax. In the example shown in FIG. 11, Smin is smaller than Dmin, and Smax is smaller than Dmax, so that it is not possible to display the HDR display data appropriately just as it stands. Thus, the histogram from Smin to Smax is normalized so as to include the range from Dmin to Dmax.

It should be understood that, with regard to the details of this tone mapping, these have been published, for example, in "F. Drago, K. Myszkowski, T. Annen, & N. Chiba, "Adaptive Logarithmic Mapping For Displaying High Contrast Scenes", Eurographics 2003 (2003).

Next, proceeding to the step S106, the HDR image is resized (magnified or shrunk) in concordance with the resolution of the luminance modulation element. At this time, the HDR image is resized while keeping the aspect ratio of the HDR image just as it is without alteration. As a method for performing this resizing, for example, there may be suggested the average value method, the intermediate value method or the Nearest Neighbor method.

Next, proceeding to the step S108, a light modulation ratio Tp is calculated for each of the picture elements of the resized image according to Equation (1) below, details of which has been explained hereinbefore, based upon the luminance level Rp of each of the picture elements of the resized image and upon the luminance Rs of the light source 10.

$$Rp = Tp \times Rs \quad (1)$$

Next, proceeding to the step S110, the reflectivity ratio T2 of each of the picture elements of the luminance modulation element is provisionally determined by proffering an initial value (for example, 0.2) as the reflectivity ratio T2 of each picture element of the luminance modulation element.

Next, proceeding to the step S112, the transmittivity ratio T1' of the color modulation light valve is calculated by units of picture elements of the luminance modulation element, based upon the light modulation ratio Tp, and the reflectivity ratio T2 and the gain G which have been provisionally determined, according to Equation (2) below, details of which has been explained hereinbefore.

$$Tp = T1 \times T2 \times G \quad (2)$$

Next, proceeding to the step S114, for each of the picture elements of the color modulation light valve, the weighted average value of the transmittivity ratios T1' which have been calculated for the picture elements of the luminance modulation element which are overlapped upon the optical path of that picture element is calculated as the transmittivity ratio T1 of that picture element. The weighting is performed according to the area ratios of the overlapped picture elements. Furthermore, the correspondence relationship between the picture elements may be determined by reference to a picture element correspondence relationship table in the storage device 82.

Next, proceeding to the step S116, for each of the picture elements of the color modulation light valve, the control value which corresponds to the transmittivity ratio T1 which has been calculated for that picture element is read out from the control value recording tables 400R through 400B. The read out control value is determined as being the control value for that picture element. In the reading out of the control value, the transmittivity ratio which most closely approximates to the transmittivity ratio T1 which has been calculated is searched for in the control value recording tables 400R through 400B, and then the control value which corresponds to the transmittivity ratio found by the search is read out. This search may be implemented, for example, as a high speed search which is performed by utilizing a bisection searching method.

Next, proceeding to the step S118, for each of the picture elements of the luminance modulation element, the weighted average value of the transmittivity ratios T1 which have been determined for the picture elements of the color modulation light valve which are overlapped upon the optical path of that picture element is calculated. Then, the reflectivity ratio T2 of that picture element is calculated according to Equation (2) above, based upon the average value which has been calculated, and upon the light modulation ratio Tp and the gain G which were calculated in the step S108. The weighting is performed according to the area ratios of the overlapped picture elements. Furthermore, the correspondence relationship between the picture elements may be determined by reference to the picture element correspondence relationship table in the storage device 82.

Next, proceeding to the step S120, for each of the picture elements of the luminance modulation element, the control value which corresponds to the reflectivity ratio T2 which has been calculated for that picture element is read out from the control value recording table 420. Those read out control value is determined as being the control value for that picture element. In the reading out of the control value, that reflectivity ratio which most closely approximates to the reflectivity ratio T2 is searched for in the control value recording table 420, and the control value which corresponds to the reflectivity ratio which has been found by the search is read out. This search may be implemented, for example, as a high speed search which is performed by utilizing a bisection searching method.

Next, proceeding to the step S122, the control values which have been determined in the steps S116 and S120 are outputted to the light valve drive device 80, and a display image is projected by driving each of the color modulation light valves and the luminance modulation element. Thus, this sequence of processes is completed and the system returns to the original procedure.

The operation of this preferred embodiment of the present invention will now be explained in concrete terms with reference to FIGS. 12A, 12B, 13, 14A through 14C, 15A and 15B.

It should be understood that, in this preferred embodiment, the color modulation light valve is made up from the three transmission type liquid crystal light valves 40R through 40B while the following explanation applies to each of the three primary colors R, G and B. The basic concepts of operation are all the same, with the objective of preventing the explanation becoming cumbersome, the explanation will be made in terms of replacing the three transmission type liquid crystal type light valves 40R through 40B with a single transmission type liquid crystal light valve.

In the following, by way of example, the explanation will be provided in terms of the case in which the luminance modulation element has a resolution of 18 picture elements horizontally and 12 picture elements vertically and has a number of gradations expressed by 4 bits, while each of the color modulation light valves has a resolution of 15 picture elements horizontally and 10 picture elements vertically and also has a number of gradations expressed by 4 bits. Furthermore, each of the plan views of the luminance modulation element and the color modulation light valves in FIGS. 12A through 15B is a plan view in the state as seen from the side of the light source 10.

In the steps S100 through S104, the HDR display data is read out by the display control device 200 and analyzed. Based upon the results of this analysis, the luminance levels of the HDR display data are tone mapped into the luminance dynamic range of the projection type display device 100. Next, the flow of control proceeds to the step S106, and the HDR image is resized to match the resolution of the luminance modulation element.

Next, proceeding to the step S108, the light modulation ratios Tp are calculated for each of the picture elements of the resized image. For example, if the luminance levels Rp (R, G, B) of the picture element p are (1.2, 5.4, 2.3), and the luminance Rs of the light source 10 (R, G, B) is (10,000, 10,000, 10,000), then the light modulation ratios Tp of the picture element of the resized image are (1.2, 5.4, 2.3)/(10, 000, 10,000, 10,000)=(0.00012, 0.00054, 0.00023).

Figure 12A:
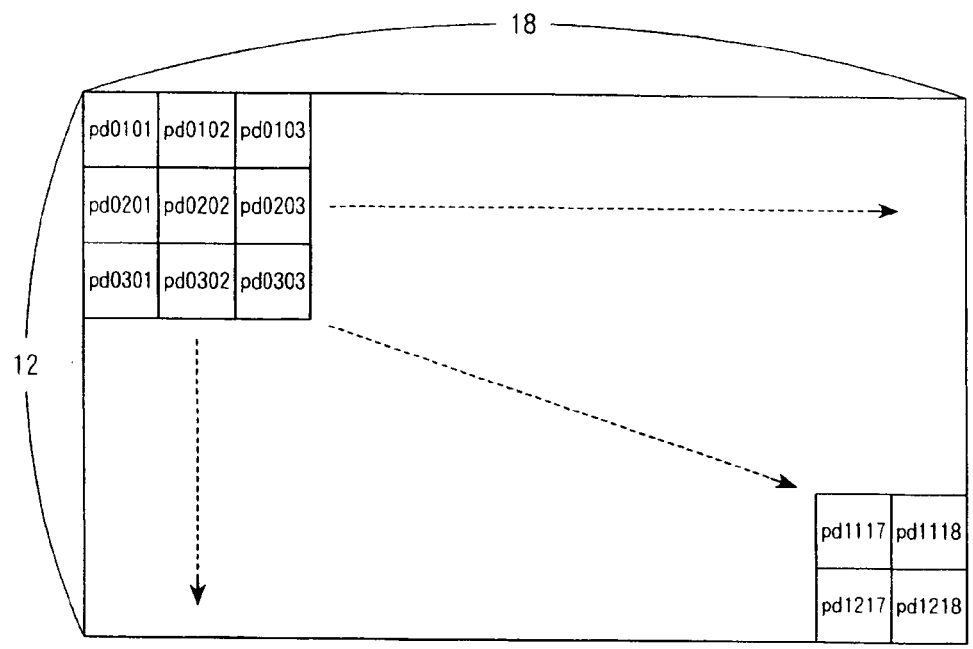
FIGS. 12A and 12B are figures showing the case when the reflectivity ratio of a luminance modulation element which is used in the first preferred embodiment of the present invention is tentatively determined to be T2.
Figure 12B:
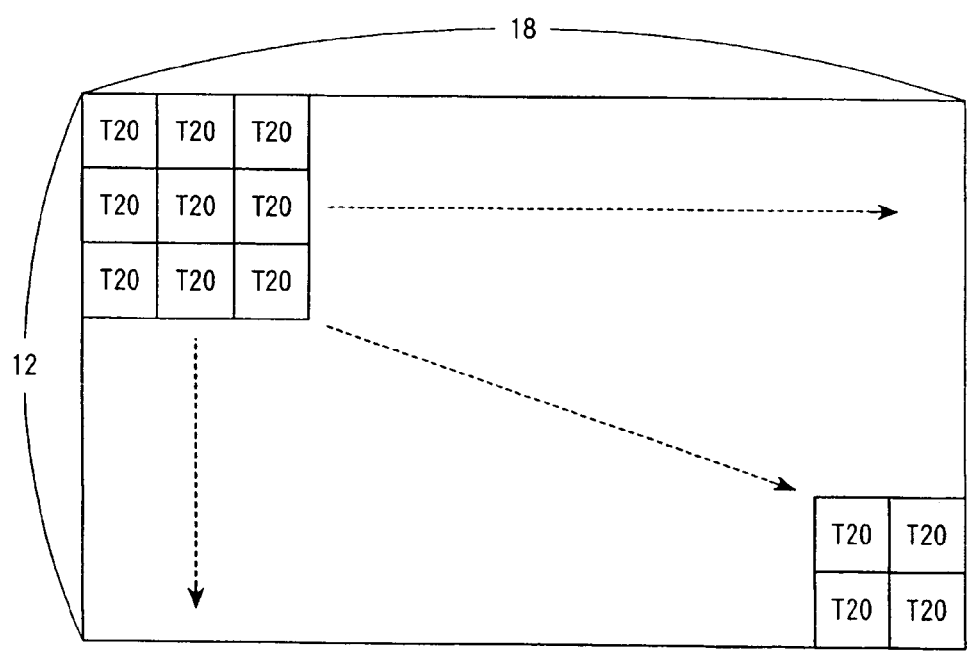

Next, proceeding to the step S110, the reflectivity ratio T2 of each picture element of the luminance modulation element is provisionally determined. FIGS. 12A and 12B are figures showing when the reflectivity ratio T2 of the luminance modulation element is provisionally determined.

A number is affixed to each of the picture elements of the luminance modulation element, as shown in FIG. 12A. In other words, the number of each of the picture elements is expressed by four digits with the prefix "pd" before it, and the two leading digits specify the row number, while the two trailing digits specify the column number. The row number and the column number are supposed to be "01" for the leftmost column and the uppermost row of the luminance modulation element. This numbering of these picture elements is performed in the same manner for the color modulation light valve, but, in the case of the color modulation light valve, "pl" is used as the prefix.

An initial value T20 is supplied for the reflectivity ratio T2 of these picture elements, as shown in FIG. 12B.

Figure 13:
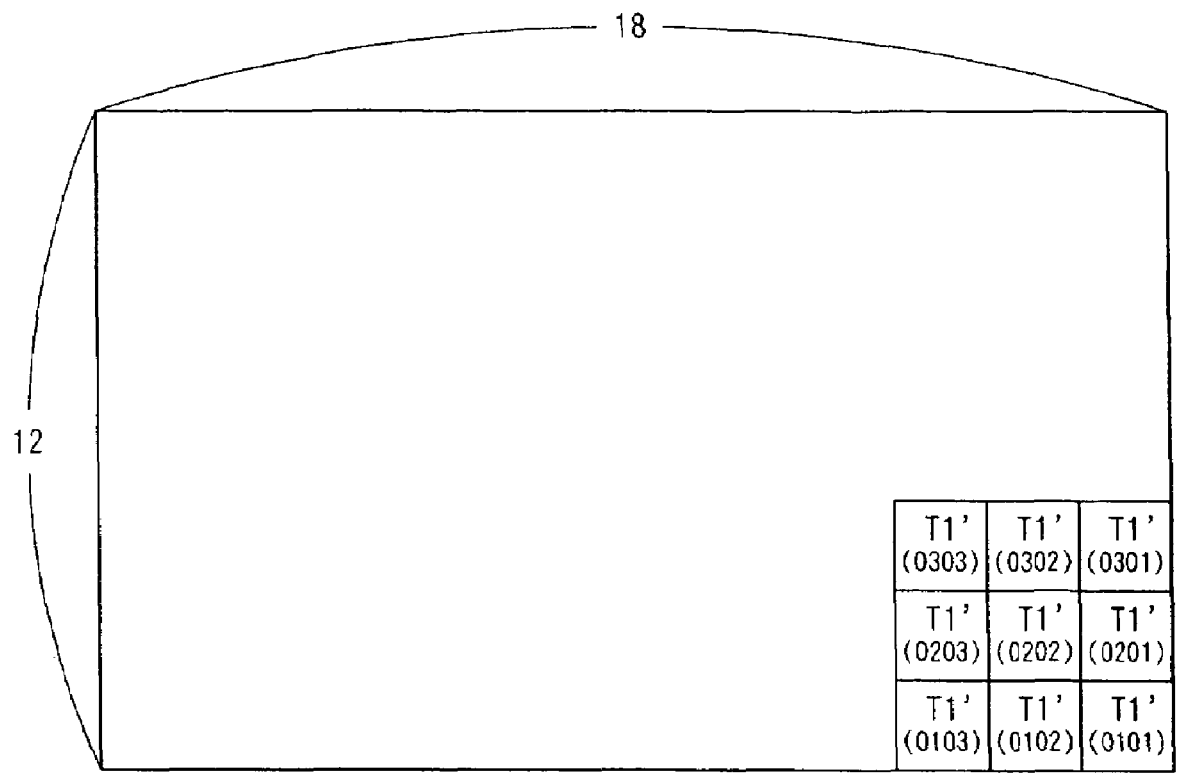
FIG. 13 is a figure showing the situation when calculating the transmittivity ratio of a color modulation light valve which is used in the first preferred embodiment of the present invention by picture element units of a luminance modulation element.

Next, proceeding to the step S12, the transmittivity ratio T1' of the color modulation light valve is calculated in units of picture elements of the luminance modulation element. FIG. 13 is a figure showing the case in which the transmittivity ratio T1' of the color modulation light valve is calculated in units of picture elements of the luminance modulation element.

When attention is paid to the picture elements pd(0101)-pd(0303) at the upper left of the luminance modulation element, the transmittivity ratios T1'(0101)-T1'(0303) of the color modulation light valve which correspond to them can be calculated by the following Equations (3) through (11), if the gain G of the above Equation (2) is supposed to be "1". Here, Tp0101-Tp0303 are the light modulation ratios of the display picture elements which correspond to the picture elements pd(0101)-pd(0303).

$$T1'(0101)=Tp0101/T20 \qquad (3)$$

$$T1'(0102)=Tp0102/T20 \qquad (4)$$

$$T1'(0103)=Tp0103/T20 \qquad (5)$$

$$T1'(0201)=Tp0201/T20 \qquad (6)$$

$$T1'(0202)=Tp0202/T20 \qquad (7)$$

$$T1'(0203)=Tp0203/T20 \qquad (8)$$

$$T1'(0301)=Tp0301/T20 \qquad (9)$$

$$T1'(0302)=Tp0302/T20 \qquad (10)$$

$$T1'(0303)=Tp0303/T20 \qquad (11)$$

These will now be actually calculated using the numerical values. If Tp0101=0.00012, Tp0102=0.05, Tp0103=0.02, Tp0201=0.01, Tp0202=0.03, Tp0203=0.005, Tp0301=0.009, Tp0302=0.035, Tp0303=0.0006, and T20=0.1, then, according to the above Equations (3) through (11), T1'(0101)=0.0012, T1'(0102)=0.5, T1'(0103)=0.2, T1'(0201)=0.1, T1'(0202)=0.3, T1'(0203)=0.05, T1'(0301)=0.09, T1'(0302)=0.35, and T1'(0303)=0.006.

It should be understood that, since the luminance modulation element and the color modulation light valve are in a conjugate relationship of inverted image formation by the relay lens 16, the location of the color modulation light valve with respect to the nine picture elements at the upper left of the luminance modulation element comes to be positioned at the lower right, as shown in FIG. 13.

Figure 14A:
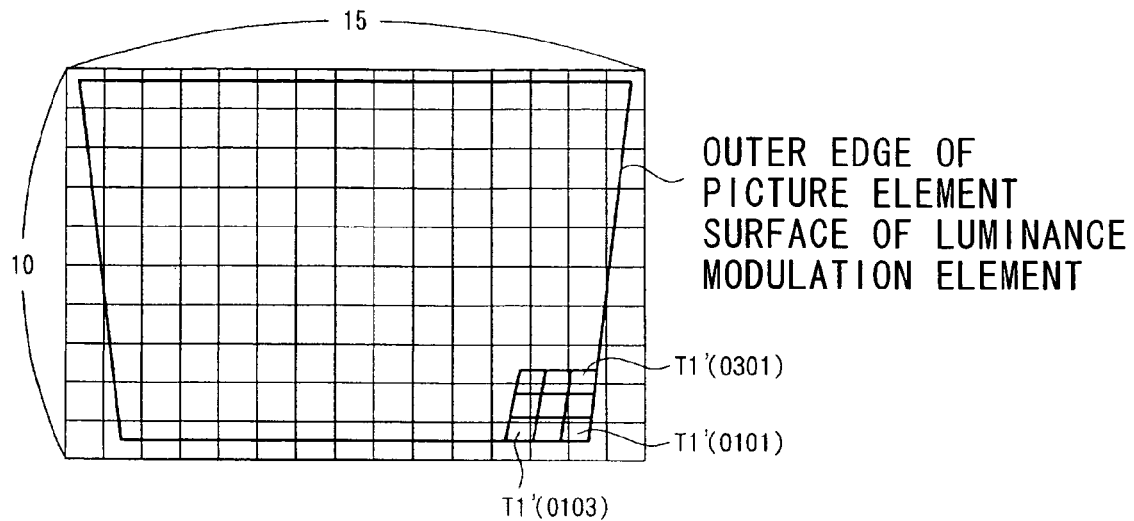
FIGS. 14A, 14B and 14C are figures showing the situation when determining the transmittivity ratio of each picture element of a color modulation light valve which is used in the first preferred embodiment of the present invention.
Figure 14B:
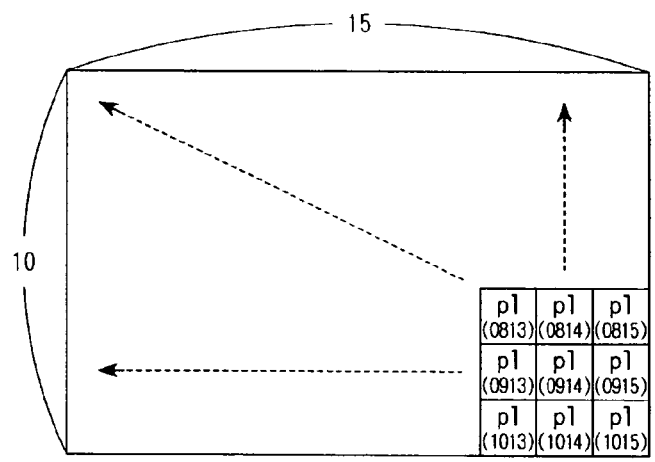
Figure 14C:
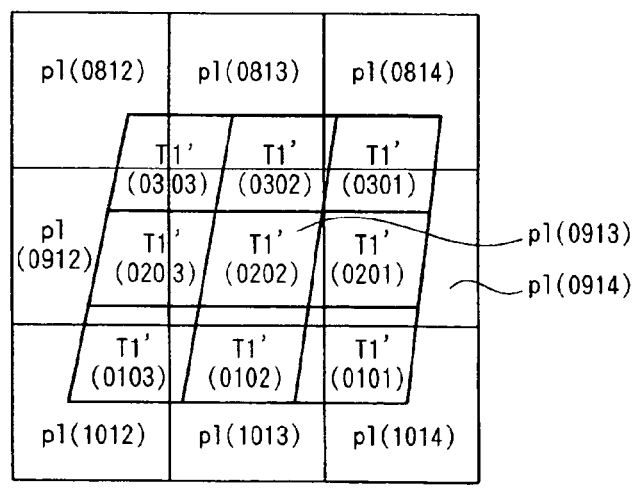

Next, proceeding to the step S114, the transmittivity ratio T1 of each of the picture elements of the color modulation light valve is determined. FIGS. 14A through 14C are figures showing when the transmittivity ratio T1 of each of the picture elements of the color modulation light valve is determined.

Since the luminance modulation element and the color modulation light valve are in a conjugate relationship of inverted image formation by the relay lens 16, and moreover the luminance modulation element is positioned off-axis with respect to the optical axis of the relay lens 16, the transmittivity ratios T1'(0101)-T1'(0303) of the color modulation light valves which have been calculated in picture element units of the luminance modulation element, in actual practice, come to correspond optically to the positions shown in FIG. 14A upon the picture element surface of the color modulation light valve. Since this type of optical correspondence relationship is prescribed in the picture element correspondence relationship table, it can be easily obtained by consulting that picture element correspondence relationship table. The picture element correspondence relationship table is referred to in the same manner for the determination of the reflectivity ratio T2.

It should be understood that the picture element correspondence relationship table is made by putting together the optical correspondence relationships of the luminance modulation element and the color modulation light valve by using commercially available optical simulation software or the like. In concrete terms, ray tracing is performed in order to determine from which position of the picture element surface of the color modulation light valve the principal ray which passes through the picture element of the luminance modulation element which is being considered is emitted. By this procedure, it is ascertained to which picture element of the color modulation light valve said picture element which is being considered corresponds. This task is performed for all of the picture elements of the luminance modulation element, and the structure in which all these optical correspondence relationships are recorded is the picture element correspondence relationship table.

Numbers are affixed to the picture elements of the color modulation light valve according to the method described above as shown in FIG. 14B. FIG. 14C is a figure which shows the overlapping situation of the nine picture elements which are centered about the picture element pl(0913) and T1'(0101)-T1'(0303) in a magnified view. If the picture element pl(0913) is looked at as an example, T1'(0101)-T1' (0303) are overlapped in a complicated manner. This is because the resolutions of the luminance modulation element and of the color modulation light valve are different, and because the luminance modulation element is positioned off-axis with respect to the optical axis of the relay lens 16.

In this case, the overlapping area ratios of the picture element pl(0913) and T1'(0101)-T1'(0303) are T1'(0101): T1'(0102): T1'(0103): T1'(0201): T1'(0202): T1'(0203): T1' (0301): T1'(0302): T1'(0303)=2.5: 10: 4: 3.5: 41: 16: 1: 15: 7. Accordingly, the transmittivity ratio T1(0913) of the picture element pl(0913) may be calculated according to the following Equation (12):

$$T1(0913)=(T1'(0101)\times2.5+T1'(0102)\times10+T1'(0103)\times4+T1'(0201)\times3.5+T1'(0202)\times41+T1'(0203)\times16+T1'(0301)\times1+T1'(0302)\times15+T1'(0303)\times7)/100 \quad (12)$$

The calculation will now be performed using the actual numerical values. If T1'(0101)=0.2212, T1'(0102)=0.5, T1' (0103)=0.2, T1'(0201)=0.1, T1'(0202)=0.3, T1'(0203)=0.05, T1'(0301)=0.09, T1'(0302)=0.35, and T1'(0303)=0.006, then, according to Equation (12) above, the transmittivity ratio of the picture element pl(0913) is T1(0913)=0.2463.

In the same way as for the picture element pl(0913), the transmittivity ratios T1 for the other picture elements of the color modulation light valve as well may be obtained by exactly the same process of calculating an average value weighted according to the area ratios.

Next, proceeding to the step S116, for each of the picture elements of the color modulation light valve, the control value which corresponds to the transmittivity ratio T1 which has been calculated for that picture element is read out from the appropriate one of the control value recording tables 400R-400B, and this control value thus read out is determined as being the control value of that picture element. For example, supposing that, for the R color modulation light valve, T1(0913) is equal to 0.2463, then the control value recording table 400R is consulted, and, as shown in FIG. 8, 0.24 is the most closely approximating value. Accordingly, "10" is read out from the control value recording table 400R as the control value of the picture element pl(0913).

The transmittivity ratio distribution of the color modulation light valve which has been calculated by doing the above becomes the transmittivity ratio distribution for correcting the distortion which is created at the picture element surface of the luminance modulation element, as shown in FIG. 4C.

Figure 15A:
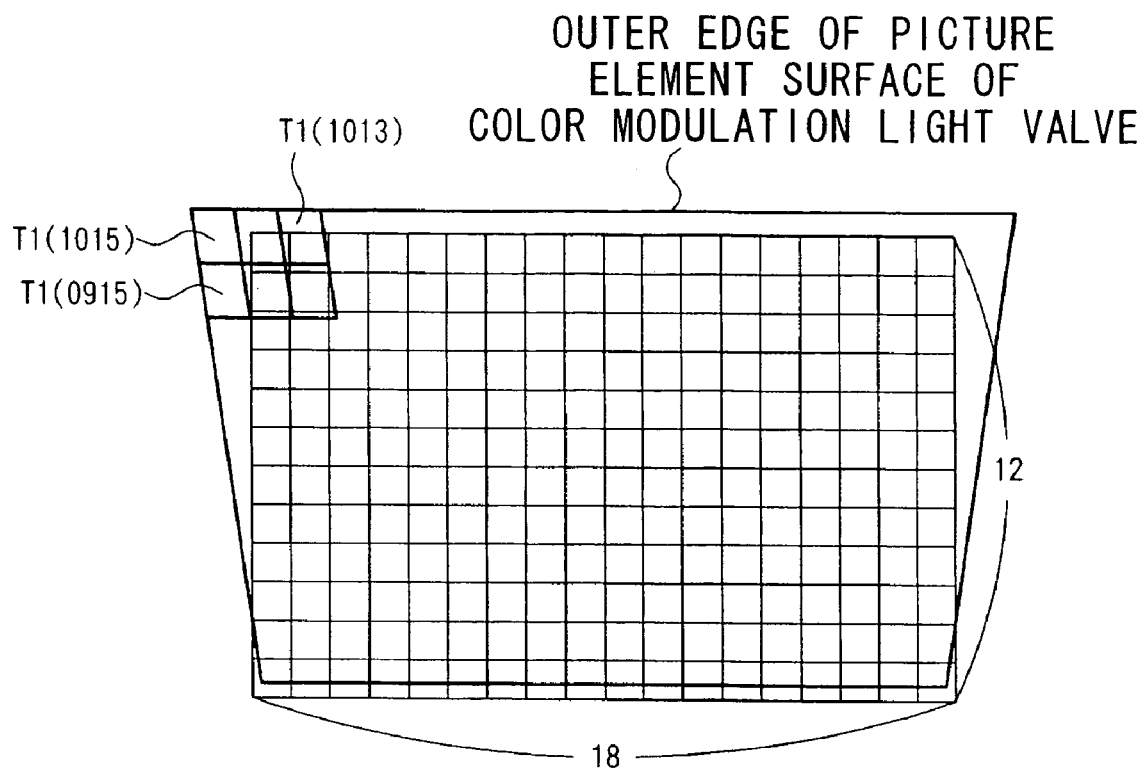
FIGS. 15A and 15B are figures showing the situation when determining the reflectivity ratio of each picture element of a luminance modulation element used in the first preferred embodiment of the present invention.
Figure 15B:
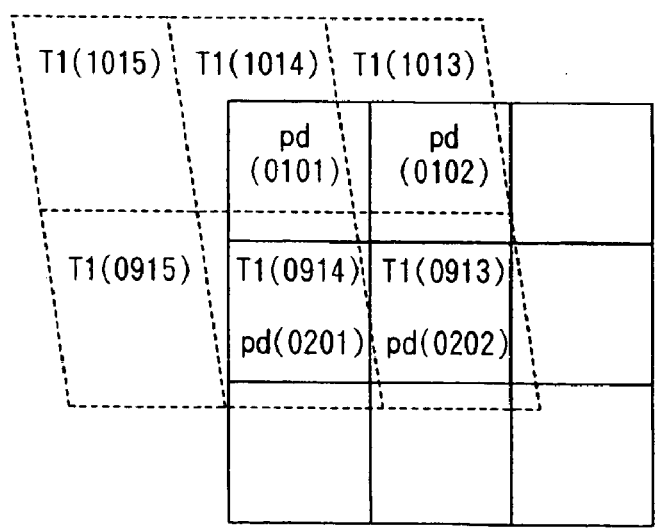

Next, proceeding to the step S118, the reflectivity ratio T2 of each of the picture elements of the luminance modulation element is determined. FIGS. 15A and 15B are figures showing when the reflectivity ratio T2 of each of the picture elements of the luminance modulation element is determined.

Due to the same reason as the reason which has been explained with reference to FIG. 13, the elements of the color modulation light valve which have the transmittivity ratios T1(0913)-T1(1015), at the picture element surface of the luminance modulation element, come to correspond optically to the positions shown in FIG. 15A. FIG. 15B is a figure showing in a magnified view the overlapping situation between the nine picture elements at the upper left of the luminance modulation element and the elements of the color modulation light valve which have the transmittivity ratios T1(0913)-T1(1015).

The picture element pd(0101) at the upper left of the luminance modulation element is overlapped in a complicated manner upon the optical path with the elements of the color modulation light valve which have transmittivity ratios T1(0913), T1(0914), T1(1013), and T1(1014). In this case, the overlap area ratios between the picture element pd(0101) of the luminance modulation element and the elements of the color modulation light valve which have transmittivity ratios T1(0913), T1(0914), T1(1013), and T1(1014) are T1(0913): T1(0914): T1(1013): T1(1014)=1:4:6:20.

Accordingly, if attention is directed to the picture element pd(0101), the transmittivity ratio T1(pd0101) of the color modulation light valve which corresponds thereto may be calculated by the following Equation (13). If the gain G is supposed to be "1", the reflectivity ratio T2(0101) of the picture element pd(0101) may be calculated by the following Equation (14).

$$T1(pd0101)=(T1(0913)\times1+T1(0914)\times4+T1(1013)\times6+T1(1014)\times20)/31 \quad (13)$$

$$T2(0101)=Tp0101/T1(pd0101) \quad (14)$$

The calculation will now be performed using actual numerical values. If T1(0913)=0.2463, T1(0914)=0.1735, T1(1013)=0.0876, and T1(1014)=0.0752, then, from Equation (13) above, T1 (pd(0101))=0.0958, and the reflectivity ratio of the picture element pd(0101) becomes, from Equation (14), T2(0101)=0.0013.

It is possible to obtain the reflectivity ratios T2 of the other picture elements of the luminance modulation element as well, just like the picture element pd(0101), by calculating the average value weighted by area ratios.

Next, proceeding to the step S120, for each of the picture elements of the luminance modulation element, the control value which corresponds to the transmittivity ratio T2 which has been calculated for that picture element is read out from the control value recording table 420. The control value which has been read out is determined as being the control value for that picture element. For example, if T2(0101)=0.0013 for the picture element pd(0101) of the luminance modulation element, then, when the control value recording table 420 is referred to, as shown in FIG. 9, 0.003 is the most closely approximating value. Accordingly, "0" is read out from the control value recording table 420 as the control value for the picture element pd(0101).

Next, proceeding to the step S122, the control values which have been determined are outputted to the light valve drive device 80. In response to the control values, the color modulation light valve and the luminance modulation element are each driven so that optical images are formed upon the picture element surfaces of the color modulation light valve and the luminance modulation element.

In this manner, in this preferred embodiment of the present invention, there are comprised the light source 10, the dichroic mirrors 44a and 44b which separate the light from the light source 10 into light of the three primary colors R, G and B, the plurality of color modulation light valves upon which the light beams which have thus been separated by the dichroic mirrors 44a and 44b are respectively incident and which moreover comprise a plurality of picture elements which are capable of being individually controlled with regard to their transmittivity ratios T1, the dichroic prism 48 which combines the light beams from the color modulation light valves, and the DMD 50 upon which the light from the dichroic prism 48 is incident, and which moreover comprises a plurality of picture elements which can be individually controlled with regard to their reflectivity ratios T2; and the DMD 50 is arranged so as to constitute an off-axis optical system, and it is arranged to apply a distortion to the images which are formed by the color modulation light valves which corrects for the distortion which is created at the picture element surface of the DMD 50.

Since the light from the light source 10 is modulated via the luminance modulation element and the color modulation light valve in this manner, it is possible to implement a comparatively high luminance dynamic range and sufficient number of gradations.

Furthermore, since the luminance modulation element is implemented with the DMD 50 whose opening ratio is high, it is possible to ensure reasonable luminance for the displayed image even if the alignment accuracy between the color modulation light valves and the DMD 50 is not particularly high. Accordingly, as compared with the conventional art, it is possible to suppress deterioration of the luminance of the image which is displayed.

Yet further, even if the DMD 50 is arranged so as to constitute an off-axis optical system, it is possible to form the image which is formed by the color modulation light valve upon the picture element surface of the DMD 50 while minimizing the distortion thereof. It is therefore possible to perform the second stage of modulation with comparatively high accuracy. Therefore, as compared with the conventional art, the possibility of deterioration of the picture quality can be reduced.

Furthermore, it is possible to manage without utilizing a solid state laser or a semiconductor laser as the light source. In comparison with the conventional art, it is therefore possible to anticipate a reduction in the overall size of the device and an increase in the luminance produced thereby.

Furthermore, in this first preferred embodiment, it is arranged to determine the transmittivity ratio T1 and the reflectivity ratio T2 in reference to the picture element correspondence relationship table.

To this end, it is possible to determine the transmittivity ratio T1 and the reflectivity ratio T2 comparatively easily while making allowance for the distortion which is imposed upon the image which is created by the color modulation light valve.

Furthermore, in this first preferred embodiment, there is incorporated the relay lens 16 which forms an optical image of each of the color modulation light valves upon the picture element surface of the DMD 50.

Due to this, an optical image of each of the color modulation light valves is formed upon the picture element surface of the luminance modulation element via the relay lens 16. Accordingly, it is possible to perform the modulation with comparatively high accuracy since it is possible to form the optical images of each of the color modulation light valves upon the picture element surface of the luminance modulation element with comparatively good accuracy. Therefore, in comparison with the conventional art, it is possible to reduce the possibility of deterioration of the picture quality.

Furthermore, in this first preferred embodiment, the color modulation light valves are liquid crystal light valves.

Due to this, it is possible to suppress increase of the cost, since it is possible to employ optical components of a currently existing type.

Furthermore, in this first preferred embodiment, the luminance distribution uniformalization section 12 is provided upon the optical path of the light source 10 and the color modulation section 14 for uniformalizing the luminance distribution of the light from the light source 10. This structure makes it possible to reduce the possibility of generation of luminance distribution blurring.

Furthermore, in this first preferred embodiment, this luminance distribution uniformalization section 12 comprises the polarization conversion element 12c which polarizes the light from the light source 10 in a direction of polarization which is suitable for being incident upon the color modulation light valves.

Due to this structure, the greater portion of the light from the light source 10 becomes the subject of modulation by the color modulation light valves, and accordingly it is possible to enhance the luminance of the displayed image.

Furthermore, in this first preferred embodiment, it is arranged: for the reflectivity ratios T2 of each of the picture elements of the luminance modulation element to be provisionally determined; for the transmittivity ratio T1 of each picture element of the color modulation light valve to be determined based upon these reflectivity ratios T2 and the HDR display data; for the control value for each picture element of the color modulation light valve to be determined based upon this transmittivity ratio T1; for the reflectivity ratio T2 for each picture element of the luminance modulation element to be determined based upon this transmittivity ratio T1 and the HDR display data; and for the control value for each of the picture elements of the luminance modulation element to be determined based upon these reflectivity ratios T2.

Due to this manner, the reflectivity ratios of the luminance modulation element which determine the display resolution are determined later and, accordingly, it is possible to suppress the influence of errors and reduce the possibility of deterioration of the picture quality.

Furthermore, in this first preferred embodiment, it is arranged to calculate the transmittivity ratios T1' of the color modulation light valve by units of the picture elements of the luminance modulation element based upon the reflectivity ratios T2 which have thus been provisionally determined and the HDR display data, and to calculate the transmittivity ratios T1 of each of the picture elements of the color modulation light valves based upon the transmittivity ratios T1' which have thus been calculated.

If the color modulation light valve and the luminance modulation element have individually different resolutions, the procedure for calculating the transmittivity ratios T1 of each of the picture elements of the color modulation light valve after temporarily having calculated the transmittivity ratios T1' of the color modulation light valve by units of picture elements of the luminance modulation element based upon the reflectivity ratios T2 which have been provisionally determined becomes simpler, rather than directly calculating the transmittivity ratios T1 of each of the picture elements of the color modulation light valve based upon the reflectivity ratios T2 which have been provisionally determined. Accordingly, if the color modulation light valve and the luminance modulation element have individually different resolutions, it is possible to calculate the transmittivity ratio T1 of each of the picture elements of the color modulation light valve in a comparatively simple manner.

Furthermore, in this first preferred embodiment, for each of the picture elements of the color modulation light valve, it is arranged to calculate the transmittivity ratio T1 of that picture element based upon the transmittivity ratios T1' which have been calculated for the picture elements of the luminance modulation element which are overlapped with that picture element upon the optical path.

Due to this manner, if the color modulation light valve and the luminance modulation element have individually different resolutions, the transmittivity ratio T1 of each of the picture elements of the color modulation light valve becomes a comparatively appropriate value with relation to the reflectivity ratios T2 of the picture elements of the luminance modulation element which are overlapped with that picture element upon the optical path. Accordingly, it is possible to reduce the possibility of deterioration of the picture quality. Moreover, it is also possible to calculate the transmittivity ratio T1 of each picture element of the color modulation light valve in an even simpler manner.

Furthermore, in this first preferred embodiment, for each of the picture elements of the color modulation light valve, it is arranged to calculate the transmittivity ratio T1 of that picture element based upon the weighted average value of the transmittivity ratios T1' which have been calculated for the picture elements of the luminance modulation element which are overlapped with that picture element upon the optical path.

Due to this manner, if the color modulation light valve and the luminance modulation element have individually different resolutions, the transmittivity ratio T1 of each of the picture elements of the color modulation light valve becomes an appropriate value with relation to the reflectivity ratios T2 of the picture elements of the luminance modulation element which are overlapped with that picture element upon the optical path. Accordingly, it is possible further to reduce the possibility of deterioration of the picture quality. Moreover, it is also possible to calculate the transmittivity ratio T1 of each picture element of the color modulation light valve in an even simpler manner.

Furthermore, in this first preferred embodiment, for each of the picture elements of the luminance modulation element, it is arranged to calculate the reflectivity ratio T2 of that picture element based upon the transmittivity ratios T1 which have been determined for the picture elements of the color modulation light valve which are overlapped with that picture element upon the optical path.

Due to this manner, if the color modulation light valve and the luminance modulation element have individually different resolutions, the reflectivity ratio T2 of each of the picture elements of the luminance modulation element becomes a comparatively appropriate value with relation to the transmittivity ratios T1 of the picture elements of the color modulation light valve which are overlapped with that picture element upon the optical path. Accordingly, it is possible to reduce the possibility of deterioration of the picture quality. Moreover, it is also possible to calculate the reflectivity ratio T2 of each picture element of the luminance modulation element in a comparatively simple manner.

Furthermore, in this first preferred embodiment, for each of the picture elements of the luminance modulation element, the weighted average value of the transmittivity ratios T1 which have been determined for the picture elements of the color modulation light valve which are overlapped with that picture element upon the optical path is calculated, and it is arranged to calculate the reflectivity ratio T2 of that picture element based upon that average value.

Due to this manner, if the color modulation light valve and the luminance modulation element have individually different resolutions, the reflectivity ratio T2 of each of the picture elements of the luminance modulation element becomes an appropriate value with relation to the transmittivity ratios T1 of the picture elements of the color modulation light valve which are overlapped with that picture element upon the optical path. Accordingly, it is possible further to reduce the possibility of deterioration of the picture quality. Moreover, it is also possible to calculate the reflectivity ratio T2 of each picture element of the luminance modulation element in a simple manner.

Furthermore, in this first preferred embodiment, the color modulation light valve was taken advantage of for the first stage light modulation element, while the luminance modulation element was taken advantage of for the second stage light modulation element.

Due to this structure, only a single further light modulation element required as compared with a conventional projection type display device and, accordingly, it is possible to build this projection type display device 100 comparatively easily.

It should be understood that, in this first preferred embodiment, the color modulation light valve corresponds to the first light modulation elements of the first, second, fifth, sixth, seventh through tenth, and twelfth through fifteenth aspects of the present invention as described above. The DMD 50 corresponds to the second light modulation elements of the seventh through tenth and twelfth through fifteenth aspects, and to the reflective type light modulation elements of the seventh, eighth, twelfth, and thirteenth aspects. The dichroic mirrors 44a and 44b correspond to the optical separator devices of the second, sixth, eighth, and thirteenth aspects. The dichroic prism 48 corresponds to the optical combiner devices of the second, sixth, eighth, and thirteenth aspects. The step S110 corresponds to the reflection characteristic provisional determination unit of the tenth aspect and to the reflection characteristic provisional determination step of the fifteenth aspect. The steps S112 and S114 correspond to the optical propagation characteristic determination unit of the tenth aspect and to the optical propagation characteristic determination step of the fifteenth aspect.

The step S116 corresponds to the first control value determination unit of the tenth aspect and to the first control value determination step of the fifteenth aspect. The step S118 corresponds to the reflection characteristic determination unit of the tenth aspect and to the reflection characteristic determination step of the fifteenth aspect. The step S120 corresponds to the second control value determination unit of the tenth aspect and to the second control value determination step of the fifteenth aspect. Furthermore, the steps S114 and S118 correspond to the image conversion devices of the seventh through the tenth aspects and to the image transformation steps of the twelfth through the fifteenth aspects.

Next, a second preferred embodiment of the present invention will be explained. In the above described first preferred embodiment, the TIR prism 52 is provided to the luminance modulation section 18, but the present invention is not to be considered as being limited by this constructional feature; it would also be possible to embody the present invention without providing the TIR prism 52.

Figure 16:
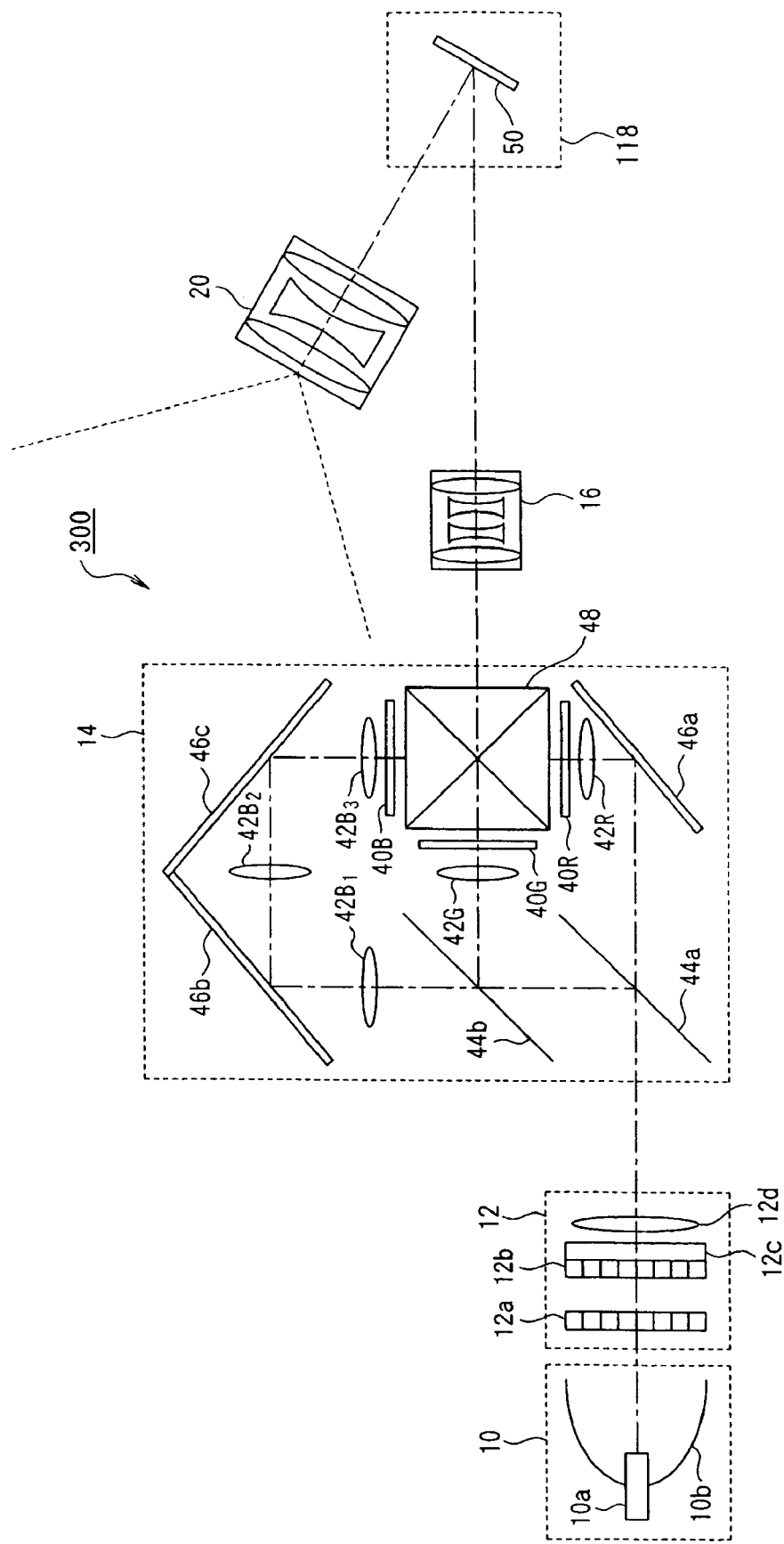
FIG. 16 is a block diagram showing a projection type display device according to a second preferred embodiment of the present invention.

FIG. 16 shows the second preferred embodiment of the present invention, which consists of a projection type display device 300 in which no such TIR prism 52 is provided. It should be understood that, to elements in FIG. 16 which correspond to elements in the first preferred embodiment described above and which have the same functions, the same reference symbols are appended, and repetitious explanation thereof is omitted.

As shown in FIG. 16, this projection type display device 300 comprises a light source 10, a luminance distribution uniformalization section 12, a color modulation section 14, a relay lens 16, a luminance modulation section 118 and a projection section 20.

The luminance modulation section 118 comprises a DMD 50 in which a plurality of picture elements whose reflectivity ratios can be individually controlled are arranged in a matrix configuration. The DMD 50 is arranged so as to constitute an off-axis optical system, in which the optical axis of the light which is incident from the relay lens 16 and the optical axis of the light which is emitted towards the-projection section 20 make a predetermined-angle-with-respect to one another. In other words, the DMD 50 is arranged in front of the projection section 20, and the transmission type liquid crystal light valves 40R-40B and the relay lens 16 are arranged at a slanting angle with respect to the DMD 50, so that the light is incident thereupon at a predetermined angle of incidence.

Next, a third preferred embodiment of the present invention will be explained. In the above described first and second preferred embodiments, the luminance modulation element was embodied as the DMD 50, but instead, in this third preferred embodiment, it is possible to embody the luminance modulation element as a reflective type liquid crystal light valve 54.

Figure 17:
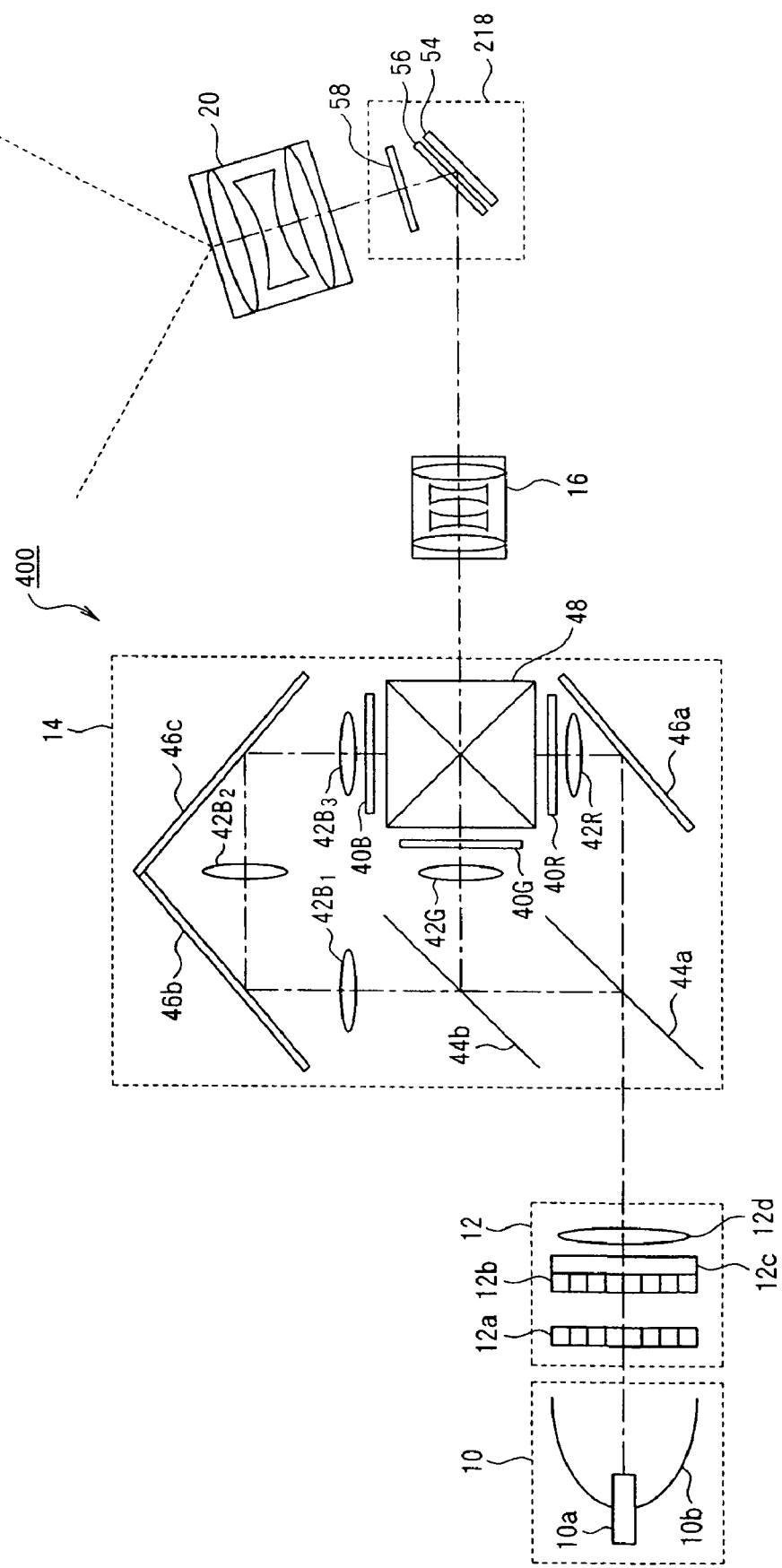
FIG. 17 is a block diagram showing a projection type display device according to a third preferred embodiment of the present invention.

FIG. 17 shows the third preferred embodiment of the present invention, which includes a projection type display device 400 in which a reflective type liquid crystal light valve 54 is taken advantage of. It should be understood that, to elements in FIG. 17 which correspond to elements in the first and second preferred embodiments described above and which have the same functions, the same reference symbols are appended, and repetitious explanation thereof is omitted.

As shown in FIG. 17, this projection type display device 400 comprises a light source 10, a luminance distribution uniformalization section 12, a color modulation section 14, a relay lens 16, a luminance modulation section 218 and a projection section 20.

The luminance modulation section 218 comprises a reflective type liquid crystal light valve 54 in which a plurality of picture elements whose reflectivity ratios T2 can be individually controlled are arranged in a matrix configuration, a $\lambda/4$ plate 56 for enhancing the contrast characteristic of this reflective type liquid crystal light valve 54 and a polarization plate 58. The reflective type liquid crystal light valve 54 is arranged so as to constitute an off-axis optical system in which the optical axis of the incident light from the relay lens 16 makes a predetermined angle with the optical axis of the light which is emitted towards the projection section 20. The light from the relay lens 16 is incident via the $\lambda/4$ plate 56 upon the reflective type liquid crystal light valve 54, and the luminance in all the wavelength regions of the light which is thus incident is modulated by the reflective type liquid crystal light valve 54, which then reflects it. The reflected light is emitted towards the projection section 20 via the $\lambda/4$ plate 56 and the polarization plate 58.

The reflective type liquid crystal light valve 54 comprises a silicon substrate upon the surface of which reflective picture element electrodes are formed in a matrix configuration, and a transparent substrate upon which transparent electrodes are formed, arranged to mutually confront one another via a spacer, with a liquid crystal substance being sandwiched between them. Drive circuits are also formed upon the silicon substrate for driving the reflective picture element electrodes. Orientation films are formed upon the surfaces of these two substrates for orienting the liquid crystal material in a predetermined direction. This reflective type liquid crystal light valve 54 is driven in a normally white mode, in which in the voltage non-applied state it is in the white/transparent (transmitting) condition, while in the voltage applied state it is in the black/dark (non-transmitting) condition, or in the opposite mode thereto, i.e. in a normally black mode. Its gradations are analog controlled between light and dark according to the control values which are supplied.

Moreover, in the reflective type liquid crystal light valve 54, just as was the case for the DMD 50 of the previously described embodiments, the light opaque locations of the signal lines and drive transistors and so on are located under the reflective picture element electrodes. Accordingly, as shown in FIG. 31, its opening ratio is relatively large, and it does not happen that the luminance of the image to be displayed is deteriorated even if more or less of an alignment error is present between the transmission type liquid crystal light valves 40R through 40B and the relay lens 16. Moreover it is endowed with the characteristic that moire patterns are not particularly conspicuous.

According to this third preferred embodiment of the present invention, the luminance modulation element is embodied as the reflective type liquid crystal light valve 54 which has a high opening ratio. It is therefore possible to ensure a reasonable level of luminance for the image which is displayed, even if the alignment accuracy between the color modulation light valves and the luminance modulation element is not high. Furthermore, it is possible to maintain the characteristic of polarization in the light transmission between the color modulation light valves and the luminance modulation element. Accordingly, as compared with the conventional art, it is possible to suppress the deterioration of the luminance of the image which is displayed. Furthermore since it is possible to increase the resolution, as compared with the case in which the DMD 50 is used, and to enhance the picture quality. It is also possible to reduce the manufacturing cost.

Next, the fourth preferred embodiment of the present invention will be explained.

Figure 18:
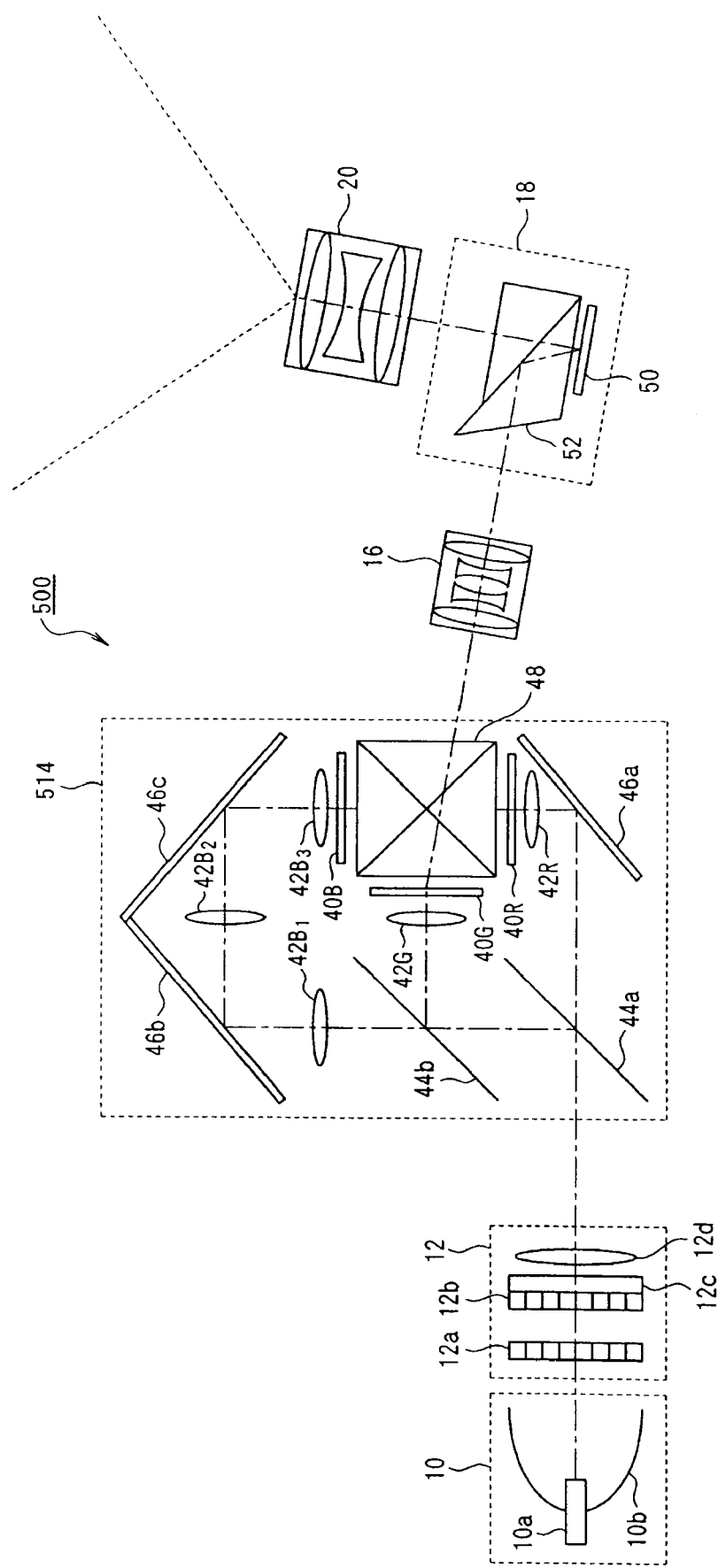
FIG. 18 is a block diagram showing a projection type display device according to a fourth preferred embodiment of the present invention.

FIG. 18 is a block diagram showing a projection type display device 500 according to the fourth preferred embodiment of the present invention. It should be understood that, to elements in FIG. 18 which correspond to elements in the first preferred embodiment described above and which have the same functions, the same reference symbols are appended, and to structural elements which have similar structure similar reference symbols are appended.

This projection type display device 500, as shown in FIG. 18, comprises a light source 10, a luminance distribution uniformalization section 12 which uniformalizes the luminance distribution of the light which is incident from the light source 10, a color modulation section 514 which modulates the respective luminances in the three primary colors R, G and B among the wavelength regions of the light which is incident from the luminance distribution uniformalization section 12, a relay lens 16 which relays the light which is incident from the color modulation section 514, a luminance modulation section 18 which modulates the luminance of the light in all wavelength regions which is incident from the relay lens 16, and a projection section 20 which projects the light which is incident from the luminance modulation section 18 upon a screen (not shown in the drawings).

This projection type display device 500 has main structural elements which are in common with, or which resemble, the various structural elements of the projection type display device 100 of the first preferred embodiment described above. Accordingly the explanation of various structural elements which have already been explained in connection with the first preferred embodiment will be omitted.

A point of difference from the first preferred embodiment is that, in the color modulation section 514, the transmission type liquid crystal light valves 40R through 40B, the relay lens 16, and the DMD 50 are arranged according to Scheimpflug's Rule. Although this arrangement will be explained hereinafter, the result is that the optical axis of the light rays which are emitted from the color modulation section 514 is inclined downward in FIG. 18, as compared with the case in the first preferred embodiment.

Figure 19A:
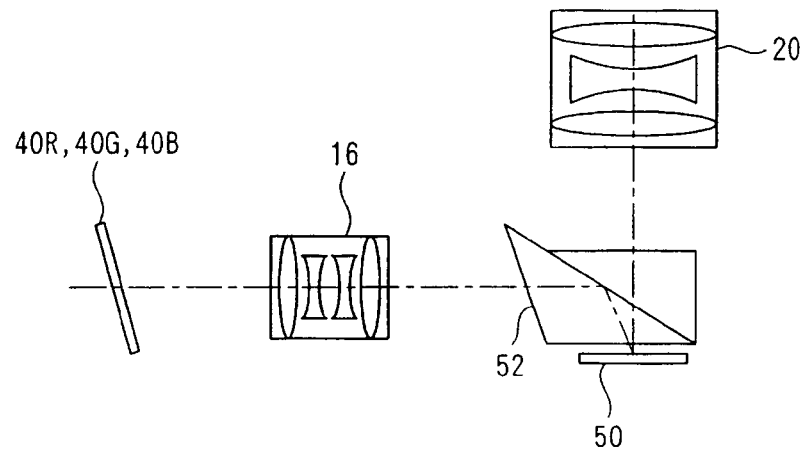
FIGS. 19A and 19B are figures showing the image formation relationship between a transmission type liquid crystal light valve and a DMD which are used in the fourth preferred embodiment of the present invention.
Figure 19B:
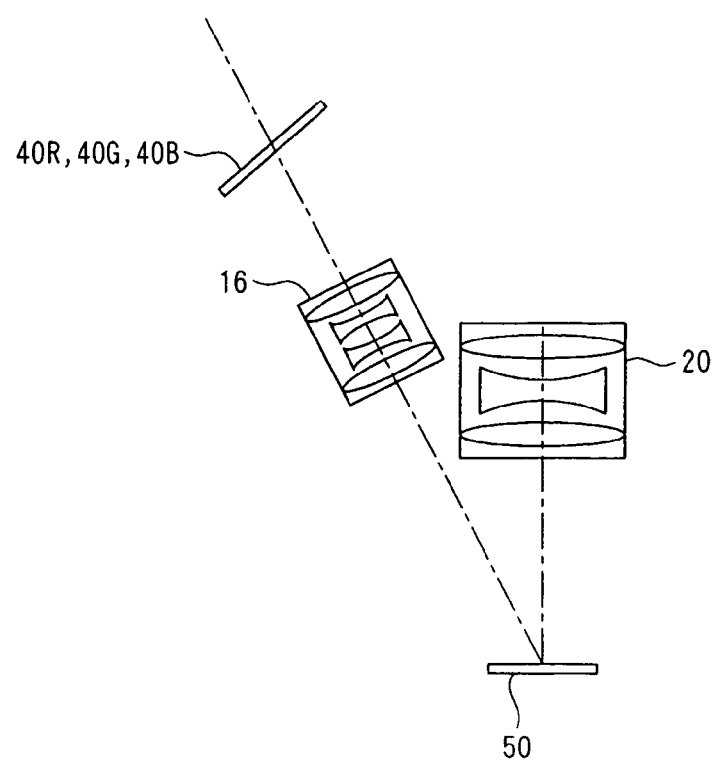

FIGS. 19A and 19B are figures showing the image formation relationship between the transmission type liquid crystal light valves 40R through 40B and the DMD 50.

FIG. 19A is a figure showing in schematic form, among the entire structure shown in FIG. 18, the portion between the transmission type liquid crystal light valves 40R through 40B and the DMD 50, and, in order to make the explanation yet easier to follow, the three transmission type liquid crystal light valves 40R through 40B are replaced by a single transmission type liquid crystal light valve, and the dichroic prism 48 is omitted.

A TIR prism 52 is disposed between the relay lens 16 and the DMD 50, but this TIR prism 52 is a device which is used for enhancing the contrast characteristic of the optical system in which the DMD 50 is used, and it does not exert any influence upon the image formation relationship of the transmission type liquid crystal light valves 40R through 40B and the DMD 50. In this connection, if the TIR prism 52 is omitted, the image formation relationship of the transmission type liquid crystal light valves 40R through 40B and the DMD 50 comes to be as shown in FIG. 19B, and the DMD 50 comes to be disposed so as to constitute an off-axis optical system in which the optical axis of the light which is incident from the relay lens 16 and the optical axis of the light which is emitted towards the projection section 20 make a predetermined angle with one another. In other words, the DMD 50 is arranged directly in front of the projection section 20, and the transmission type liquid crystal light valves 40R through 40B and the relay lens 16 are arranged slantingly with respect to the DMD 50 so that the light is incident at a predetermined angle of incidence. This is the most appropriate arrangement from the point of view of the light modulation theory of the DMD 50 which performs light modulation by changing the direction of reflection of the light rays which are incident upon it from a slanting direction. Furthermore, according to Scheimpflug's Rule which will be described hereinafter, the transmission type liquid crystal light valves 40R through 40B are arranged slantingly with respect to the optical axis of the relay lens 16.

Figure 20A:
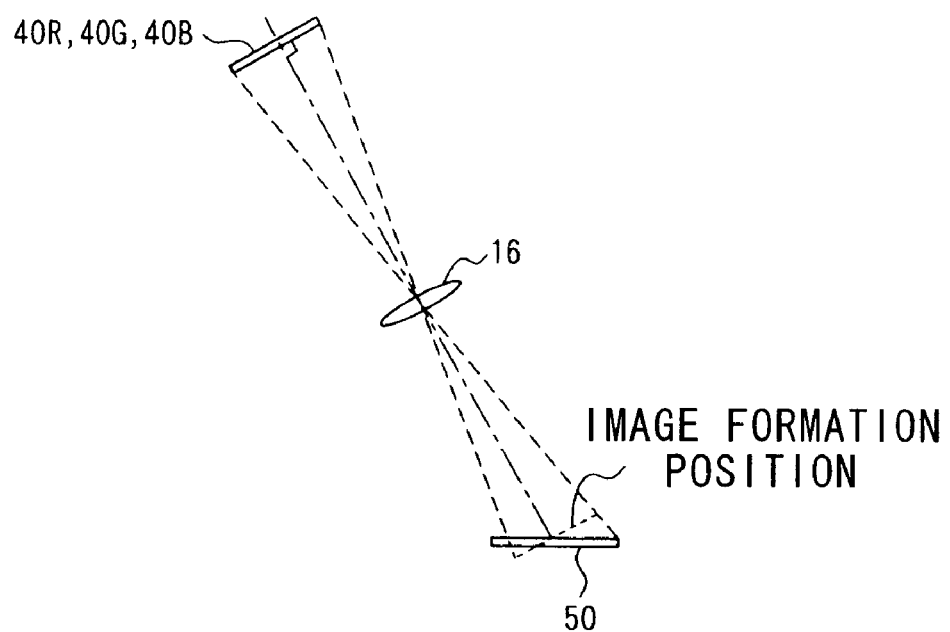
FIGS. 20A and 20B are figures showing the image formation relationship between a transmission type liquid crystal light valve and a DMD via a relay lens which is used in the fourth preferred embodiment of the present invention.
Figure 20B:
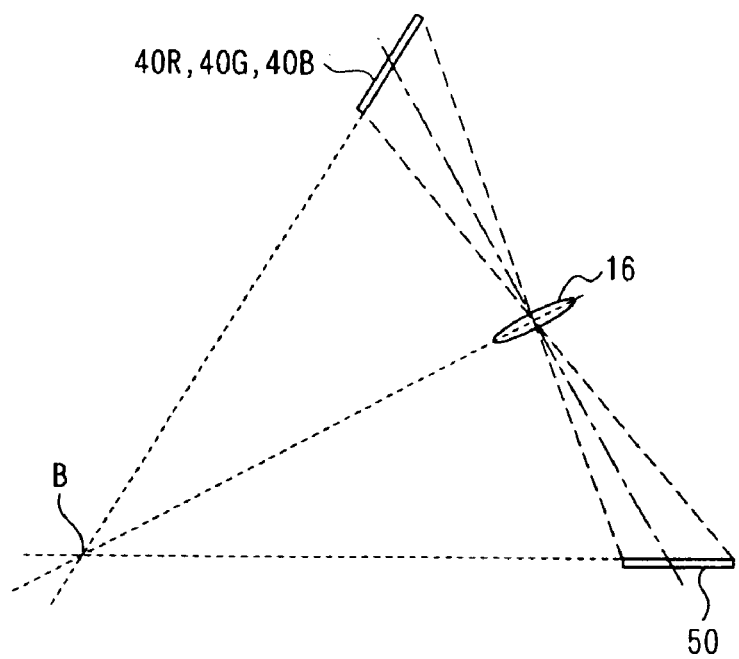

FIGS. 20A and 20B are figures for explanation of the image formation relationship between the transmission type liquid crystal light valves 40R through 40B and the DMD 50. It should be understood that, in FIGS. 20A and 20B, with the objective of simplifying the explanation, the three transmission type liquid crystal light valves 40R through 40B are replaced by a single transmission type liquid crystal light valve, and the dichroic prism 48 is omitted. Moreover, the relay lens 16 is simplified into a single lens as well.

Now, when the transmission type liquid crystal light valves 40R through 40B are arranged vertically with respect to the optical axis of the relay lens 16 as in FIG. 20A, the image formation surface of the optical images of the transmission type liquid crystal light valves 40R through 40B which is formed by the relay lens 16 comes to be one which is inclined with respect to the surface of the DMD 50, as shown by the dotted lines. Accordingly, on the picture element surface of the DMD 50, the optical images of the transmission type liquid crystal light valves 40R through 40B come to be projected as blurring, and it is not possible to transmit the luminance distributions which have been created by the transmission type liquid crystal light valves 40R through 40B to the picture element surface of the DMD 50 in an accurate manner.

In order to eliminate this luminance distribution blurring, the transmission type liquid crystal light valves 40R through 40B, the relay lens 16, and the DMD 50 are arranged according to Scheimpflug's Rule. As shown in FIG. 20B, Scheimpflug's Rule is the relationship that, if the line of intersection where the prolongation plane of the object plane (the picture element surface of the transmission type liquid crystal light valves 40R through 40B) and the prolongation plane of the principal plane of the image formation lens (the principal plane of the relay lens 16) intersect one another is termed B, then the line of intersection of the prolongation plane of the image plane (the picture element surface of the DMD 50) and the prolongation plane of the principal plane of the image formation lens also coincides with B. In other words, if the transmission type liquid crystal light valves 40R through 40B, the relay lens 16 and the DMD 50 are arranged according to Scheimpflug's Rule, then it is possible to transmit the luminance distribution which has been formed by the transmission type liquid crystal light valves 40R through 40B to the picture element surface of the DMD 50 without any blurring.

Figure 21A:
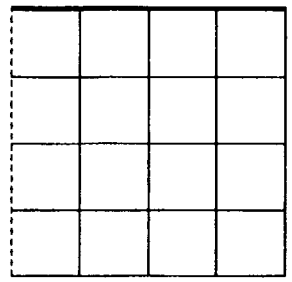
FIGS. 21A, 21B and 21C are figures showing an optical image of a transmission type liquid crystal light valve which is used in the fourth preferred embodiment of the present invention.
Figure 21B:
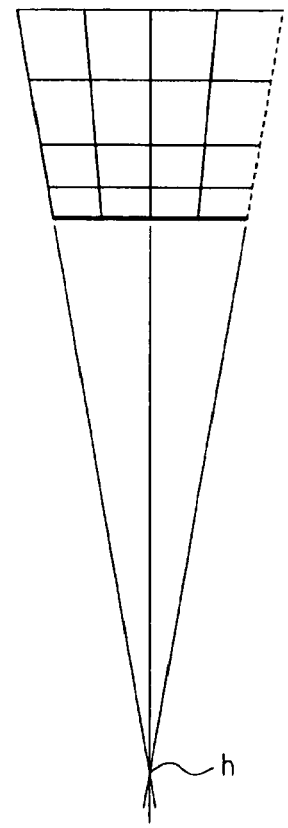
Figure 21C:
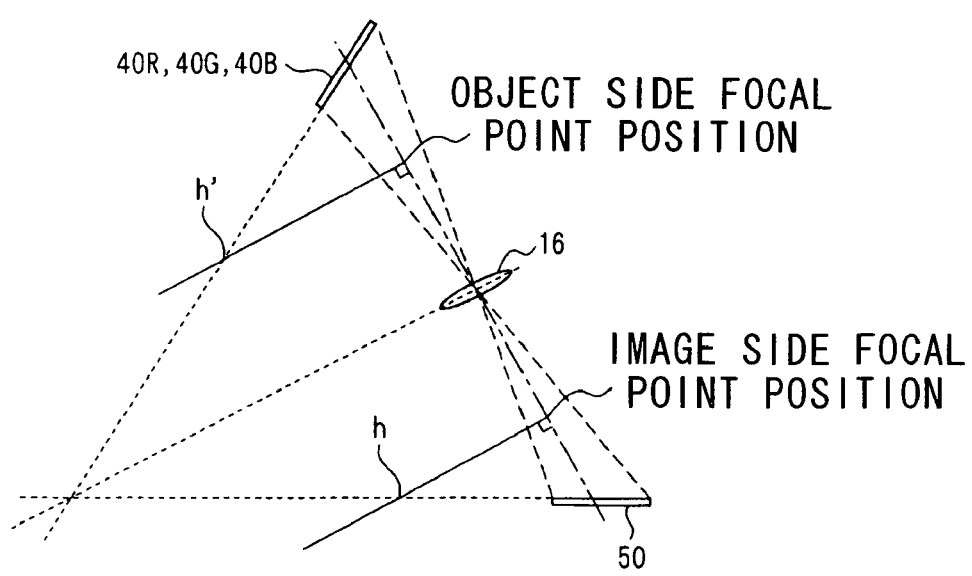

FIGS. 21A through 21C are figures showing the optical images of the transmission type liquid crystal light valves 40R through 40B.

With an arrangement according to Scheimpflug's Rule, distortion of a trapezoidal shape is generated, while there is no generation of blurring of the optical image. When the grid-like image of FIG. 21A is formed by the transmission type liquid crystal light valves 40R through 40B, and this is formed at the picture element surface of the DMD 50, then the image which is formed at the picture element surface of the DMD 50 becomes undesirably distorted into a trapezoidal shape as shown in FIG. 21B (an inverted image of which the upper side portion of FIG. 21A is shrunk and the lower side portion is expanded). However, according to the manner of distortion, the mutually parallel vertical axes of FIG. 21A meet at an angle at the point h in FIG. 21B, as though they were convergent. This point h is one which is termed a vanishing point. In concrete terms, as shown in FIG. 21C, it corresponds to the point of intersection between the perpendicular line which stands at the image side focal point position of the relay lens 16 (with respect to the optical axis), and the prolongation plane of the picture element surface of the DMD 50. Furthermore, the parallel horizontal axes of FIG. 21A remain mutually parallel in FIG. 21B as well, just as they were, but the intervals between them become narrowed down towards the lower side of FIG. 21B.

Figure 22:
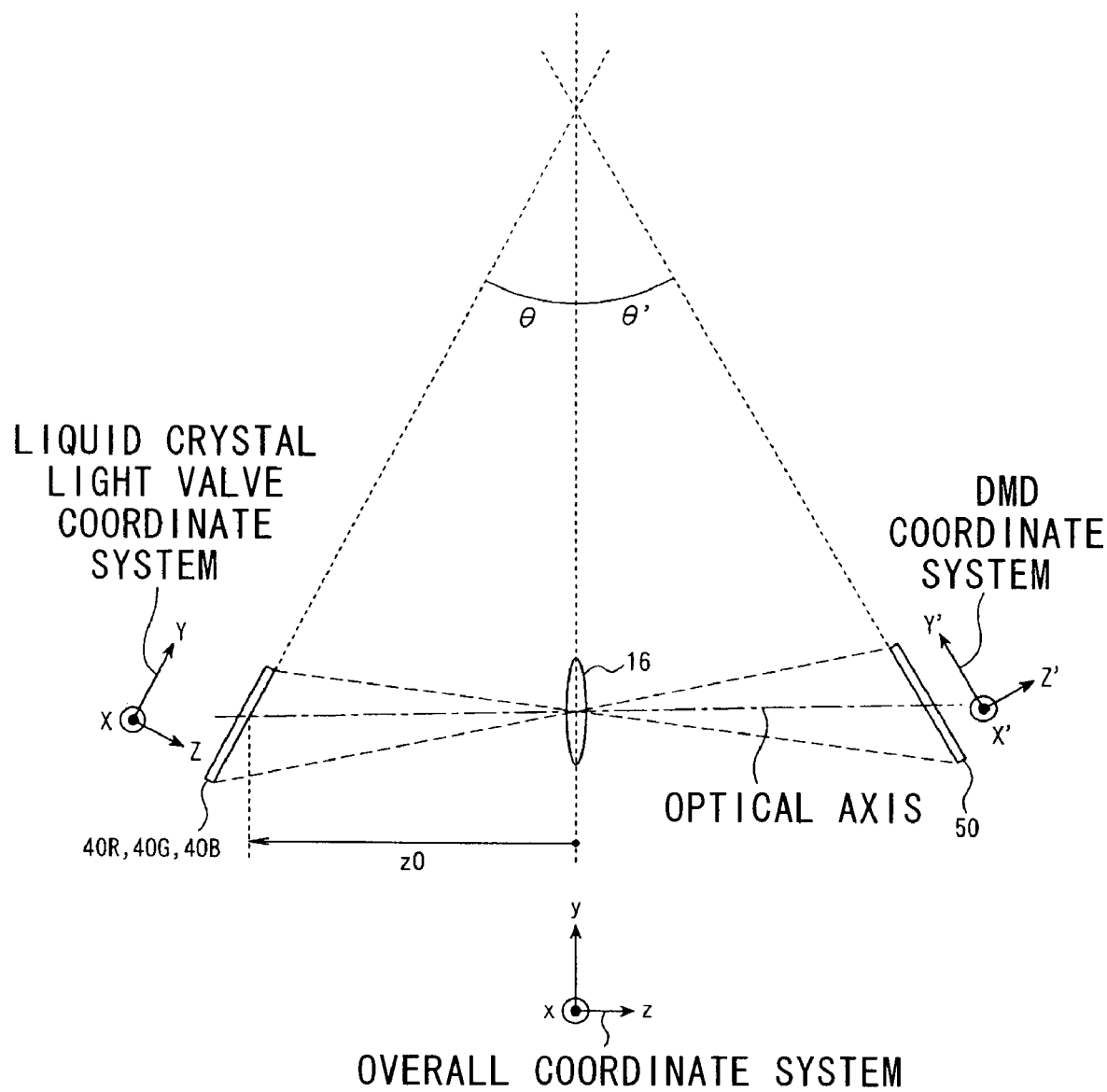
FIG. 22 is a figure showing the correspondence relationship between the coordinates of the transmission type liquid crystal light valve and the DMD which are used in the fourth preferred embodiment of the present invention.

FIG. 22 is a figure for explanation of the correspondence relationship of the coordinates upon the transmission type liquid crystal light valves 40R through 40B and those upon the DMD 50.

The plane of FIG. 22 is orthogonal to the line of intersection B of FIG. 20B. As shown at the lower portion of FIG. 22, an x-y-z orthogonal coordinate system is established as the overall coordinate system. The origin is taken as being the point of intersection between the center of the relay lens 16 and the optical axis. The y-z plane is included in the plane of FIG. 22, while the z axis extends parallel to the optical axis, with the DMD 50 side positive.

Furthermore, an X-Y-Z orthogonal coordinate system is established as the coordinate system of the transmission type liquid crystal light valves 40R through 40B. The origin is taken as being the point of intersection of the picture element surface of the transmission type liquid crystal light valves 40R through 40B and the optical axis. The Y-Z plane is included in the plane of FIG. 22, and the X-Y plane is included in the picture element surface of the transmission type liquid crystal light valves 40R through 40B.

Yet further, an X'-Y'-Z' orthogonal coordinate system is established as the coordinate system of the DMD 50. The origin is taken as being the point of intersection of the picture element surface of the DMD 50 and the optical axis. The Y'-Z' plane is included in the plane of FIG. 22, and the X'-Y' plane is included in the picture element surface of the DMD 50.

When the image formation relationship of the transmission type liquid crystal light valves 40R through 40B and the DMD 50 is expressed numerically based upon the coordinate system of FIG. 22, it may be expressed by the following Equations (15):

$$X' = f/(f+z0+Y \cdot \sin \theta) \cdot X$$

$$Y' = \cos \theta / \cos \theta' \cdot f/(f+z0+Y \cdot \sin \theta) \cdot Y \quad (15)$$

Here, f is the focal point distance of the relay lens 16, z0 is the distance from the principal point of the relay lens 16 to the transmission type liquid crystal light valves 40R through 40B, θ is the angle subtended between the plane of the transmission type liquid crystal light valves 40R through 40B and the principal plane of the relay lens 16, and θ' is the angle subtended between the plane of the DMD 50 and the principal plane of the relay lens 16.

Accordingly, in order to obtain the luminance distribution at the picture element surface of the DMD 50 which was originally desired, it is necessary to display images upon the transmission type liquid crystal light valves 40R through 40B while taking the trapezoidal distortion into account in advance. This may be implemented if the image is formed upon the transmission type liquid crystal light valves 40R through 40B after having performed image processing according to the Equation (15) above. This image processing will be discussed later in detail.

The above described projection type display device 500 is controlled in the same manner as explained for the display device 200 of FIG. 7 using FIGS. 8 through 13. It should be understood that, in this fourth preferred embodiment of the present invention, each of the plan views of the luminance modulation element and of the color modulation light valves in FIGS. 12A, 12B, 13, 23A through 23C, and 24A and 24b is a plan view in the state as seen from the side of the light source 10, and it is supposed that the optical correspondence relationship of the picture elements is calculated based upon the conditions below.

[The Calculation Conditions]
i) Size of the luminance modulation element and the color modulation light valves: long side 90, short side 50.
ii) Focal point distance of the relay lens 16: f=100.
iii) Distance between the color modulation light valve and the relay lens:
z0=−50 (Referring to FIG. 22, symbols are appended corresponding to the direction of the z axis of the x-y-z orthogonal coordinate system, with the relay lens 16 being positioned at the origin. In this case, a minus sign is prefixed, since the direction of z0 is the minus direction of the z axis.)
iv) Inclination of the luminance modulation element and the color modulation light valve: θ=θ'=20°.
v) The point of intersection of the color modulation light valve and the optical axis is set to be 6 towards the +Y side from the center of the display surface of said color modulation light valve, while the point of intersection of the optical axis and the luminance modulation element is set to agree with the center of the display surface of said luminance modulation element.

Up through the step S112, the display control device 200 performs the same control which was explained using FIGS. 11 through 13 for the first preferred embodiment of the present invention, according to the flow chart shown in FIG. 10.

Figure 23A:
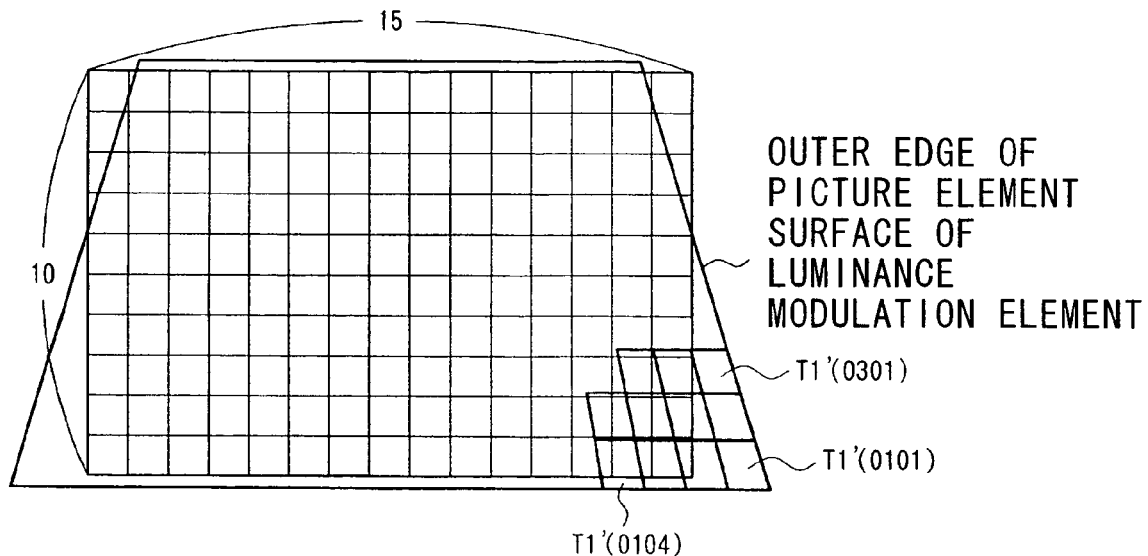
FIGS. 23A, 23B, and 23C are figures showing the situation when determining the transmittivity ratio of each picture element of a color modulation light valve which is used in the fourth preferred embodiment of the present invention.
Figure 23B:
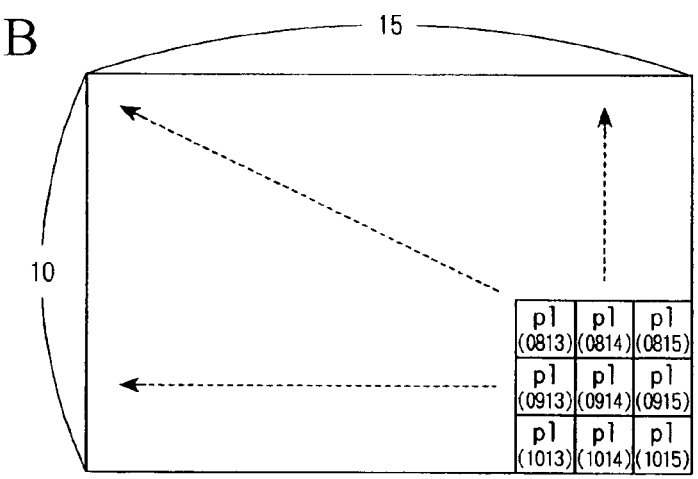
Figure 23C:
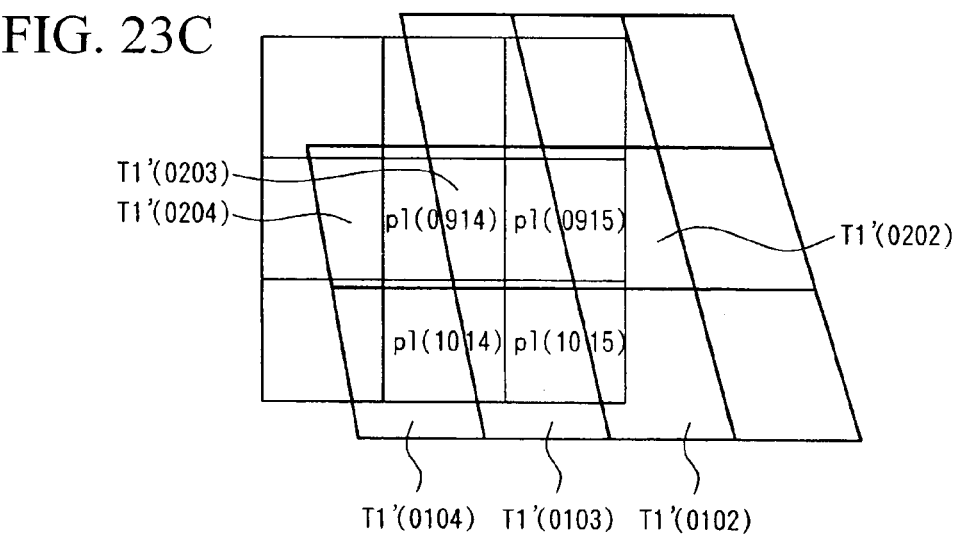

Next, proceeding to the step S114, the transmittivity ratio T1 of each of the picture elements of the color modulation light valve is determined. FIGS. 23A through 23C are figures showing when the transmittivity ratio T1 of each of the picture elements of the color modulation light valve is determined.

The luminance modulation element and the color modulation light valve are in a conjugate relationship of inverted image formation with respect to the relay lens 16 and, moreover, the color modulation light valve, the relay lens 16, and the luminance modulation element are arranged according to Scheimpflug's Rule. Accordingly, the transmittivity ratios T1'(0101) through T1'(0303) of the color modulation light valve which have been calculated in units of picture elements of the luminance modulation element, in actual practice, come to correspond optically to the positions shown in FIG. 23A at the picture element surface of the color modulation light valve. Since this type of optical correspondence relationship is prescribed in the picture element correspondence relationship table according to Equation (15) above, it is possible to obtain it very easily by consulting the picture element correspondence relationship table. This picture element correspondence relationship table is also referred to in the same manner for determination of the reflectivity ratios T2.

It should be understood that the picture-element correspondence relationship table, apart from being obtained according to the Equation (15) above, may also be constructed by obtaining the optical correspondence relationships of the luminance modulation element and the color modulation light valve using commercially available optical simulation software or the like. In concrete terms, the principal ray which passes through the picture element of the luminance modulation element to which attention is currently being paid is ray traced as to which position upon the picture element surface of the color modulation light valve it is emitted from. By this task, it is ascertained to which picture elements of the color modulation light valves said picture element to which attention is being paid corresponds. This task is performed for all of the picture elements of the luminance modulation element, and the totality of the optical correspondence relationships are recorded as the picture element correspondence relationship table. If this procedure is employed, it is possible to take into account the influence of aberration which is generated by the relay lens 16, and it is possible to obtain a more accurate optical correspondence relationship.

As shown in FIG. 23B, numbers are affixed to the picture elements of the color modulation light valve according to the method previously described. FIG. 23C is a figure which shows in a magnified view the lower right four picture elements and the overlapping situation of the transmittivity ratios T1' of the color modulation light valve which have been calculated by units of picture elements of the luminance modulation element. Considering the picture element pl(1015) as an example, T1'(0102)~T1'(0203) are overlapped in a complicated manner. This is due to the fact that the resolutions of the luminance modulation element and of the color modulation light valves are different, and because they are arranged according to Scheimpflug's Rule.

In this case, the overlapping area ratios of the picture element pl(1015) and T1'(0102)~T1'(0203) are T1'(0102): T1'(0103): T1'(0202): T1'(0203)=216: 403: 10: 11. Accordingly, the transmittivity ratio T1(1015) of the picture element pl(1015) may be calculated according to the Equation (16) below:

$$T1(1015)=(T1'(0102)\times 216 + T1'(0103)\times 403 + T1'(0202)\times 10 + T1'(0203)\times 11)/640 \qquad (16)$$

The calculation will now be performed using the actual values. If T1'(0102)=0.5, T1'(0103)=0.2, T1'(0202)=0.3, and T1'(0203)=0.05, then the transmittivity ratio of the picture element pl(1015) according to the above Equation (16) is T1(1015)=0.3.

The transmittivity ratios of the other picture elements of the color modulation light valve, as well, may be obtained by the same process, just like the picture element pl(1015), by calculating all together the weighted average values according to the area ratios.

Next, proceeding to the step S116, for each of the picture elements of the color modulation light valve, the control value which corresponds to the transmittivity ratio T1 which has been calculated for that picture element is read out from the control value recording tables 400R through 400B, and the read out control value is determined as being the control value for that picture element. For example, if it is supposed that T1(1015)=0.3 for the R color modulation light valve, then, when the control value recording table 400R is consulted, as shown in FIG. 8, 0.35 is the closest value. Accordingly, "11" is read out from the control value recording table 400R as the control value for the picture element pl(1015).

The transmittivity ratio distributions of the color modulation light valves which have been calculated in this manner constitute transmittivity ratio distributions which correct for the distortion which has been created at the picture element surface of the luminance modulation element.

Figure 24A:
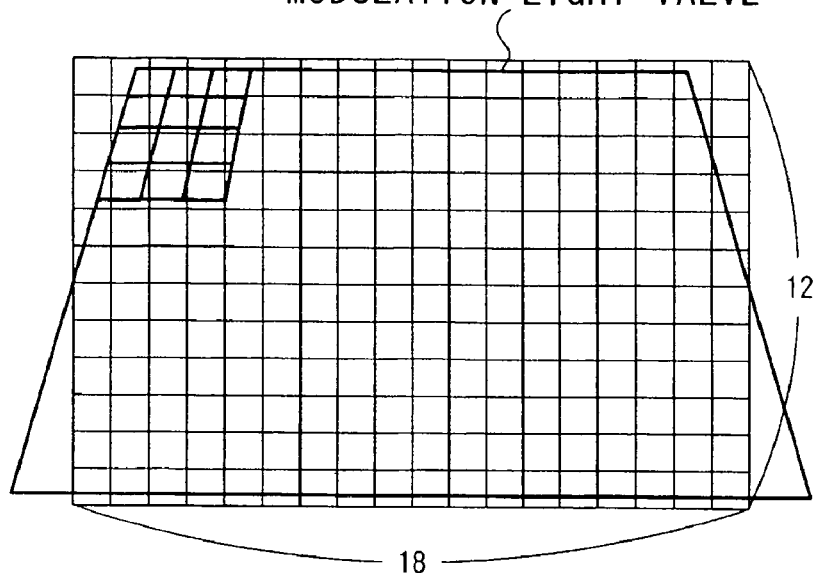
FIGS. 24A and 24B are figures showing the situation when determining the reflectivity ratio of each picture element of a luminance modulation element which is used in the fourth preferred embodiment of the present invention.
Figure 24B:
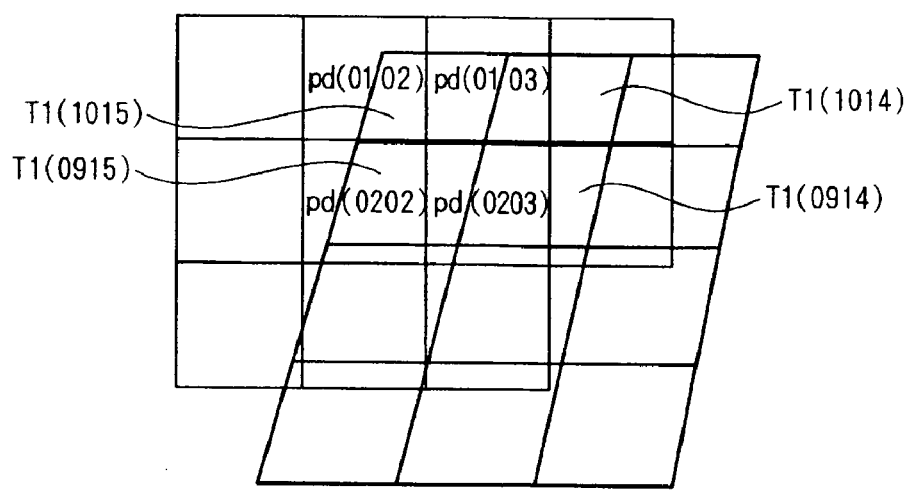

Next, proceeding to the step S118, the reflectivity ratio T2 is determined for each of the picture elements of the luminance modulation element. FIGS. 24A and 24B are figures showing when the reflectivity ratio T2 is determined for each of the picture elements of the luminance modulation element.

Due to the same reasons as those which have been explained with reference to FIG. 23A, the transmittivity ratio T1 of each of the picture elements of the color modulation light valve comes to correspond optically to the position shown in FIG. 24A at the picture element surface of the luminance modulation element. FIG. 24B is a figure which shows, in an enlarged view, the state of overlapping of the upper left nine picture elements of the luminance modulation element with T1(0914)~T1(1015).

Taking the picture element pd(0103) of the luminance modulation element as an example, the elements of the color modulation light valve which have the transmittivity ratios T1(1014) and T1(1015) overlap with it upon the optical path in a complicated manner. The area ratios of overlap of the picture element pd(0103) of the luminance modulation element and the elements of the color modulation light valve which have the transmittivity ratios T1(1014) and T1(1015) are, in this case, T1(1014): T1(1015)=48:39.

Accordingly, if attention is directed to the picture element pd(0103), the transmittivity ratio T1 (pd0103) of this element of the color modulation light valve which corresponds thereto may be calculated according to the Equation (17) below. The reflectivity ratio T2(0103) of the picture element pd(0103) may be calculated according to the Equation (18) below, if the gain G is supposed to be "1".

$$T1(pd0103)=(T1(1014)\times 48 + T1(1015)\times 39)/87 \qquad (17)$$

$$T2(0103)=Tp(0103)/T1(pd0103) \qquad (18)$$

The calculation will now be performed using actual values. If it is supposed that T1(1014)=0,2 and T1(1015)=0.3, then according to Equation (14) above, T1(pd0103)=0.24, and the reflectivity ratio of the picture element pd(0103) is T2(0103)=0.08.

The reflectivity ratios of the other picture elements of the luminance modulation element, as well, may be obtained by the same process, just like the picture element pd(0101), by calculating the weighted average values according to the area ratios.

Next, proceeding to the step S120, for each of the picture elements of the luminance modulation element, the control value which corresponds to the reflectivity ratio T2 which has been calculated for that picture element is read out from the control value recording table 420, and the read out control value is determined as being the control value for that picture element. For example, if it is supposed that T2(0103)=0.08 for the picture element pd(0103) of the luminance modulation element, then, when the control value recording table 420 is consulted, as shown in FIG. 9, 0.09 is the closest value. Accordingly, "8" is read out from the control value recording table 420 as the control value for the picture element pd(0103).

Then, proceeding to the step S122, the control values which have been determined are outputted to the light valve drive device 80. Then, each of the color modulation light valves and the luminance modulation element is driven, and optical images are formed upon the picture element surfaces of the color modulation light valves and the luminance modulation element.

In this manner, in this fourth preferred embodiment of the present invention, there are comprised the light source 10, the dichroic mirrors 44*a* and 44*b* which separate the light from the light source 10 into light of the three primary colors R, G and B, the plurality of color modulation light valves upon which the light beams which have thus been separated by the dichroic mirrors 44*a* and 44*b* are respectively incident and which moreover comprise a plurality of picture elements which are capable of being individually controlled with regard to their transmittivity ratios T1, the dichroic prism 48 which combines the light beams from the color modulation light valves, the DMD 50, and the relay lens 16 which forms the combined optical image of the dichroic prism 48 upon the picture element surface of the DMD 50; and the color modulation light valves, the relay lens 16, and the DMD 50 are arranged according to Scheimpflug's Rule.

Due to this manner, according to this fourth preferred embodiment of the present invention, in addition to the beneficial results which were reaped from the first preferred embodiment as described above, it is also possible to attain the following beneficial results.

Since the light from the light source 10 is modulated via the luminance modulation element and the color modulation light valves in this manner, it is possible to implement a comparatively high luminance dynamic range and number of gradations.

Furthermore, the luminance modulation element is implemented with the DMD 50 whose opening ratio is high. It is therefore possible to ensure reasonable luminance for the displayed image even if the alignment accuracy between the color modulation light valves and the DMD 50 is not particularly high. Accordingly, as compared with the conventional art, it is possible to suppress deterioration of the luminance of the image which is displayed.

Yet further, the image formation surfaces of the optical images of the color modulation light valves coincide with the picture element surface of the luminance modulation element. Accordingly, it is possible to suppress generation of blurring in the optical image which is formed upon the picture element surface of the luminance modulation element. Therefore, as compared with the conventional art, the possibility of deterioration of the picture quality can be reduced.

Furthermore, it is also possible to manage without utilizing a solid state laser or a semiconductor laser as the light source and, accordingly, in comparison with the conventional art, it is possible to anticipate a reduction in the size of the device and a heightening of the luminance.

Furthermore, in this fourth preferred embodiment, it is arranged to apply distortion to the images which are formed by the color modulation light valves so as to correct for the distortion which arises at the picture element surface of the DMD 50.

Therefore, it is possible to form an image upon the picture element surface of the DMD 50 in which the distortions in the images which are formed upon the color modulation light valves are reduced even though the DMD 50 is arranged so as to constitute an off-axis optical system. It is also possible to perform the second stage of modulation with comparatively high accuracy. Accordingly, as compared with the conventional art, it is possible to reduce-the possibility of deterioration of the picture quality.

Furthermore, in this fourth preferred embodiment, it is arranged to determine the transmittivity ratios T1 and the reflectivity ratios T2 by referring to the picture element correspondence relationship table.

It is therefore possible to determine the transmittivity ratios T1 and the reflectivity ratios T2 in a comparatively easy manner, in consideration of the distortion which is introduced into the images which are formed by the color modulation light valves.

Furthermore, in this fourth preferred embodiment, the color modulation light valve is a liquid crystal light valve.

Due to this, it is possible to suppress increase of the cost, since it is possible to employ optical components of a currently existing type.

Furthermore, in this fourth preferred embodiment, the color modulation light valves were taken advantage of as first stage light modulation elements, while the luminance modulation element was taken advantage of for the second stage light modulation element.

Due to this structure, only a single further light modulation element required as compared with a conventional projection type display device and, accordingly, it is possible to build this projection type display device 500 comparatively easily.

The color modulation light valve of the above described fourth preferred embodiment of the present invention corresponds to the first light modulation element of the seventeenth through the twenty-first and the twenty-third through the twenty-seventh aspects. The DMD 50 corresponds to the second light modulation element of the seventeenth through the twenty-first and the twenty-third through the twenty-seventh aspects, and to the reflective type light modulation element of the seventeenth, eighteenth, twenty-third, and twenty-fourth aspects. The dichroic mirrors 44*a* and 44*b* correspond to the optical separator of the eighteenth and the twenty-fourth aspects. The dichroic prism 48 corresponds to the optical combiner device of the eighteenth and the twenty-fourth aspects. The step S110 corresponds to the reflection characteristic provisional determination unit of the twenty-first preferred aspect, and to the reflection characteristic provisional determination step of the seventeenth preferred aspect.

Furthermore, in the above described fourth preferred embodiment of the present invention, the steps S112 and S114 correspond to the optical propagation characteristic determination unit of the twenty-first preferred aspect, and to the optical propagation characteristic determination step of the seventeenth aspect. The step S116 corresponds to the first control value determination unit of the twenty-first aspect, and to the first control value determination step of the seventeenth aspect. The step S118 corresponds to the reflection characteristic determination unit of the twenty-first aspect, and to the reflection characteristic determination step of the seventeenth aspect. The step S116 corresponds to the second control value determination unit of the twenty-first aspect, and to the second control value determination step of the seventeenth aspect. The steps S114 and S118 correspond to the image transformation unit of the nineteenth through the twenty-first aspects and to the image transformation step of the twenty-fifth through the twenty-seventh aspects.

Figure 25:
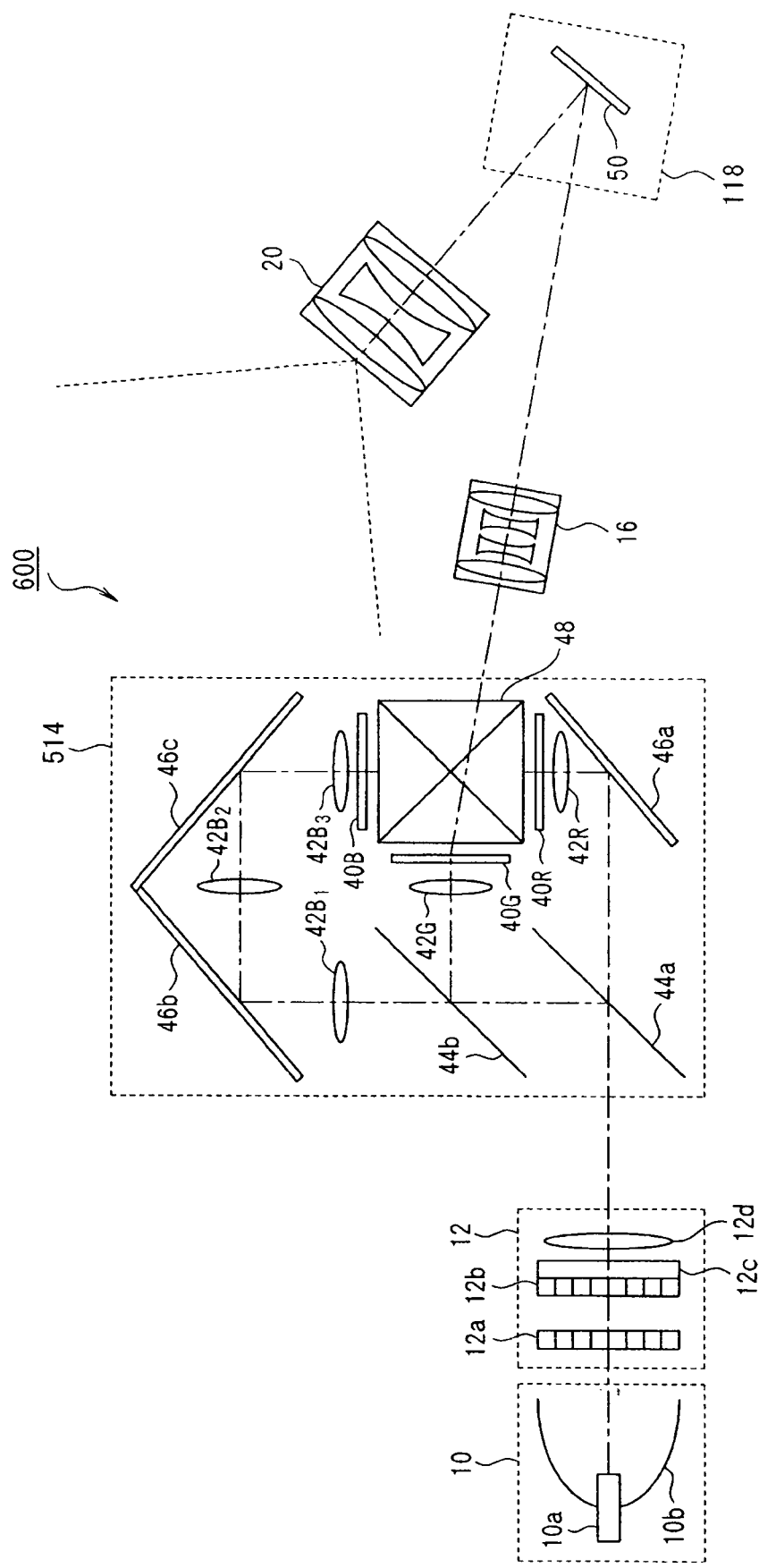
FIG. 25 is a block diagram showing a projection type display device according to a fifth preferred embodiment of the present invention.

Next, the fifth preferred embodiment of the present invention will be explained. The structure of the above described fourth preferred embodiment included the TIR prism 52, but this is not to be considered as being limitative of the present invention. As shown in FIG. 25, it is possible to employ a structure in which no such TIR prism 52 is incorporated. It should be understood that, to structural elements in FIG. 25 which correspond to elements in the fourth preferred embodiment described above and which have the same functions, the same reference symbols are appended, and repetitious explanation thereof is omitted.

FIG. 25 is a figure showing the fifth preferred embodiment of the present invention, which consists of a projection type display device 600 in which no such prism as the TIR prism 52 is incorporated.

This projection type display device 600, as shown in FIG. 25, comprises a light source 10, a luminance distribution uniformalization section 12, a color modulation section 514, a relay lens 16, a luminance modulation section 118 and a projection section 20.

The luminance modulation section 118 comprises a DMD 50 in which a plurality of picture elements, whose reflectivity ratios can be individually controlled, are arranged in a matrix configuration. This DMD 50 is arranged so as to constitute an off-axis optical system, in which the optical axis of the light which is incident from the relay lens 16 is inclined at a predetermined angle to the optical axis of the light which is emitted towards the projection section 20. In other words, the DMD 50 is disposed directly in front of the projection section 20, and the transmission type liquid crystal light valves 40R through 40B and the relay lens 16 are disposed slantingly with respect to the DMD 50, so that the light is incident at a predetermined angle of incidence. Furthermore, the color modulation light valve, the relay lens 16, and the DMD 50 are arranged according to Scheimpflug's Rule.

Figure 26:
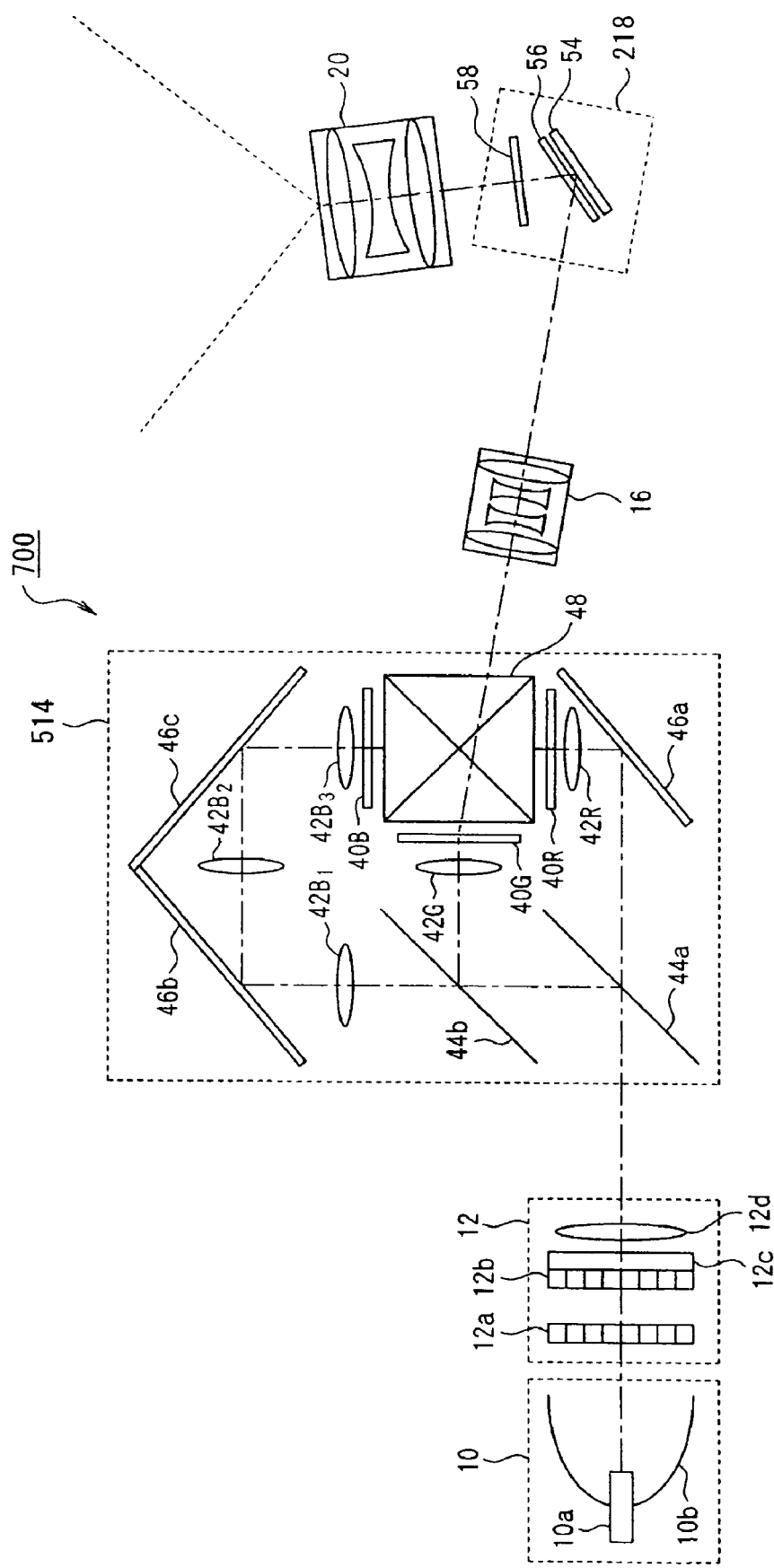
FIG. 26 is a block diagram showing a projection type display device according to a sixth preferred embodiment of the present invention.

Next, the sixth preferred embodiment of the present invention will be explained. Whereas, in the above described fourth and fifth preferred embodiments of the present invention, the luminance modulation element was embodied as the DMD 50, this is not intended to be limitative of the present invention. Instead of this, as shown in FIG. 26, it would be possible to constitute this luminance modulation element as a reflective type liquid crystal light valve 54. It should be understood that, to elements in FIG. 26 which correspond to elements in the fourth and fifth preferred embodiments described above and which have the same functions, the same reference symbols are appended, and repetitious explanation thereof is omitted.

FIG. 26 is a figure showing the sixth preferred embodiment of the present invention, which consists of a projection type display device 700 which takes advantage of a reflective type liquid crystal light valve 54.

As shown in FIG. 26, this projection type display device 700 comprises a light source 10, a luminance distribution uniformalization section 12, a color modulation section 514, a relay lens 16, a luminance modulation section 218, and a projection section 20.

The luminance modulation section 218 comprises a reflective type liquid crystal light valve 54 in which a plurality of picture elements, whose reflectivity ratios T2 can be individually controlled, are arranged in a matrix configuration, a λ/4 plate 56 for enhancing the contrast characteristic of this reflective type liquid crystal light valve 54, and a polarization plate 58. The reflective type liquid crystal light valve 54 is arranged so as to constitute an off-axis optical system, in which the optical axis of the light which is incident from the relay lens 16 and the optical axis of the light which is emitted towards the projection section 20 are inclined at a predetermined angle with respect to one another. Furthermore, the color modulation light valve, the relay lens 16, and the reflective type liquid crystal light valve 54 are arranged according to Scheimpflug's Rule. First, the light from the relay lens 16 is incident upon the reflective type liquid crystal light valve 54 via the λ/4 plate 56, and the polarization state in all the wavelength regions of the light which is thus incident is modulated by the reflective type liquid crystal light valve 54, the light then being reflected. And this reflected light is incident upon the polarization plate 58 via the λ/4 plate 56, and the polarization component which is required for image display is emitted towards the projection section 20.

With regard to the characteristics of the structure of the reflective type liquid crystal light valve 54, they are described in the explanation above of the third preferred embodiment of the present invention. In this sixth preferred embodiment as well, the same beneficial results are obtained, as in that third preferred embodiment.

Although, in the above described first through sixth preferred embodiments of the present invention, it was arranged to determine the transmittivity ratios T1 and the reflectivity ratios T2 by referring to the picture element correspondence relationship table, this is not to be considered as being limitative of the present invention; it would also be acceptable to arrange for either of the transmittivity ratios T1 and the control values for the color modulation light valve, or the reflectivity ratios T2 and the control values for the luminance modulation element, to be determined by reference to the picture element correspondence relationship table.

Furthermore although, in the above described preferred embodiments of the present invention, the transmission type liquid crystal light valves 40R through 40B were implemented by the use of active matrix type liquid crystal display elements, this is not to be considered as being limitative of the present invention; it would also be possible to implement the use of passive matrix type liquid crystal display elements and segment type liquid crystal display elements for the transmission type liquid crystal light valves 40R through 40B. An active matrix type liquid crystal display has the beneficial aspect that it is possible to display fine gradations, while a passive matrix type liquid crystal display element and a segment type liquid crystal display element have the beneficial aspect that they can be manufactured cheaply.

Furthermore although, in the above described first, second, fourth, and fifth preferred embodiments of the present invention, since the luminance modulation element was structured from a single DMD 50, a single control value recording table 420 was provided, and it was arranged to determine the control values for the various picture elements of the luminance modulation element based upon the control value recording table 420, this is not to be considered as being limitative of the present invention; it would be possible to provide control value recording tables 420R, 420G, and 420B for each of the three primary colors R, G, and B, and to provide a construction in which it was arranged to determine the control values for the picture elements of the luminance modulation element based upon these control value recording tables 420R through 420B. Since the luminance modulation element modulates the luminance of the light in all its wavelength regions, the reflectivity ratio of the light at a representative wavelength is recorded in the control value recording table 420. That is, it is not absolutely necessary for the reflectivity ratios to be recorded individually for each wavelength of the three primary colors R, G and B.

If, however, this is to be done, then, for the luminance modulation element, exactly, the reflectivity ratio which corresponds to the control value is measured for each of the three primary colors R, G and B, and these measurements are used to make the control value recording tables 420R through 420B. Next, the reflectivity ratio T2 of each picture element of the luminance modulation element is determined for each of the three primary colors R, G and B, and the reflectivity ratio which most closely approximates to the reflectivity ratio T2 which has been calculated for red (R) is searched for from in the control value recording table 420R, and the control value which corresponds to the reflectivity ratio which has been found by the search is read out. In the same manner, the corresponding control values are read out from the control value recording tables 420G and 420B, based upon the reflectivity ratio which has been calculated for green (G) and upon the reflectivity ratio which has been calculated for blue (B). The average value or the like of these three control values which have been read out for the same picture element of the luminance modulation element is calculated as being the final control value for that picture element.

Due to this manner, the control value for each of the picture elements of the luminance modulation element becomes a comparatively appropriate value with respect to the transmittivity ratios for each of the three primary colors R, G and B of the picture elements of the color modulation light valves which are overlapped with that picture element upon the optical path. Accordingly, the possibility of deterioration of the picture quality can be reduced.

Although, in the above described first through sixth preferred embodiments of the present invention, the luminance modulation element was implemented as the light modulation element which determined the display resolution, this is not to be considered as being limitative of the present invention; it would also be possible to implement the color modulation light valve as the light modulation element which determined the display resolution. In this case, the transmittivity ratio T2 for each of the picture elements of the color modulation light valves (supposing the reflectivity ratios or the like of the light modulation element which are determined subsequently to be T2) would be determined while determining the reflectivity ratio T1 for each of the picture elements of the luminance modulation element (supposing the reflectivity ratios or the like of the light modulation element which are determined earlier to be T1). Furthermore, in the same manner as that described above, control value recording tables 400R through 400B for each of the three primary colors R, G and B would be provided, and it would be possible to provide a structure in which the control values for each of the picture elements of the color modulation light valve is determined based upon these control value recording tables 400R through 400B.

In concrete terms, the reflectivity ratio T1 of each of the picture elements of the luminance modulation element in the three primary colors R, G and B is determined, and the reflectivity ratio which most closely approximates to the reflectivity ratio T1 which has been calculated for red (R) is searched out from within the control value recording table 400R, and the control value which corresponds to the reflectivity ratio which has been found by the search is read out. In the same manner, control values are read out from the control value recording table] 400G for green (G) and from the control value recording table 400B for blue (B), based upon the reflectivity ratio T1 which has been calculated for green (G) and the reflectivity ratio T1 which has been calculated for blue (B). The average value or the like of these three control values which have been read out for the same picture element of the luminance modulation element is calculated as being the control value for that picture element.

Due to this manner, the control value for each of the picture elements of the luminance modulation element becomes a comparatively appropriate value for the transmittivity ration for each of the three primary colors R, G and B of the picture elements of the color modulation light valves which are overlapped with that picture element upon the optical path. Accordingly, the possibility of deterioration of the picture quality can be reduced.

In this case, the color modulation light valves correspond to the first light modulation element of the eleventh, sixteenth, twenty-second, and twenty-eighth preferred embodiments. Moreover, the luminance modulation element corresponds to the second light modulation element of the eleventh, sixteenth, twenty-second, and twenty-eighth preferred embodiments.

Furthermore, in the above described first through sixth preferred embodiments of the present invention, it was arranged to determine the control values for the luminance modulation element and the color modulation light valve based upon the HDR display data. However, if normal 8-bit RGB image data for each color is taken advantage of, the values 0-255 of this normal RGB image data are not physical amounts of luminance, but, finally, are only relative values 0-255. Due to this, in order to perform display with a display device of the present invention based upon normal RGB image data, it is necessary to determine, from the normal RGB image, the physical luminance Rp which must be displayed, or the overall reflectivity ratio or the like Tp for the display device.

Figure 27:
FIG. 27 is a figure showing the data structure of an input value recording table which can be used in the first through the sixth preferred embodiments of the present invention.

If the input value recording table 440 of FIG. 27 is used, it is possible to perform conversion from a so called normal RGB image input value of 0-255 to a physical reflectivity ratio or the like Tp, and, moreover, it becomes possible to change the appearance (the gradation characteristic) of the display with respect to the normal RGB image simply by the expedient of setting the reflectivity ratio or the like Tp in this table. Since the reflectivity ratio or the like Tp in this table is the Tp in the above Equation (2), by performing the same procedures as the above described preferred embodiment after this value has been determined, it is possible to determine the transmittivity ratios T1 and the reflectivity ratios T2 for the plurality of light modulation elements, and to perform display.

Figure 28:
FIG. 28 is another figure showing the data structure of an input value recording table which can be used in the first through the sixth preferred embodiments of the present invention.
Figure 29:
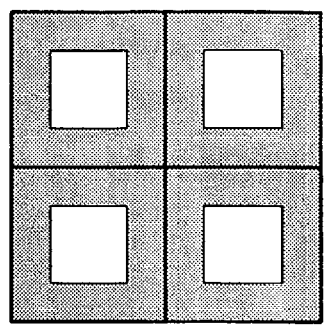
FIG. 29 is a figure showing the picture element surface of the picture elements of a conventional transmission type liquid crystal light valve.
Figure 30:
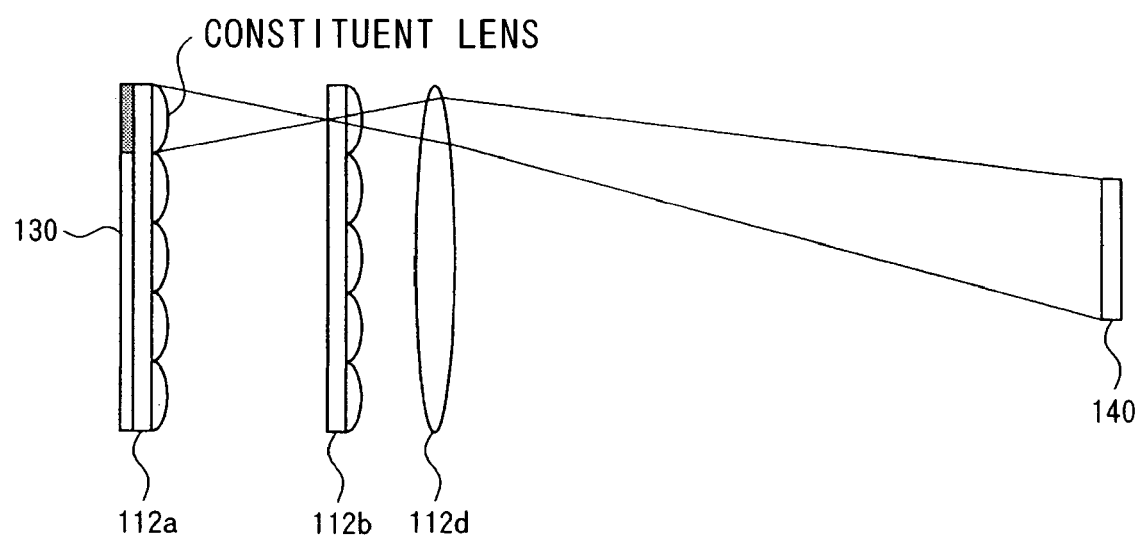
FIG. 30 is a figure showing the structure of the optical path of a first light modulation element and a second light modulation element in a conventional projection type display device.

The input value recording table 460 of FIG. 28 is one which utilizes the luminance level Rp instead of the reflectivity ratio or the like Tp. Since the luminance level Rp in this table is the Rp in the above Equation (1), by performing the same procedures as the above described preferred embodiment after this value has been determined, it is possible to determine the transmittivity ratios T1 and the reflectivity ratios T2 for the plurality of light modulation elements, and to perform display.

Furthermore although, in the above described first through sixth preferred embodiments of the present invention, a structure was employed in which, for each of the picture elements of the luminance modulation element, the weighted average value of the transmittivity ratios T1 for the picture elements of the color modulation light valves which overlapped that picture element upon the optical path was calculated, and the reflectivity ratio of that picture element was calculated based upon that average value, this is not to be considered as being limitative of the present invention; it would also be possible to utilize a structure in which, for each of the picture elements of the luminance modulation element, based upon the control values which had been determined for the picture elements of the color modulation light valves which overlapped upon the optical path with that picture element, the transmittivity ratios $T1_{table}$ which corresponded to that control value were read out from the control value recording tables 400R-400B, the weighed average value of the read out transmittivity ratios $T1_{table}$ was calculated, and the reflectivity ratio T2 of that picture element was calculated based upon that average value.

Although, in the above described preferred embodiments of the present invention, it was arranged to calculate the average value or the like of the transmittivity ratios T1' which were calculated for each of the three primary colors R, G and B for the same picture element as being the T1' for that picture element, this is not to be considered as being limitative of the present invention; it would also be possible to utilize a structure such as one in which the transmittivity ratios are calculated just as they were for each of the three primary colors R, G and B and in which, in the step S114, the average value or the like of the transmittivity ratios T1 which were calculated for each of the three primary colors R, G and B for the same picture element is calculated as being the T1 for that picture element.

Although, in the above described preferred embodiments of the present invention, it was arranged to calculate, for each of the picture elements of the luminance modulation element, the weighted average value of the transmittivity ratios T1 which had been determined for those picture elements of the color modulation light valves which were overlapped upon the optical path of that picture element, and it was arranged to calculate the reflectivity ratio T2 of that picture element based upon that average value. This is not to be considered as being limitative of the present invention; it would also be possible to utilize a structure in which, for each of the picture elements of the luminance modulation element, the maximum value, the minimum value, or the average value of the transmittivity ratios T1 which had been determined for the picture elements of the color modulation light valves which overlap that picture element upon the optical path was calculated, and the reflectivity ratio T2 of that picture element was calculated based upon that calculated value.

Furthermore although, in the above described preferred embodiments of the present invention, the color modulation light valves were implemented as the transmission type liquid crystal light valves 40R through 40B, this is not to be considered as being limitative of the present invention. It would also be acceptable to take advantage of any type of applicable device, provided that it is a light modulation element in which there are included a plurality of picture elements, the optical propagation characteristic of which can be individually controlled. Here, by the optical propagation characteristic is meant any characteristic which influences the propagation of light; for example, the characteristic for transmission of light, the reflection characteristic, the refraction characteristic, or some other propagation characteristic are all included in this concept.

Furthermore although, in the above described preferred embodiments of the present invention, in order to simplify the explanation, a light modulation element was employed which had a small number of picture elements and a small number of gradations, nevertheless, the same procedures as in the above described preferred embodiments may be followed, even if a light modulation element is employed in which the number of picture elements and the number of gradations are both large.

Furthermore although, in the above described preferred embodiments of the present invention, in order to simplify the explanation, it was supposed that the gain G was equal to 1.0, depending upon the hardware structure, the gain G need not be equal to 1.0. Furthermore, when the actual cost of calculation is considered, it may be preferable to record the control values and the reflectivity ratios and so on in the control value recording table in a form in which the influence of the gain G is already included.

Furthermore although, in the above described preferred embodiments of the present invention, for executing the procedures shown in the flow chart of FIG. 10, the explanation has been made in terms of, executing a control program which is stored in the ROM 72 in advance, this is not to be considered as being limitative of the present invention. It will be acceptable, by reading a program which specifies these procedures into the RAM 74 from a storage medium upon which it is stored, to execute this program.

Here, as the storage medium, there could be used a magnetic storage type storage medium such as a semiconductor storage medium as for example a RAM, a ROM, or the like, or a FD or an HD or the like, or an optically read type storage medium such as a CD, a CDV, a LD, a DVD or the like, or a magnetic storage type/optically read type storage medium such as a MO or the like; indeed, provided that it is a storage medium which can be read by a computer, any type of storage medium is included, without any limit upon the method by which it is read out, which may be electronic, magnetic, optical, or the like.

Furthermore although, in the above described preferred embodiments, the light modulation device and the optical display device, and the light modulation method and the image display method, of the present invention were applied to a projection type display device, this is not to be considered as being limitative of the present invention. Other cases of application of the present invention are possible, provided that the scope of the present invention, as defined by the appended Claims, is not departed from.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical display device comprising a light source, an optical separator which separates light from said light source into a plurality of light beams each having a specified wavelength different from one another, a plurality of first light modulation elements which receive a plurality of said light beams respectively incident from said optical separator, an optical combiner which combines said light beams from said first light modulation elements, and a second light modulation element which receives light from said optical combiner, said optical display device modulating said light from said light source by said first light modulation elements and said second light modulation element to display an image, wherein:

said second light modulation element is implemented as a reflective type light modulation element to generate a reflected light, and arranged so as to constitute an off-axis optical system in which a predetermined angle is formed between an optical axis of said light received by said second light modulation element and an optical axis of said reflected light emitted from said second light modulation element; and said optical display device further comprises an image transformation unit which applies distortion to the images to be formed by said first light modulation elements in correspondence to said predetermined angle.

2. The optical display device according to claim 1, wherein:

each of said first light modulation elements comprises a plurality of picture elements whose optical propagation characteristics can be individually controlled;

said second light modulation element comprises a plurality of picture elements whose optical propagation characteristics can be individually controlled; and said image transformation unit determines one or the other of said optical propagation characteristics and control values for said first light modulation elements and said the optical propagation characteristics and control values for said second light modulation element based upon a picture element correspondence relationship table in which correspondence relationships between said picture elements of said first light modulation elements and said picture elements of said second light modulation element are prescribed in consideration of said distortion and said image to be displayed.

3. The optical display device according to claim 2, wherein:

said second light modulation element determines display resolution of said image to be displayed;

said optical display device further comprises a reflection characteristic provisional determination unit which provisionally determines said reflection characteristics of said picture elements of said second light modulation element, an optical propagation characteristic determination unit which determines said optical propagation characteristics of said the picture elements of said first light modulation elements based upon said reflection characteristics provisionally determined by said reflection characteristic provisional determination unit and upon said image to be displayed, a first control value determination unit which determines said control values for said picture elements of said first light modulation elements based upon said optical propagation characteristics determined by said optical propagation characteristic determination unit, a reflection characteristic determination unit which determines said reflection characteristics of said picture elements of said second light modulation element based upon said optical propagation characteristics determined by said optical propagation characteristic determination unit and upon said image to be displayed, and a second control value determination unit which determines said control values for the picture elements of said second light modulation element based upon said reflection characteristics determined by said reflection characteristic determination unit; and said image transformation unit is one of said optical propagation characteristic determination unit, said first control value determination unit, said reflection characteristic determination unit and said second control value determination unit.

4. The optical display device according to claim 2, wherein:

said first light modulation elements determine display resolution of said image to be displayed;

said optical display device further comprises an optical propagation characteristic provisional determination unit which provisionally determines said optical propagation characteristics of said picture elements of said first light modulation elements, a reflection characteristic determination unit which determines said reflection characteristics of said picture elements of said second light modulation element based upon said optical propagation characteristics provisionally determined by said optical propagation characteristic provisional determination unit and upon said image to be displayed, a first control value determination unit which determines said control values for said picture elements of said second light modulation element based upon said reflection characteristics determined by said reflection characteristic determination unit, an optical propagation characteristic determination unit which determines said optical propagation characteristics of said picture elements of said first light modulation elements based upon said reflection characteristics determined by said reflection characteristic determination unit and upon said image to be displayed, and a second control value determination unit which determines said control values for said picture elements of said first light modulation elements based upon said optical propagation characteristics determined, by said optical propagation characteristic determination unit; and said image transformation unit is one of said reflection characteristic determination unit, said first control value determination unit, said optical propagation characteristic determination unit, and said second control value determination unit.

5. An optical display device comprising a light source, an optical separator which separates light from said light source into a plurality of light beams each having a specified wavelength different from each other, a plurality of first light modulation elements which receives a plurality of said light beams separated by said optical separator, an optical combiner which combines said light beams from said first light modulation elements, a second light modulation element, and a relay lens which forms an optical image of said first light modulation elements upon a light reception surface of said second light modulation element, said optical display device modulating light from said light source and displaying an image, wherein:

said second light modulation element being implemented as a reflective type light modulation element to generate a reflected light; and each of said first light modulation elements, said relay lens and said second light modulation element are arranged according to Scheimpflug's Rule.

6. The optical display device according to claim 5, further comprising an image transformation unit which applies a distortion to said optical image to be formed by said first light modulation elements in response to a predetermined angle which is subtended between an optical axis of an incident light incident via said first light modulation elements upon said second light modulation element and an optical axis of said reflected light emitted by said second light modulation element.

7. The optical display device according to claim 6, wherein:

each of said first light modulation elements comprises a plurality of picture elements whose optical propagation characteristics can be individually controlled;

said second light modulation element comprises a plurality of picture elements whose optical propagation characteristics can be individually controlled; and said image transformation unit determines one or the other of said optical propagation characteristics and control values for said first light modulation elements and said the optical propagation characteristics and control values for said second light modulation element based upon a picture element correspondence relationship table in which correspondence relationships between said picture elements of said first light modulation elements and said picture elements of said second light modulation element are prescribed in consideration of said distortion and a display data.

8. The optical display device according to claim 7, wherein:

said second light modulation element determines display resolution of said image to be displayed;

said optical display device further comprises a reflection characteristic provisional determination unit which provisionally determines said reflection characteristics of said picture elements of said second light modulation element, an optical propagation characteristic determination unit which determines said optical propagation characteristics of said the picture elements of said first light modulation elements based upon said reflection characteristics provisionally determined by said reflection characteristic provisional determination unit and upon said display data, a first control value determination unit which determines said control values for said picture elements of said first light modulation elements based upon said optical propagation characteristics determined by said optical propagation characteristic determination unit, a reflection characteristic determination unit which determines said reflection characteristics of said picture elements of said second light modulation element based upon said optical propagation characteristics determined by said optical propagation characteristic determination unit and upon said display data, and a second control value determination unit which determines said control values for the picture elements of said second light modulation element based upon said reflection characteristics determined by said reflection characteristic determination unit; and said image transformation unit is one of said optical propagation characteristic determination unit, said first control value determination unit, said reflection characteristic determination unit and said second control value determination unit.

9. The optical display device according to claim 7, wherein:

said first light modulation elements determine display resolution of said image to be displayed;

said optical display device further comprises an optical propagation characteristic provisional determination unit which provisionally determines said optical propagation characteristics of said picture elements of said first light modulation elements, a reflection characteristic determination unit which determines said reflection characteristics of said picture elements of said second light modulation element based upon said optical propagation characteristics provisionally determined by said optical propagation characteristic provisional determination unit and upon said display data, a first control value determination unit which determines said control values for said picture elements of said second light modulation element based upon said reflection characteristics determined by said reflection characteristic determination unit, an optical propagation characteristic determination unit which determines said optical propagation characteristics of said picture elements of said first light modulation elements based upon said reflection characteristics determined by said reflection characteristic determination unit and upon said display data, and a second control value determination unit which determines said control values for said picture elements of said first light modulation elements based upon said optical propagation characteristics determined by said optical propagation characteristic determination unit; and said image transformation unit is one of said reflection characteristic determination unit, said first control value determination unit, said optical propagation characteristic determination unit, and said second control value determination unit.

\* \* \* \* \*